(12) United States Patent
Sindhu et al.

(10) Patent No.: US 12,143,296 B2
(45) Date of Patent: *Nov. 12, 2024

(54) DATA CENTER NETWORK WITH PACKET SPRAYING

(71) Applicant: Microsoft Technology Licensing, LLC, Redmond, WA (US)

(72) Inventors: Pradeep Sindhu, Los Altos Hills, CA (US); Deepak Goel, San Jose, CA (US); Jean-Marc Frailong, Rancho Mirage, CA (US); Srihari Raju Vegesna, San Jose, CA (US); Wael Noureddine, Santa Clara, CA (US); Philip A. Thomas, San Jose, CA (US); Satish Deo, Cupertino, CA (US); Sunil Mekad, Bangalore (IN); Ayaskant Pani, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/446,876

(22) Filed: Aug. 9, 2023

(65) Prior Publication Data

US 2023/0388222 A1 Nov. 30, 2023

Related U.S. Application Data

(63) Continuation of application No. 16/901,991, filed on Jun. 15, 2020, now Pat. No. 11,777,839, which is a
(Continued)

(51) Int. Cl.
*H04L 45/24* (2022.01)
*H04L 12/46* (2006.01)
(Continued)

(52) U.S. Cl.
CPC .......... *H04L 45/24* (2013.01); *H04L 12/4633* (2013.01); *H04L 47/125* (2013.01);
(Continued)

(58) Field of Classification Search
CPC ... H04L 45/24; H04L 12/4663; H04L 47/125; H04L 47/34
See application file for complete search history.

(56) References Cited

U.S. PATENT DOCUMENTS

| 11,777,839 B2 * | 10/2023 | Sindhu | H04L 45/24 |
| | | | 370/235 |
| 2005/0259632 A1 * | 11/2005 | Malpani | H04L 67/101 |
| | | | 370/351 |

(Continued)

OTHER PUBLICATIONS

Non-Final Office Action mailed on Mar. 7, 2024, in U.S. Appl. No. 18/173,841, 10 pages.

*Primary Examiner* — Kevin C. Harper
(74) *Attorney, Agent, or Firm* — Alleman Hall & Tuttle LLP

(57) ABSTRACT

A network system for a data center is described in which an access node sprays a data flow of packets over a logical tunnel to another access node. In one example, a method comprises establishing, by a plurality of access nodes, a logical tunnel over a plurality of data paths across a switch fabric between a source access node and a destination access node included within the plurality of access nodes, wherein the source access node is coupled to a source network device; and spraying, by the source access node, a data flow of packets over the logical tunnel to the destination access node, wherein the source access node receives the data flow of packets from the source network device, and wherein spraying the data flow of packets includes directing each of the packets within the data flow to a least loaded data path.

17 Claims, 20 Drawing Sheets

Related U.S. Application Data continuation of application No. 15/939,227, filed on Mar. 28, 2018, now Pat. No. 10,686,729.

(60) Provisional application No. 62/514,583, filed on Jun. 2, 2017, provisional application No. 62/478,414, filed on Mar. 29, 2017.

(51) Int. Cl.
*H04L 47/125* (2022.01)
*H04L 47/34* (2022.01)
*H04L 45/00* (2022.01)
*H04L 45/64* (2022.01)
*H04L 49/00* (2022.01)
*H04L 49/10* (2022.01)
*H04L 49/15* (2022.01)
*H04L 49/1515* (2022.01)
*H04L 49/25* (2022.01)
*H04Q 11/00* (2006.01)

(52) U.S. Cl.
CPC .............. *H04L 47/34* (2013.01); *H04L 45/22* (2013.01); *H04L 45/64* (2013.01); *H04L 49/10* (2013.01); *H04L 49/1515* (2013.01); *H04L 49/1584* (2013.01); *H04L 49/25* (2013.01); *H04L 49/70* (2013.01); *H04Q 11/00* (2013.01)

(56) References Cited

U.S. PATENT DOCUMENTS

2012/0176890 A1* 7/2012 Balus ................... H04L 45/245
                                                                 370/218
2020/0067839 A1* 2/2020 Iny ......................... H04L 47/31

* cited by examiner

DATA CENTER NETWORK WITH PACKET SPRAYING

CROSS REFERENCE TO RELATED APPLICATIONS

This application is a continuation application of U.S. patent application Ser. No. 16/901,991 filed on Jun. 15, 2020, which is a continuation application of U.S. patent application Ser. No. 15/939,227 filed on Mar. 28, 2018, now U.S. Pat. No. 10,686,729, which claims the benefit of U.S. Provisional Appl. No. 62/514,583, filed Jun. 2, 2017, and U.S. Provisional Appl. No. 62/478,414, filed Mar. 29, 2017. The entire contents of all of these applications are hereby incorporated by reference.

TECHNICAL FIELD

The invention relates to computer networks and, more particularly, data center networks.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems and environmental control systems.

In most data centers, clusters of storage systems and application servers are interconnected via a high-speed switch fabric provided by one or more tiers of physical network switches and routers. Data centers vary greatly in size, with some public data centers containing hundreds of thousands of servers, and are usually distributed across multiple geographies for redundancy. A typical data center switch fabric includes multiple tiers of interconnected switches and routers. In current implementations, packets for a given packet flow between a source server and a destination server or storage system are always forwarded from the source to the destination along a single path through the routers and switches comprising the switching fabric.

SUMMARY

This disclosure describes novel data center network systems. Various implementations are described in network systems may use any of a number of multiple paths that exist in a switch fabric between two servers of a data center to carry the packets for a single flow between the two servers. Example implementations of network systems for data centers are described in which a switch fabric provides full mesh interconnectivity such that any of the servers may communicate packet data for a given packet flow to any other of the servers using any of a number of parallel data paths within the data center switch fabric. For example, network architectures and techniques are described that facilitate, in example implementations, spraying of individual packets for a given packet flow across some or all of the multiple parallel data paths in the data center switch fabric and reordering of the packets for delivery to the destination. In example implementations, the techniques may provide full mesh interconnectivity between the servers of the data center and may nevertheless be non-blocking and drop-free and provide significantly better (e.g., 3× or more) switch fabric utilization compared to existing approaches.

In various examples, implementations of a specialized access node are described in which the access node operates as an interconnection front-end between the servers and the switch fabric. As further described herein, in one example, each access node is a highly programmable I/O processor specially designed for offloading certain functions from the servers. In one example, an access node includes one or more processing cores comprising a number of internal processor clusters equipped with hardware engines that offload cryptographic/security functions, compression and regular expression processing, data storage functions, acceleration and networking operations. In this way, an access node may include components for fully implementing and processing network and storage stacks on behalf of one or more servers. In addition, each access node may be programmatically configured to serve as a security gateway for its respective servers, freeing up the processors of the servers to dedicate resources to application workloads.

Various data center network architectures and configurations are described. In some examples, according to the techniques described herein, access nodes coupled to the servers, intermediate optical permutation devices, and core switches of the switch fabric may be configured and arranged in such a way that the parallel data paths in the switch fabric provide full mesh (any-to-any) interconnections between any pairwise combination of the access nodes, even in massive data centers having hundreds of thousands of servers. The optical permutation devices optically couple the access nodes to the core switches by optical links to communicate the data packets between the access nodes and the core switches as optical signals. Each of the optical permutation devices comprises a set of input optical ports and a set of output optical ports to direct optical signals between the access nodes and the core switches to communicate the data packets. Each of the optical permutation devices is configured such that optical communications received from input optical ports are permuted across the output optical ports based on wavelength so as to provide full-mesh optical connectivity between the edge-facing ports and the core-facing ports without optical interference. In other examples, the optical permutation device may be replaced by an electronic switch or router. In yet other implementations, the optical permutation device may be used in conjunction with electronic switches and routers to interconnect even a larger number of servers.

In some example implementations, this disclosure is directed to an optical permutor that operates as an optical interconnect for transporting optical communications between network devices, such as devices within a data center. As described herein, the optical permutor provides a plurality of input ports that receive respective optical input signals, each potentially carrying optical communications at a plurality of different wavelengths. Internal optical elements of the optical permutor are configured such that optical communications received from input ports are "permutated" across output optical ports based on wavelength so as to provide full-mesh connectivity between the ports and in a manner that guarantees no optical interference due to wavelength collision. That is, the optical permutor is configured to ensure that optical communications received from any one of the optical input ports can be directed to any one of the optical output ports without optical interference with any simultaneous communications on any of the other input ports. Moreover, the optical permutor may be bi-directional.

In this way, the optical permutors may provide bi-directional, full-mesh point-to-point connectivity for transporting optical communications.

In one example, a system comprises an access node device that communicates over a network. In one specific example, a system comprises a plurality of network devices, including a source network device and a destination network device; a switch fabric comprising a plurality of core switches; a destination access node coupled to the switch fabric and at least the destination network device, and a source access node coupled to the switch fabric and at least the source network device, wherein the source access node is configured to: enable establishment of a logical tunnel over a plurality of data paths across the switch fabric between the source access node and the destination access node, and spray a data flow of packets received from the source network device over the logical tunnel to the destination access node, and wherein to spray the data flow of packets, the source access node directs each of the packets within the data flow to a least loaded data path.

In another example, a method comprises establishing, by a plurality of access nodes, a logical tunnel over a plurality of data paths across a switch fabric between a source access node and a destination access node included within the plurality of access nodes, wherein the source access node is coupled to a source network device; and spraying, by the source access node, a data flow of packets over the logical tunnel to the destination access node, wherein the source access node receives the data flow of packets from the source network device, and wherein spraying the data flow of packets includes directing each of the packets within the data flow to a least loaded data path.

In another example, a system comprises a destination access node coupled to a switch fabric and a destination network device; and a source access node coupled to the switch fabric and a source network device, wherein the source network device is configured to: establish a logical tunnel over a plurality of data paths across the switch fabric between the source access node and the destination access node, and spray a data flow of packets received from the source network device over the logical tunnel to the destination access node, wherein to spray the data flow of packets, the source access node directs each of the packets within the data flow to a least loaded data path.

The details of one or more examples are set forth in the accompanying drawings and the description below. Other features, objects, and advantages of the invention will be apparent from the description and drawings, and from the claims.

DETAILED DESCRIPTION

Figure 1:
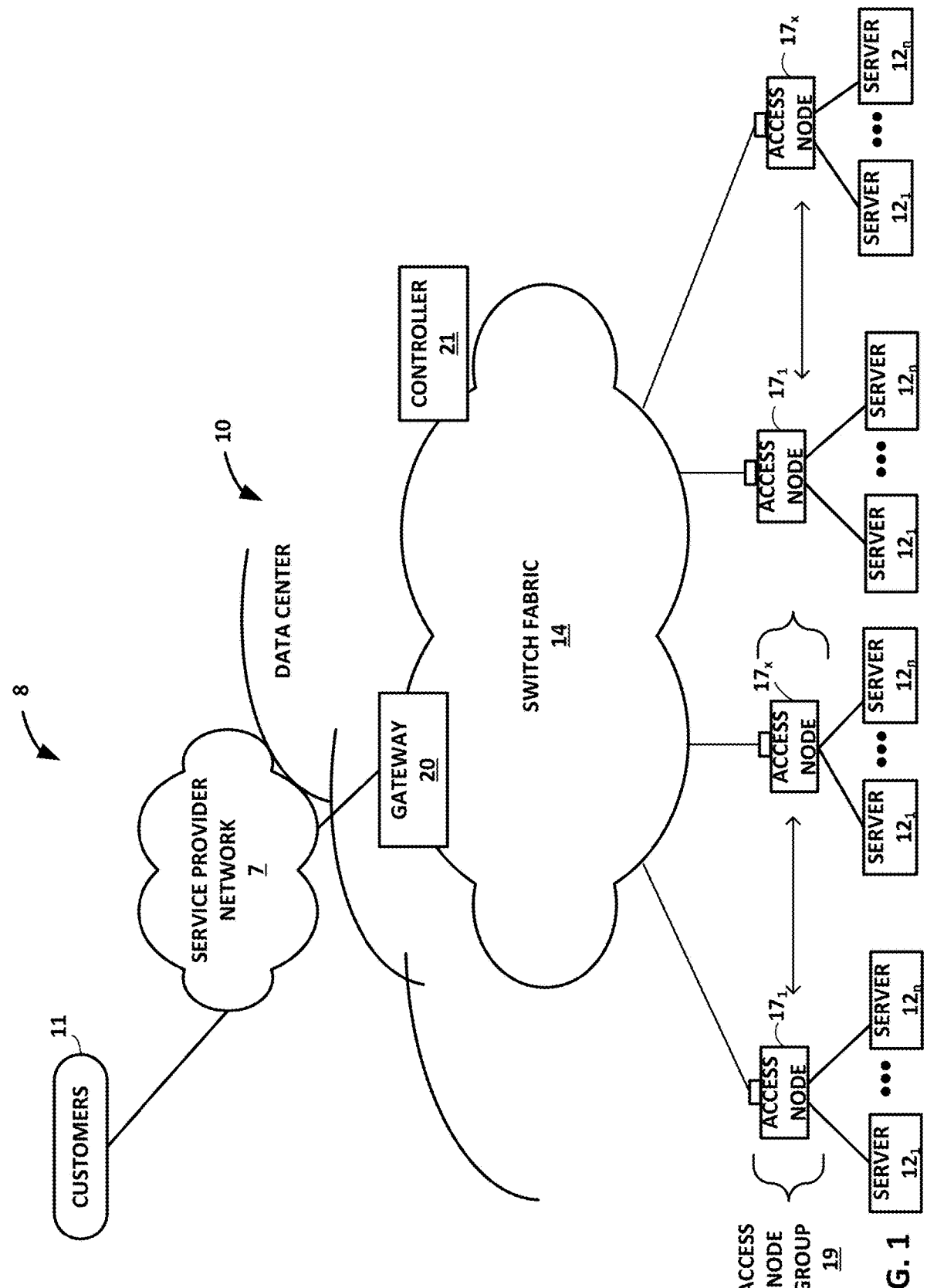
FIG. 1 is a block diagram illustrating an example network having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers, and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator. In some examples, SDN controller 21 operates to configure access nodes 17 to logically establish one or more virtual fabrics as overlay networks dynamically configured on top of the physical underlay network provided by switch fabric 14, in accordance with the techniques described herein. For example, SDN controller 21 may learn and maintain knowledge of access nodes 21 and establish a communication control channel with each of the access nodes. SDN controller 21 uses its knowledge of access nodes 17 to define multiple sets (groups) of two of more access nodes 17 to establish different virtual fabrics over switch fabric 14. More specifically, SDN controller 21 may use the communication control channels to notify each of access nodes 17 for a given set which other access nodes are included in the same set. In response, access nodes 17 dynamically setup FCP tunnels with the other access nodes included in the same set as a virtual fabric over packet switched network 410. In this way, SDN controller 21 defines the sets of access nodes 17 for each of the virtual fabrics, and the access nodes are responsible for establishing the virtual fabrics. As such, underlay components of switch fabric 14 may be unware of virtual fabrics. In these examples, access nodes 17 interface with and utilize switch fabric 14 so as to provide full mesh (any-to-any) interconnectivity between access nodes of any given virtual fabric. In this way, the servers connected to any of the access nodes forming a given one of virtual fabrics may communicate packet data for a given packet flow to any other of the servers coupled to the access nodes for that virtual fabric using any of a number of parallel data paths within switch fabric 14 that interconnect the access nodes of that virtual fabric. More details of access nodes operating to spray packets within and across virtual overlay networks are available in U.S. Provisional Patent Application No. 62/638,788, filed Mar. 5, 2018, entitled "NETWORK ACCESS NODE VIRTUAL FABRICS CONFIGURED DYNAMICALLY OVER AN UNDERLAY NETWORK," the entire content of which is incorporated herein by reference.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17. As further described herein, in one example, each access node 17 is a highly programmable I/O processor specially designed for offloading certain functions from servers 12. In one example, each of access nodes 17 includes one or more processing cores consisting of a number of internal processor clusters, e.g., MIPS cores, equipped with hardware engines that offload cryptographic functions, compression and regular expression (RegEx) processing, data storage functions and networking operations. In this way, each access node 17 includes components for fully implementing and processing network and storage stacks on behalf of one or more servers 12. In addition, access nodes 18 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers. Access nodes 17 may also be referred to as data processing units (DPUs), or devices including DPUs. In other words, the term access node may be used herein interchangeably with the term DPU. Additional example details of various example access nodes are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices," the entire contents of both being incorporated herein by reference In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$-$17_x$. As such, multiple access nodes 17 may be grouped (e.g., within a single electronic device or network appliance), referred to herein as an access node group 19, for providing services to a group of servers supported by the set of access nodes internal to the device. In one example, an access node group 19 may comprise four access nodes 17, each supporting four servers so as to support a group of sixteen servers.

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. For example, as shown in FIG. 1, each access node 17 includes a set of edge-facing electrical or optical local bus interfaces for communicating with a respective group of servers 12 and one or more core-facing electrical or optical interfaces for communicating with core switches within switch fabric 14. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices, such as high-speed solid-state drives or rotating hard drives, configured to provide network accessible storage for use by applications executing on the servers. Although not shown in FIG. 1, access nodes 17 may be directly coupled to each other, such as direct coupling between access nodes in a common access node group 19, to provide direct interconnectivity between the access nodes of the same group. For example, multiple access nodes 17 (e.g., 4 access nodes) may be positioned within a common access node group 19 for servicing a group of servers (e.g., 16 servers).

As one example, each access node group 19 of multiple access nodes 17 may be configured as standalone network device, and may be implemented as a two rack unit (2RU) device that occupies two rack units (e.g., slots) of an equipment rack. In another example, access node 17 may be integrated within a server, such as a single 1RU server in which four CPUs are coupled to the forwarding ASICs described herein on a mother board deployed within a common computing device. In yet another example, one or more of access nodes 17 and servers 12 may be integrated in a suitable size (e.g., 10RU) frame that may, in such an example, become a network storage compute unit (NSCU) for data center 10. For example, an access node 17 may be integrated within a mother board of a server 12 or otherwise co-located with a server in a single chassis.

According to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. For example, example network architectures and techniques are described in which access nodes, in example implementations, spray individual packets for packet flows between the access nodes and across some or all of the multiple parallel data paths in the data center switch fabric 14 and reorder the packets for delivery to the destinations so as to provide full mesh connectivity.

In this way, according to the techniques herein, example implementations are described in which access nodes 17 interface and utilize switch fabric 14 so as to provide full mesh (any-to-any) interconnectivity such that any of servers 12 may communicate packet data for a given packet flow to any other of the servers using any of a number of parallel data paths within the data center 10. For example, example network architectures and techniques are described in which access nodes, in example implementations, spray individual packets for packet flows between the access nodes and across some or all of the multiple parallel data paths in the data center switch fabric 14 and reorder the packets for delivery to the destinations so as to provide full mesh connectivity.

As described herein, the techniques of this disclosure introduce a new data transmission protocol referred to as a Fabric Control Protocol (FCP) that may be used by the different operational networking components of any of access nodes 17 to facilitate communication of data across switch fabric 14. As further described, FCP is an end-to-end admission control protocol in which, in one example, a sender explicitly requests a receiver with the intention to transfer a certain number of bytes of payload data. In response, the receiver issues a grant based on its buffer resources, QoS, and/or a measure of fabric congestion. In general, FCP enables spray of packets of a flow to all paths between a source and a destination node, and may provide any of the advantages and techniques described herein, including resilience against request/grant packet loss, adaptive and low latency fabric implementations, fault recovery, reduced or minimal protocol overhead cost, support for unsolicited packet transfer, support for FCP capable/incapable nodes to coexist, flow-aware fair bandwidth distribution, transmit buffer management through adaptive request window scaling, receive buffer occupancy based grant management, improved end to end QoS, security through encryption and end to end authentication and/or improved ECN marking support. More details on the FCP are available in U.S. Provisional Patent Application No. 62/566,060, filed Sep. 29, 2017, entitled "Fabric Control Protocol for Data Center Networks with Packet Spraying Over Multiple Alternate Data Paths," the entire content of which is incorporated herein by reference.

The techniques may provide certain advantages. For example, the techniques may increase significantly the bandwidth utilization of the underlying switch fabric 14. Moreover, in example implementations, the techniques may provide full mesh interconnectivity between the servers of the data center and may nevertheless be non-blocking and drop-free.

Although access nodes 17 are described in FIG. 1 with respect to switch fabric 14 of data center 10, in other examples, access nodes may provide full mesh interconnectivity over any packet switched network. For example, the packet switched network may include a local area network (LAN), a wide area network (WAN), or a collection of one or more networks. The packet switched network may have any topology, e.g., flat or multi-tiered, as long as there is full connectivity between the access nodes. The packet switched network may use any technology, including IP over Ethernet as well as other technologies. Irrespective of the type of packet switched network, in accordance with the techniques described in this disclosure, access nodes may spray individual packets for packet flows between the access nodes and across multiple parallel data paths in the packet switched network and reorder the packets for delivery to the destinations so as to provide full mesh connectivity.

Figure 2:
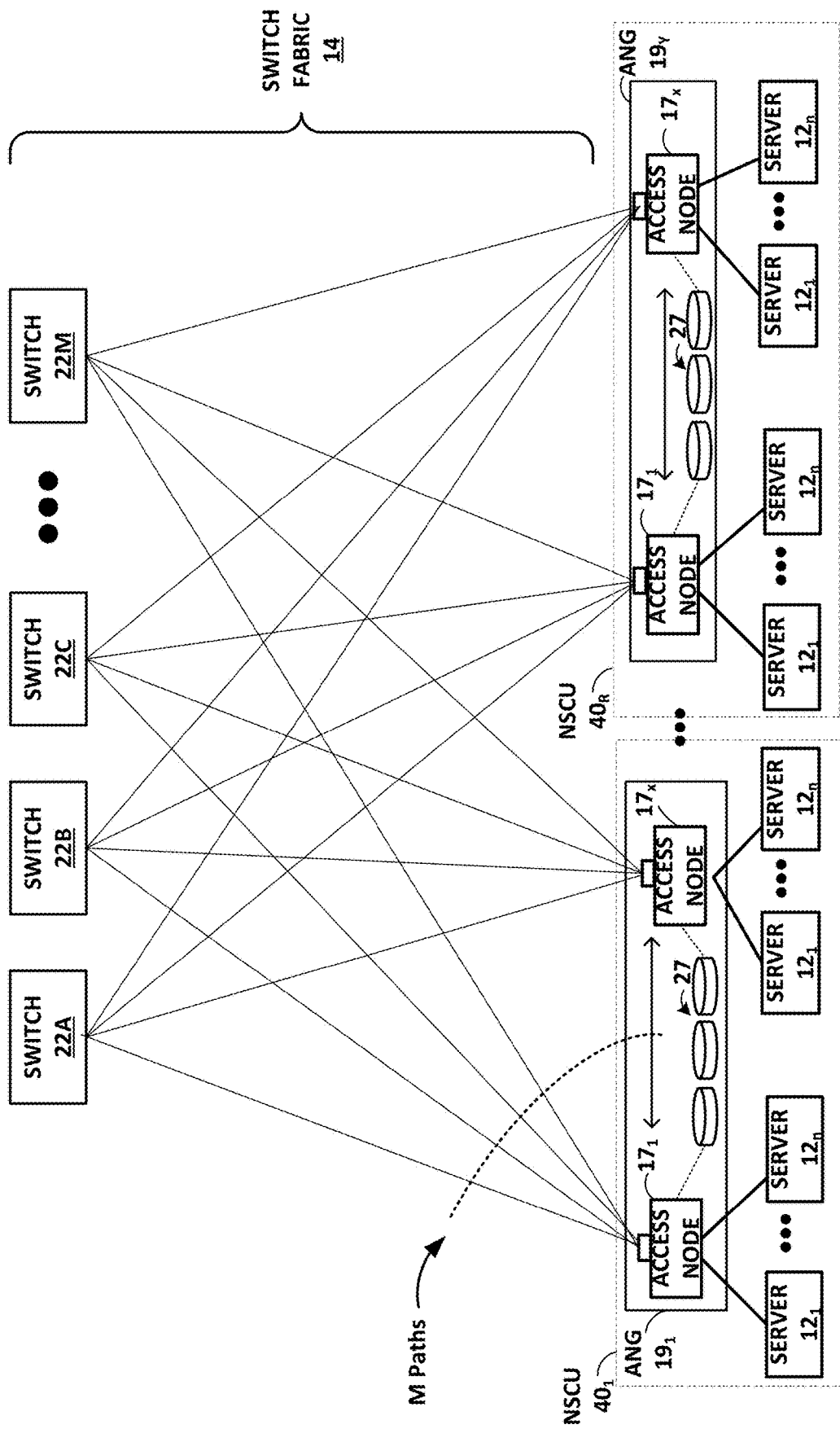
FIG. 2 is a block diagram illustrating in further detail the logical interconnectivity provided by access nodes and switch fabric within a data center.

FIG. 2 is a block diagram illustrating in further detail the logical interconnectivity provided by access nodes 17 and switch fabric 14 within the data center. As shown in this example, access nodes 17 and switch fabric 14 may be configured to provide full mesh interconnectivity such that access nodes 17 may communicate packet data for any of servers 12 to any other of the servers 12 using any of a number of M parallel data paths to any of core switches 22A-22M (collectively "core switches 22"). Moreover, according to the techniques described herein, access nodes 17 and switch fabric 14 may be configured and arranged in a way such that the M parallel data paths in switch fabric 14 provide reduced L2/L3 hops and full mesh interconnections (e.g., bipartite graph) between servers 12, even in massive data centers having tens of thousands of servers. Note that in this example, switches 22 are not connected to each other, which makes it much more likely that any failure of one or more of the switches will be independent of each other. In other examples, the switch fabric itself may be implemented using multiple layers of interconnected switches as in a CLOS network.

In some example implementations, each access node 17 may, therefore, have multiple parallel data paths for reaching any given other access node 17 and the servers 12 reachable through those access nodes. In some examples, rather than being limited to sending all of the packets of a given flow along a single path in the switch fabric, switch fabric 14 may be configured such that access nodes 17 may, for any given packet flow between servers 12, spray the packets of the packet flow across all or a subset of the M parallel data paths of switch fabric 14 by which a given destination access node 17 for a destination server 12 can be reached.

According to the disclosed techniques, access nodes 17 may spray the packets of individual packet flows across the M paths end-to-end forming a virtual tunnel between a source access node and a destination access node. In this way, the number of layers included in switch fabric 14 or the number of hops along the M parallel data paths, may not matter for implementation of the packet spraying techniques described in this disclosure.

The technique of spraying packets of individual packet flows across all or a subset of the M parallel data paths of switch fabric 14, however, enables the number of layers of network devices within switch fabric 14 to be reduced, e.g., to a bare minimum of one. Further, it enables fabric architectures in which the switches are not connected to each other, reducing the likelihood of failure dependence between two switches and thereby increasing the reliability of the switch fabric. Flattening switch fabric 14 may reduce cost by eliminating layers of network devices that require power and reduce latency by eliminating layers of network devices that perform packet switching. In one example, the flattened topology of switch fabric 14 may result in a core layer that includes only one level of spine switches, e.g., core switches 22, that may not communicate directly with one another but form a single hop along the M parallel data paths. In this example, any access node 17 sourcing traffic into switch fabric 14 may reach any other access node 17 by a single, one-hop L3 lookup by one of core switches 22.

An access node 17 sourcing a packet flow for a source server 12 may use any technique for spraying the packets across the available parallel data paths, such as available bandwidth, random, round-robin, hash-based or other mechanism that may be designed to maximize, for example, utilization of bandwidth or otherwise avoid congestion. In some example implementations, flow-based load balancing need not necessarily be utilized and more effective bandwidth utilization may be used by allowing packets of a given packet flow (five tuple) sourced by a server 12 to traverse different paths of switch fabric 14 between access nodes 17 coupled to the source and destinations servers. The respective destination access node 17 associated with the destination server 12 may be configured to reorder the variable length IP packets of the packet flows and deliver the packets to the destination server in the sequence in which they were sent.

In some example implementations, each access node 17 implements at least four different operational networking components or functions: (1) a source component operable to receive traffic from server 12, (2) a source switching component operable to switch source traffic to other source switching components of different access nodes 17 (possibly of different access node groups) or to core switches 22, (3) a destination switching component operable to switch inbound traffic received from other source switching components or from cores switches 22 and (4) a destination component operable to reorder packet flows and provide the packet flows to destination servers 12.

In this example, servers 12 are connected to source components of the access nodes 17 to inject traffic into the switch fabric 14, and servers 12 are similarly coupled to the destination components within the access nodes 17 to receive traffic therefrom. Because of the full-mesh, parallel data paths provided by switch fabric 14, each source switching component and destination switching component within a given access node 17 need not perform L2/L3 switching. Instead, access nodes 17 may apply spraying algorithms to spray packets of a packet flow, e.g., available bandwidth, randomly, round-robin, based on QoS/scheduling or otherwise to efficiently forward packets without, in some examples, requiring packet analysis and lookup operations.

Destination switching components of access nodes 17 may provide a limited lookup necessary only to select the proper output port for forwarding packets to local servers 12. As such, with respect to full routing tables for the data center, only core switches 22 may need to perform full lookup operations. Thus, switch fabric 14 provides a highly-scalable, flat, high-speed interconnect in which servers 12 are, in some embodiments, effectively one L2/L3 hop from any other server 12 within the data center.

Access nodes 17 may need to connect to a fair number of core switches 22 in order to communicate packet data to any other of access nodes 17 and the servers 12 accessible through those access nodes. In some cases, to provide a link multiplier effect, access nodes 17 may connect to core switches 22 via top of rack (TOR) Ethernet switches, electrical permutation devices, or optical permutation (OP) devices (not shown in FIG. 2). To provide an additional link multiplier effect, source components of the access nodes 17 may be configured to spray packets of individual packet flows of the traffic received from server 12 across a set of the other access nodes 17 included in one or more access node groups 19. In one example, access node 17 may achieve an 8× multiplier effect from inter-access node spraying, and an additional 8× multiplier effect from OP devices to connect to up to sixty-four core switches 22.

Flow-based routing and switching over Equal Cost Multi-Path (ECMP) paths through a network may be susceptible to highly variable load-dependent latency. For example, the network may include many small bandwidth flows and a few large bandwidth flows. In the case of routing and switching over ECMP paths, the source access node may select the same path for two of the large bandwidth flows leading to large latencies over that path. In order to avoid this issue and keep latency low across the network, an administrator may be forced to keep the utilization of the network below 25-30%, for example. The techniques described in this disclosure of configuring access nodes 17 to spray packets of individual packet flows across all available paths enables higher network utilization, e.g., 85-90%, while maintaining bounded or limited latencies. The packet spraying techniques enable a source access node 17 to fairly distribute packets of a given flow across all the available paths while taking link failures into account. In this way, regardless of the bandwidth size of the given flow, the load can be fairly spread across the available paths through the network to avoid over utilization of a particular path. The disclosed techniques enable the same amount of networking devices to pass three times the amount of data traffic through the network while maintaining low latency characteristics and reducing a number of layers of network devices that consume energy.

As shown in the example of FIG. 2, in some example implementations, access nodes 17 may be arranged into multiple different access node groups $19_1$-$19_Y$ (ANGs in FIG. 2), each including any number of access nodes 17 up to, for example, x access nodes $17_1$-$17_x$. As such, multiple access nodes 17 may be grouped and arranged (e.g., within a single electronic device or network appliance), referred to herein as an access node group (ANG) 19, for providing services to a group of servers supported by the set of access nodes internal to the device.

As described, each access node group 19 may be configured as standalone network device, and may be implemented as a device configured for installation within a compute rack, a storage rack or a converged rack. In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as high-speed solid-state hard drives, configured to provide network accessible storage for use by applications executing on the servers. Each access node group 19 including its set of access nodes 17, storage devices 27, and the set of servers 12 supported by the access nodes 17 of that access node group may be referred to herein as a network storage compute unit (NSCU) 40.

Figure 3:
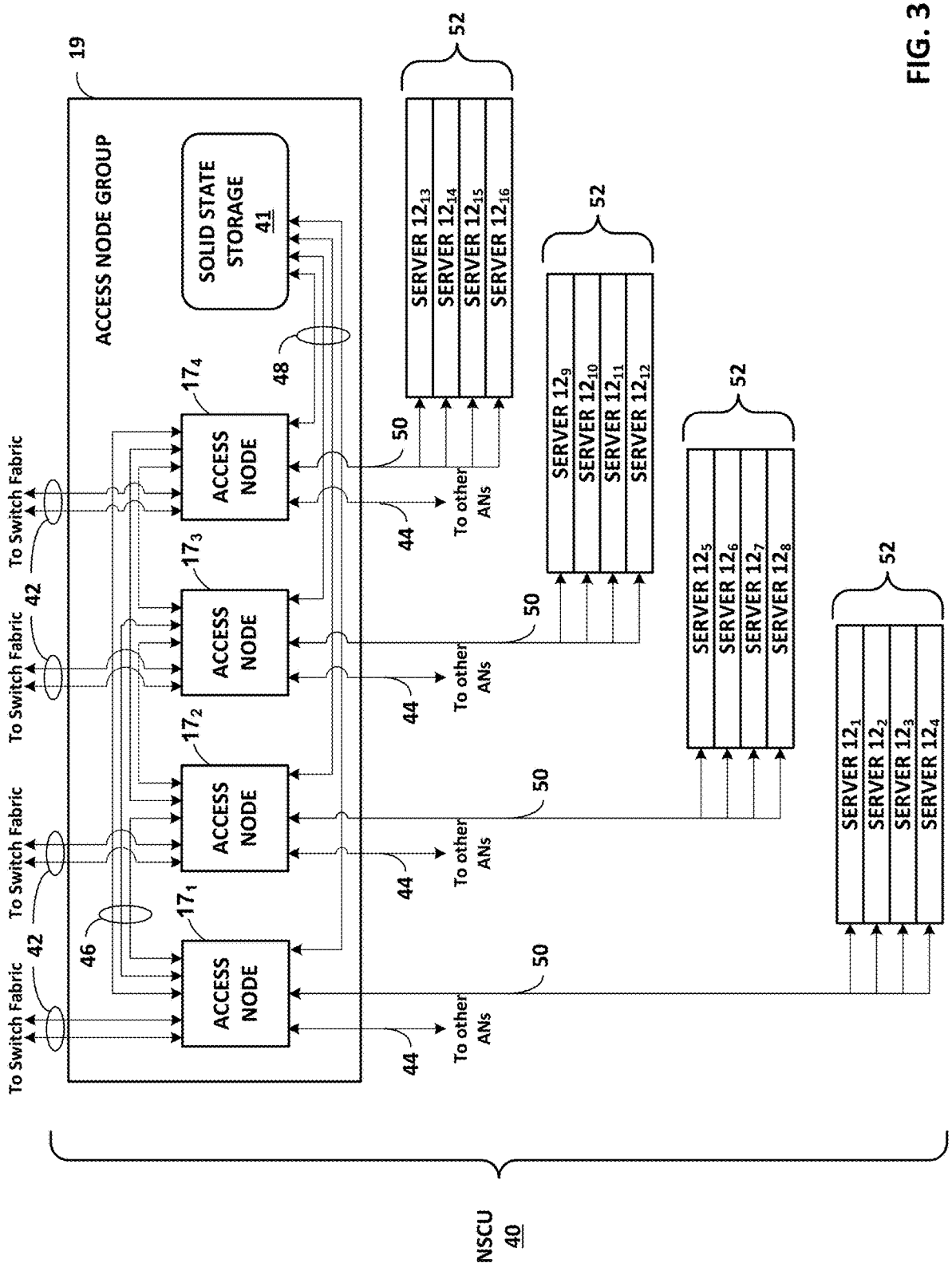
FIG. 3 is a block diagram illustrating one example of network storage compute unit (NSCU) 40 including an access node group and its supported servers.

FIG. 3 is a block diagram illustrating one example of network storage compute unit (NSCU) 40 including an access node group 19 and its supported servers 52. Access node group 19 may be configured to operate as a high-performance I/O hub designed to aggregate and process network and storage I/O to multiple servers 52. In the particular example of FIG. 3, access node group 19 includes four access nodes $17_1$-$17_4$ (collectively, "access nodes 17") connected to a pool of local solid state storage 41. In the illustrated example, access node group 19 supports a total of sixteen server nodes $12_1$-$12_{16}$ (collectively, "server nodes 12") with each of the four access nodes 17 within access node group 19 supporting four of server nodes 12. In some examples, each of the four server nodes 12 supported by each of the access nodes 17 may be arranged as a server 52. In some examples, the "servers 12" described throughout this application may be dual-socket or dual-processor "server nodes" that are arranged in groups of two or more within a standalone server device, e.g., servers 52.

Although access node group 19 is illustrated in FIG. 3 as including four access nodes 17 that are all connected to a single pool of solid state storage 41, an access node group may be arranged in other ways. In one example, each of the four access nodes 17 may be included on an individual access node sled that also includes solid state storage and/or other types of storage for the access node. In this example, an access node group may include four access node sleds each having an access node and a set of local storage devices.

In one example implementation, access nodes 17 within access node group 19 connect to servers 52 and solid state storage 41 using Peripheral Component Interconnect express (PCIe) links 48, 50, and connect to other access nodes and the datacenter switch fabric 14 using Ethernet links 42, 44, 46. For example, each of access nodes 17 may support six high-speed Ethernet connections, including two externally-available Ethernet connections 42 for communicating with the switch fabric, one externally-available Ethernet connection 44 for communicating with other access nodes in other access node groups, and three internal Ethernet connections 46 for communicating with other access nodes 17 in the same access node group 19. In one example, each of externally-available connections 42 may be a 100 Gigabit Ethernet (GE) connection. In this example, access node group 19 has 8×100 GE externally-available ports to connect to the switch fabric 14.

Within access node group 19, connections 42 may be copper, i.e., electrical, links arranged as 8×25 GE links between each of access nodes 17 and optical ports of access node group 19. Between access node group 19 and the switch fabric, connections 42 may be optical Ethernet connections coupled to the optical ports of access node group 19. The optical Ethernet connections may connect to one or more optical devices within the switch fabric, e.g., optical permutation devices described in more detail below. The optical Ethernet connections may support more bandwidth than electrical connections without increasing the number of cables in the switch fabric. For example, each optical cable coupled to access node group 19 may carry 4×100 GE optical fibers with each fiber carrying optical signals at four different wavelengths or lambdas. In other examples, the externally-available connections 42 may remain as electrical Ethernet connections to the switch fabric.

The four remaining Ethernet connections supported by each of access nodes 17 include one Ethernet connection 44 for communication with other access nodes within other access node groups, and three Ethernet connections 46 for communication with the other three access nodes within the same access node group 19. In some examples, connections 44 may be referred to as "inter-access node group links" and connections 46 may be referred to as "intra-access node group links."

Ethernet connections 44, 46 provide full-mesh connectivity between access nodes within a given structural unit. In one example, such a structural unit may be referred to herein as a logical rack (e.g., a half-rack or a half physical rack) that includes two NSCUs 40 having two AGNs 19 and supports an 8-way mesh of eight access nodes 17 for those AGNs. In this particular example, connections 46 would provide full-mesh connectivity between the four access nodes 17 within the same access node group 19, and connections 44 would provide full-mesh connectivity between each of access nodes 17 and four other access nodes within one other access node group of the logical rack (i.e., structural unit). In addition, access node group 19 may have enough, e.g., sixteen, externally-available Ethernet ports to connect to the four access nodes in the other access node group.

In the case of an 8-way mesh of access nodes, i.e., a logical rack of two NSCUs 40, each of access nodes 17 may be connected to each of the other seven access nodes by a 50 GE connection. For example, each of connections 46 between the four access nodes 17 within the same access node group 19 may be a 50 GE connection arranged as 2×25 GE links. Each of connections 44 between the four access nodes 17 and the four access nodes in the other access node group may include four 50 GE links. In some examples, each of the four 50 GE links may be arranged as 2×25 GE links such that each of connections 44 includes 8×25 GE links to the other access nodes in the other access node group. This example is described in more detail below with respect to FIG. 5.

In another example, Ethernet connections 44, 46 provide full-mesh connectivity between access nodes within a given structural unit that is a full-rack or a full physical rack that includes four NSCUs 40 having four AGNs 19 and supports a 16-way mesh of access nodes 17 for those AGNs. In this example, connections 46 provide full-mesh connectivity between the four access nodes 17 within the same access node group 19, and connections 44 provide full-mesh connectivity between each of access nodes 17 and twelve other access nodes within three other access node group. In addition, access node group 19 may have enough, e.g., forty-eight, externally-available Ethernet ports to connect to the four access nodes in the other access node group.

In the case of a 16-way mesh of access nodes, each of access nodes 17 may be connected to each of the other fifteen access nodes by a 25 GE connection, for example. In other words, in this example, each of connections 46 between the four access nodes 17 within the same access node group 19 may be a single 25 GE link. Each of connections 44 between the four access nodes 17 and the twelve other access nodes in the three other access node groups may include 12×25 GE links.

As shown in FIG. 3, each of access nodes 17 within an access node group 19 may also support a set of high-speed PCIe connections 48, 50, e.g., PCIe Gen 3.0 or PCIe Gen 4.0 connections, for communication with solid state storage 41 within access node group 19 and communication with servers 52 within NSCU 40. Each of servers 52 includes four server nodes 12 supported by one of access nodes 17 within access node group 19. Solid state storage 41 may be a pool of Non-Volatile Memory express (NVMe)-based solid state drive (SSD) storage devices accessible by each of access nodes 17 via connections 48.

In one example, solid state storage 41 may include twenty-four SSD devices with six SSD devices for each of access nodes 17. The twenty-four SSD devices may be arranged in four rows of six SSD devices with each row of SSD devices being connected to one of access nodes 17. Each of the SSD devices may provide up to 16 Terabytes (TB) of storage for a total of 384 TB per access node group 19. As described in more detail below, in some cases, a physical rack may include four access node groups 19 and their supported servers 52. In that case, a typical physical rack may support approximately 1.5 Petabytes (PB) of local solid state storage. In another example, solid state storage 41 may include up to 32 U.2×4 SSD devices. In other examples, NSCU 40 may support other SSD devices, e.g., 2.5" Serial ATA (SATA) SSDs, mini-SATA (mSATA) SSDs, M.2 SSDs, and the like.

In the above described example in which each of the access nodes 17 is included on an individual access node sled with local storage for the access node, each of the access node sleds may include four SSD devices and some additional storage that may be hard drive or solid state drive devices. In this example, the four SSD devices and the additional storage may provide approximately the same amount of storage per access node as the six SSD devices described in the previous example.

In one example, each of access nodes 17 supports a total of 96 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×16-lane PCIe Gen 3.0 connection. In this example, access node group 19 has a total of 256 external facing PCIe links that interface with servers 52. In some scenarios, access nodes 17 may support redundant server connectivity such that each of access nodes 17 connects to eight server nodes 12 within two different servers 52 using an 8×8-lane PCIe Gen 3.0 connection.

In another example, each of access nodes 17 supports a total of 64 PCIe lanes. In this example, each of connections 48 may be an 8×4-lane PCI Gen 3.0 connection via which each of access nodes 17 may communicate with up to eight SSD devices within solid state storage 41. In addition, each of connections 50 between a given access node 17 and the four server nodes 12 within the server 52 supported by the access node 17 may be a 4×8-lane PCIe Gen 4.0 connection. In this example, access node group 19 has a total of 128 external facing PCIe links that interface with servers 52.

Figure 4:
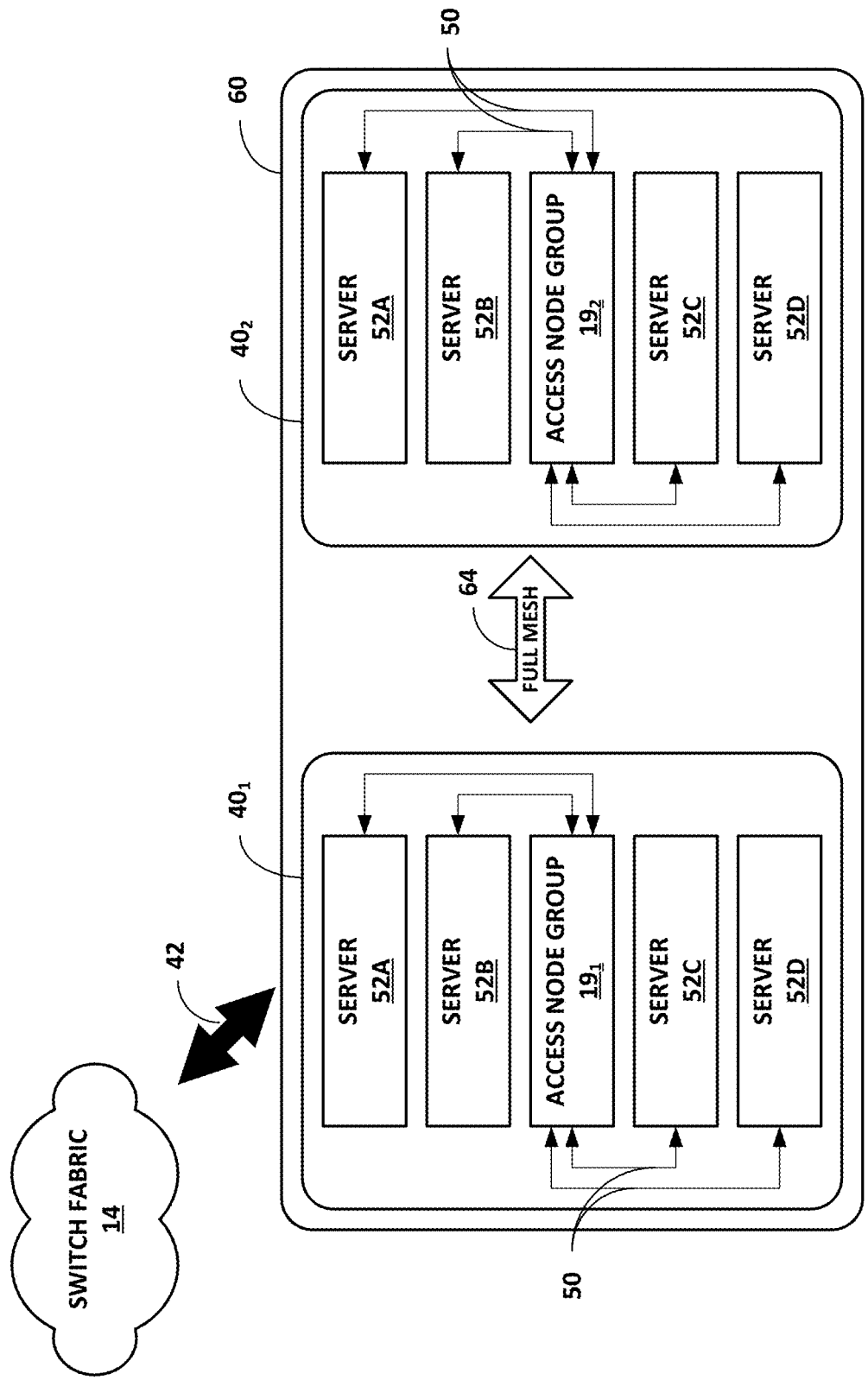
FIG. 4 is a block diagram illustrating an example logical rack arrangement including two NSCUs from FIG. 3.

FIG. 4 is a block diagram illustrating an example logical rack arrangement 60 including two NSCUs $40_1$ and $40_2$ from FIG. 3. In some examples, each of NSCUs 40 may be referred to as a "compute sandwich" based on the structural arrangement of access node group 19 "sandwiched" between two servers 52 on the top and two servers 52 on the bottom. For example, server 52A may be referred to as a top second server, server 52B may be referred to as a top server, server 52C may be referred to as a bottom server, and server 52D may be referred to as a bottom second server. Each of servers 52 may include four server nodes, and each server node may be a dual-socket or dual-processor server sled.

Each of access node groups 19 connects to servers 52 using PCIe links 50, and to switch fabric 14 using Ethernet links 42. Access node groups $19_1$ and $19_2$ may each include four access nodes connected to each other using Ethernet links and local solid state storage connected to the access nodes using PCIe links as described above with respect to FIG. 3. The access nodes within access node groups $19_1$ and $19_2$ are connected to each other in a full mesh 64, which is described in more detail with respect to FIG. 5.

In addition, each of access node groups 19 supports PCIe connections 50 to servers 52. In one example, each of connections 50 may be a 4×16-lane PCIe Gen 3.0 connection such that access node group 19 has a total of 256 externally-available PCIe links that interface with servers 52. In another example, each of connections 50 may be a 4×8-lane PCIe Gen 4.0 connection for communication between access nodes within access node group 19 and server nodes within servers 52. In either example, connections 50 may provide a raw throughput of 512 Gigabits per access node 19 or approximately 128 Gigabits of bandwidth per server node without accounting for any overhead bandwidth costs.

As discussed above with respect to FIG. 3, each of NSCUs 40 supports 8×100 GE links 42 from access node group 19 to switch fabric 14. Each of NSCUs 40 thus provides support for up to sixteen server nodes in four servers 52, local solid state storage, and 800 Gbps of full duplex (i.e., bidirectional) network bandwidth. Each of access node groups 19 may, therefore, provide true hyperconvergence of compute, storage, networking and security of servers 52. Logical rack 60, including two NSCUs 40, therefore, provides support for up to thirty-two server nodes in eight servers 52, local solid state storage at access node groups 19, and 16×100 GE links 42 to switch fabric 14, which results in 1.6 Terabits per second (Tbps) of full duplex network bandwidth.

Figure 5:
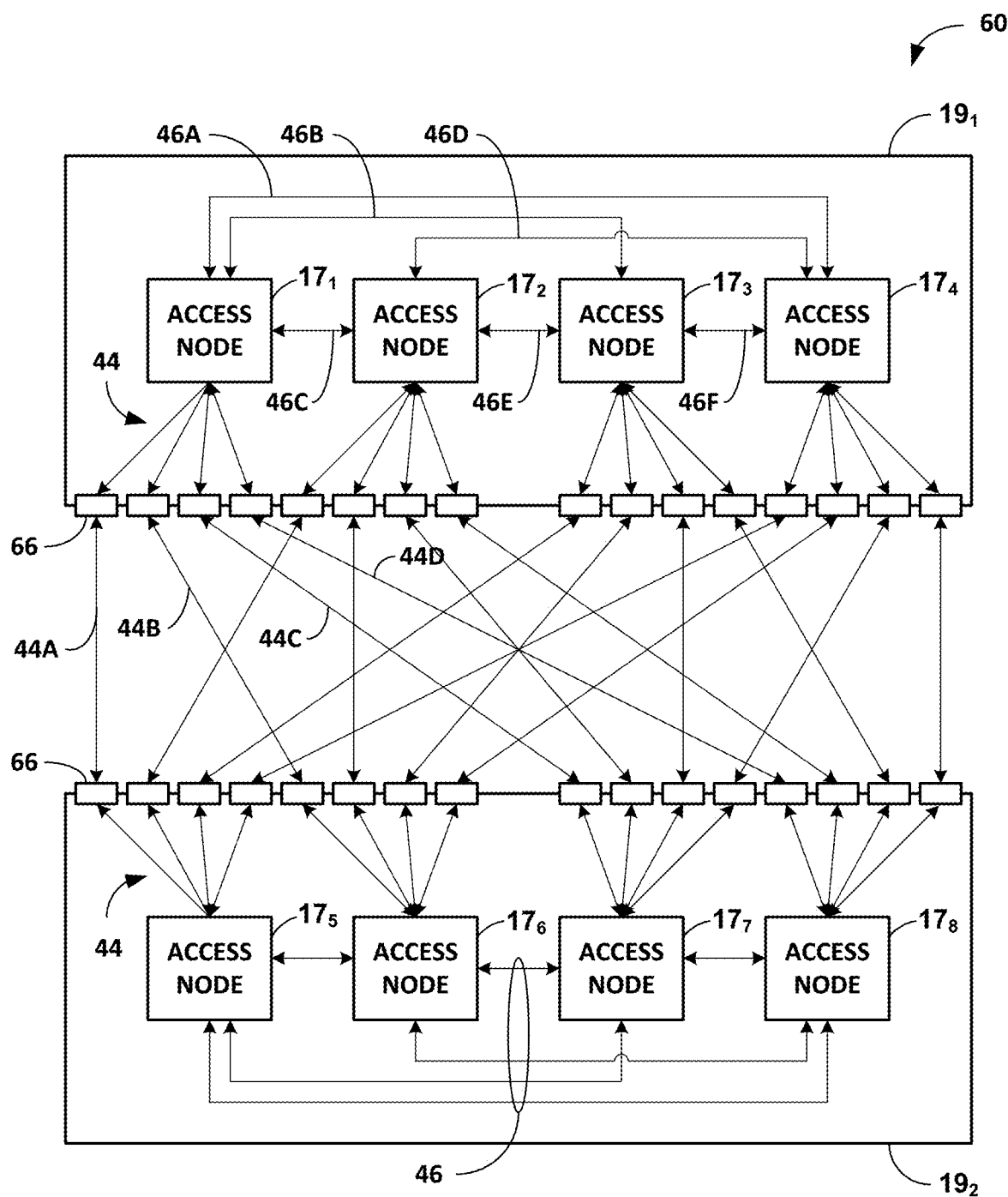
FIG. 5 is a block diagram illustrating an example of full mesh connectivity between two access node groups within a logical rack.

FIG. 5 is a block diagram illustrating an example of full mesh connectivity between two access node groups $19_1$, $19_2$ within a logical rack 60. As illustrated in FIG. 5, access node group $19_1$ includes four access nodes $17_1$-$17_4$ and access node group $19_2$ also include four access nodes $17_5$-$17_8$. Each of access nodes 17 connects to the other access nodes within the logical rack in a mesh fabric topology. The eight access nodes 17 included in the mesh topology may be referred to as an access node "cluster." In this way, each of access nodes 17 is able to spray incoming packets to each of the other access nodes in the cluster.

In the illustrated configuration of an 8-way mesh interconnecting two access node groups 19, each access node 17 connects via full mesh connectivity to each of the other seven access nodes in the cluster. The mesh topology between access nodes 17 includes intra-access node group links 46 between the four access nodes included in the same access node group 19, and inter-access node group links 44 between access nodes $17_1$-$17_4$ in access node group $19_1$ and access nodes $17_5$-$17_8$ in access node group $19_2$. Although illustrated as a single connection between each of access nodes 17, each of connections 44, 46 are bidirectional such that each access node connects to each other access node in the cluster via a separate link.

Each of access nodes $17_1$-$17_4$ within first access node group $19_1$ has three intra-access node group connections 46 to the other access nodes in first access node group $19_1$. As illustrated in first access node group $19_1$, access node $17_1$ supports connection 46A to access node $17_4$, connection 46B to access node $17_3$, and connection 46C to access node $17_2$. Access node $17_2$ supports connection 46A to access node $17_1$, connection 46D to access node $17_4$, and connection 46E to access node $17_3$. Access node $17_3$ supports connection 46B to access node $17_1$, connection 46E to access node $17_2$, and connection 46F to access node $17_4$. Access node $17_4$ supports connection 46A to access node $17_1$, connection 46D to access node $17_2$, and connection 46F to access node $17_3$. The access nodes $17_5$-$17_8$ are similarly connected within second access node group $19_2$.

Each of access nodes $17_1$-$17_4$ within first access node group $19_1$ also has four inter-access node group connections 44 to the access nodes $17_5$-$17_8$ in second access node group $19_2$. As illustrated in FIG. 5, first access node group $19_1$ and second access node group $19_2$ each has sixteen externally-available ports 66 to connect to each other. For example, access node $17_1$ supports connections 44A, 44B, 44C, and 44D through four external facing ports 66 of first access node group $19_1$ to four externally-available ports 66 of second access node group $19_2$ to reach access nodes $17_5$-$17_8$. Specifically, access node $17_1$ supports connection 44A to access node $17_5$ within second access node group $19_2$, connection 44B to access node 176 within second access node group $19_2$, connection 44C to access node $17_7$ within second access node group $19_2$, and connection 44D to access node $17_8$ within second access node group $19_2$. The remaining access nodes $17_2$-$17_4$ within first access node group $19_1$ are similarly connected to access nodes $17_5$-$17_8$ within second access node group $19_2$. In addition, in the reverse direction, the access nodes $17_5$-$17_8$ are similarly connected to access nodes $17_1$-$17_4$ within first access node group $19_1$.

Each of access nodes 17 may be configured to support up to 400 Gigabits of bandwidth to connect to other access nodes in the cluster. In the illustrated example, each of access nodes 17 may support up to eight 50 GE links to the other access nodes. In this example, since each of access nodes 17 only connects to seven other access nodes, 50 Gigabits of bandwidth may be leftover and used for managing the access node. In some examples, each of connections 44, 46 may be single 50 GE connections. In other examples, each of connections 44, 46 may be 2×25 GE connections. In still other examples, each of intra-access node group connections 46 may be 2×25 GE connections, and each of inter-access node group connections 44 may be single 50 GE connections to reduce a number of inter-box cables. For example, from each access node $17_1$-$17_4$ within first access node group $19_1$, 4×50 GE links go off box to connect to access nodes $17_5$-$17_8$ in second access node group $19_2$. In some examples, the 4×50 GE links may be taken out from each of the access nodes 17 using DAC cables.

Figure 6:
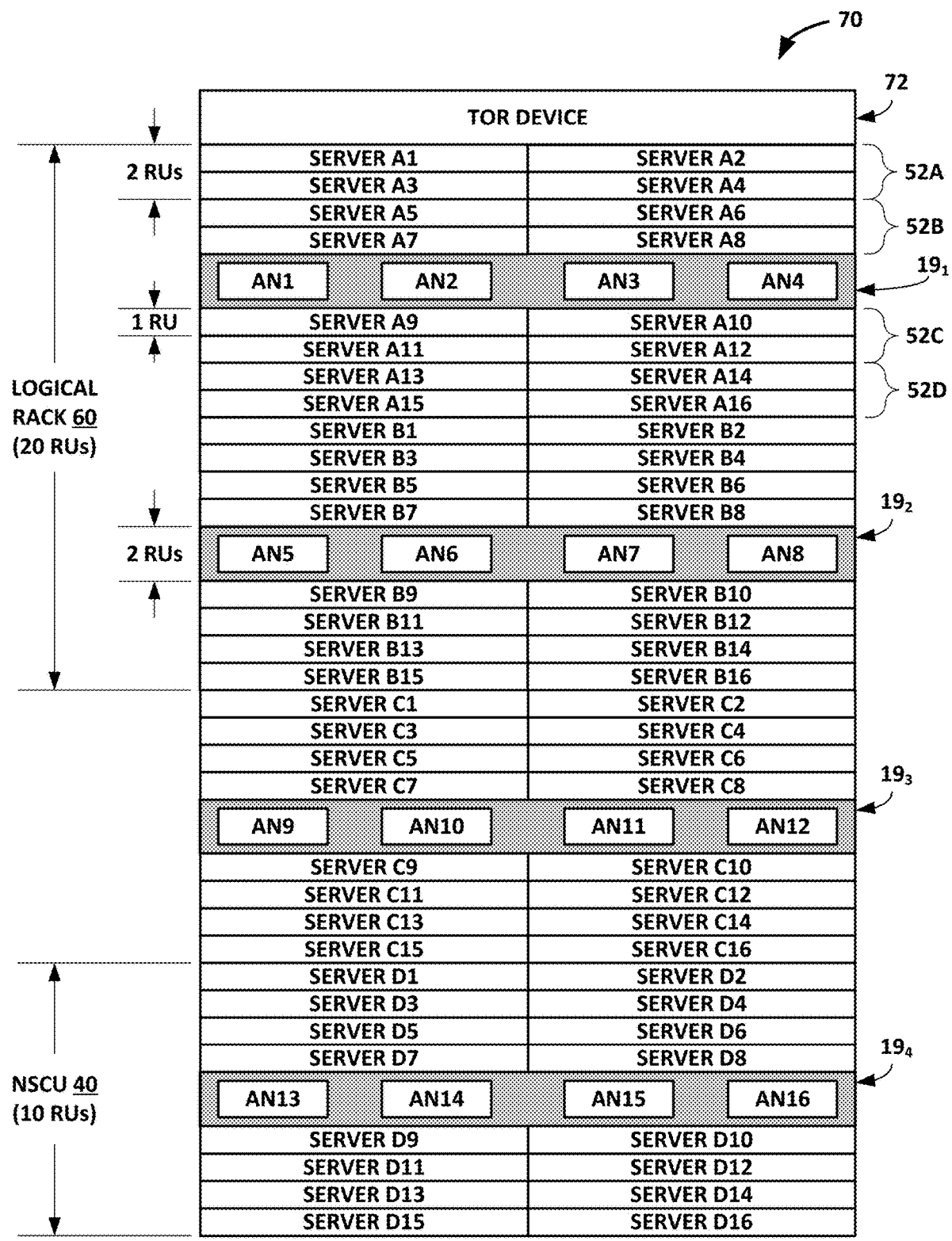
FIG. 6 is a block diagram illustrating an example arrangement of a full physical rack including two logical racks from FIG. 4.

FIG. 6 is a block diagram illustrating an example arrangement of a full physical rack 70 including two logical racks 60 from FIG. 4. In the illustrated example of FIG. 6, rack 70 has 42 rack units or slots in vertical height including a 2 rack unit (2RU) top of rack (TOR) device 72 for providing connectivity to devices within switch fabric 14. In one example, TOR device 72 comprises a top of rack Ethernet switch. In other examples, TOR device 72 comprises an optical permutor described in further detail below. In some examples, rack 70 may not include an additional TOR device 72 and instead have the typical 40 rack units.

In the illustrated example, rack 70 includes four access node groups $19_1$-$19_4$ that are each separate network appliances 2RU in height. Each of the access node groups 19 includes four access nodes and may be configured as shown in the example of FIG. 3. For example, access node group $19_1$ includes access nodes AN1-AN4, access node group $19_2$ includes access nodes AN5-AN8, access node group $19_3$ includes access nodes AN9-AN12, and access node group $19_4$ includes access nodes AN13-AN16. Access nodes AN1-AN16 may be substantially similar to access nodes 17 described above.

In this example, each of the access node groups 19 supports sixteen server nodes. For example, access node group $19_1$ supports server nodes A1-A16, access node group $19_2$ supports server nodes B1-B16, access node group $19_3$ supports server nodes C1-C16, and access node group $19_4$ supports server nodes D1-D16. A server node may be a dual-socket or dual-processor server sled that is ½ Rack in width and 1RU in height. As described with respect to FIG. 3, four of the server nodes may be arranged into a server 52 that is 2RU in height. For example, server 52A includes server nodes A1-A4, server 52B includes server nodes A5-A8, server 52C includes server nodes A9-A12, and server 52D includes server nodes A13-A16. Server nodes B1-B16, C1-C16, and D1-D16 may be similarly arranged into servers 52.

Access node groups 19 and servers 52 are arranged into NSCUs 40 from FIGS. 3-4. NSCUs 40 are 10RU in height and each include one 2RU access node group 19 and four 2RU servers 52. As illustrated in FIG. 6, access node groups 19 and servers 52 may be structured as a compute sandwich, in which each access node group 19 is "sandwiched" between two servers 52 on the top and two servers 52 on the bottom. For example, with respect to access node group $19_1$, server 52A may be referred to as a top second server, server 52B may be referred to as a top server, server 52C may be referred to as a bottom server, and server 52D may be referred to as a bottom second server. In the illustrated structural arrangement, access node groups 19 are separated by eight rack units to accommodate the bottom two 2RU servers 52 supported by one access node group and the top two 2RU servers 52 supported by another access node group.

NSCUs 40 may be arranged into logical racks 60, i.e., half physical racks, from FIG. 5. Logical racks 60 are 20RU in height and each include two NSCUs 40 having full mesh connectivity. In the illustrated example of FIG. 6, access node group $19_1$ and access node group $19_2$ are included in the same logical rack 60 along with their respective supported server nodes A1-A16 and B1-B16. As described in more detail above with respect to FIG. 5, access nodes AN1-AN8 included the same logical rack 60 are connected to each other in an 8-way mesh. Access nodes AN9-AN16 may be similarly connected in an 8-way mesh within another logical rack 60 includes access nodes groups $19_3$ and $19_4$ along with their respective server nodes C1-C16 and D1-D16.

Logical racks 60 within rack 70 may be connected to the switch fabric directly or through an intermediate top of rack device 72. As noted above, in one example, TOR device 72 comprises a top of rack Ethernet switch. In other examples, TOR device 72 comprises an optical permutor that transports optical signals between access nodes 17 and core switches 22 and that is configured such that optical communications are "permuted" based on wavelength so as to provide full-mesh connectivity between the upstream and downstream ports without any optical interference.

In the illustrated example, each of the access node groups 19 may connect to TOR device 72 via one or more of the 8×100 GE links supported by the access node group to reach the switch fabric. In one case, the two logical racks 60 within rack 70 may each connect to one or more ports of TOR device 72, and TOR device 72 may also receive signals from one or more logical racks within neighboring physical racks. In other examples, rack 70 may not itself include TOR device 72, but instead logical racks 60 may connect to one or more TOR devices included in one or more neighboring physical racks.

For a standard rack size of 40RU it may be desirable to stay within a typical power limit, such as a 15 kilowatt (kW) power limit. In the example of rack 70, not taking the additional 2RU TOR device 72 into consideration, it may be possible to readily stay within or near the 15 kW power limit even with the sixty-four server nodes and the four access node groups. For example, each of the access node groups 19 may use approximately 1 kW of power resulting in approximately 4 kW of power for access node groups. In addition, each of the server nodes may use approximately 200 W of power resulting in around 12.8 kW of power for servers 52. In this example, the 40RU arrangement of access node groups 19 and servers 52, therefore, uses around 16.8 kW of power.

Figure 7A:
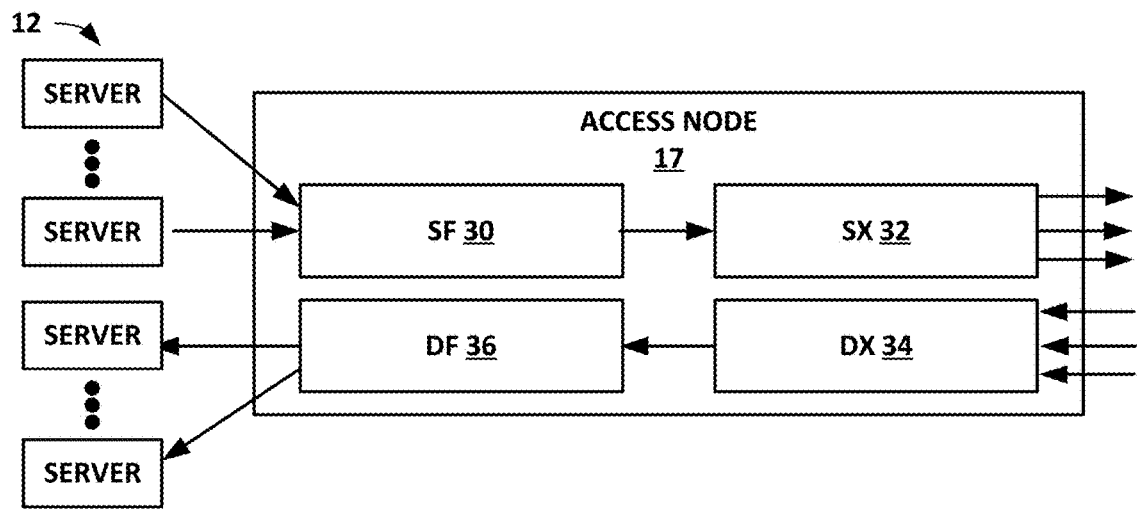
FIG. 7A is a block diagram showing a logical view of the networking data paths and operations within an access node.

FIG. 7A is a block diagram showing a logical view of the networking data paths and operations within an access node 17. As shown in the example of FIG. 7A, in some example implementations, each access node 17 implements at least four different operational networking components or functions: (1) a source (SF) component 30 operable to receive traffic from a set of servers 12 supported by the access node, (2) a source switching (SX) component 32 operable to switch source traffic to other source switching components of different access nodes 17 (possibly of different access node groups) or to core switches 22, (3) a destination switching (DX) component 34 operable to switch inbound traffic received from other source switching components or from cores switches 22 and (4) a destination (DF) component 36 operable to reorder packet flows and provide the packet flows to destination servers 12.

In some examples, the different operational networking components of access node 17 may perform flow-based switching and ECMP based load balancing for Transmission Control Protocol (TCP) packet flows. Typically, however, ECMP load balances poorly as it randomly hashes the flows to paths such that a few large flows may be assigned to the same path and severely imbalance the fabric. In addition, ECMP relies on local path decisions and does not use any feedback about possible congestion or link failure downstream for any of the chosen paths.

The techniques described in this disclosure introduce a new data transmission protocol referred to as a Fabric Control Protocol (FCP) that may be used by the different operational networking components of access node 17. FCP is an end-to-end admission control protocol in which a sender explicitly requests a receiver with the intention to transfer a certain number of bytes of payload data. In response, the receiver issues a grant based on its buffer resources, QoS, and/or a measure of fabric congestion.

For example, the FCP includes admission control mechanisms through which a source node requests permission before transmitting a packet on the fabric to a destination node. For example, the source node sends a request message to the destination node requesting a certain number of bytes to be transferred, and the destination node sends a grant message to the source node after reserving the egress bandwidth. In addition, instead of the flow-based switching and ECMP forwarding used to send all packets of a TCP flow on the same path to avoid packet reordering, the FCP enables packets of an individual packet flow to be sprayed to all available links between a source node and a destination node. The source node assigns a packet sequence number to each packet of the flow, and the destination node uses the packet sequence numbers to put the incoming packets of the same flow in order.

SF component 30 of access node 17 is considered a source node of the fabric. According to the disclosed techniques, for FCP traffic, SF component 30 is configured to spray its input bandwidth (e.g., 200 Gbps) over links to multiple SX components of access nodes within a logical rack. For example, as described in more detail with respect to FIG. 7B, SF component 30 may spray packets of the same flow across eight links to SX component 32 and seven other SX components of other access nodes within a logical rack. For non-FCP traffic, SF component 30 is configured to select one of the connected SX components to which to send packets of the same flow.

SX component 32 of access node 17 may receive incoming packets from multiple SF components of access nodes within the logical rack, e.g., SF component 30 and seven other SF components of other access nodes within the logical rack. For FCP traffic, SX component 32 is also configured to spray its incoming bandwidth over links to multiple core switches in the fabric. For example, as described in more detail with respect to FIG. 8, SX component 32 may spray its bandwidth across eight links to eight core switches. In some cases, SX component 32 may spray its bandwidth across eight links to four or eight intermediate devices, e.g., TOR Ethernet switches, electrical permutation devices, or optical permutation devices, which in turn forward traffic to the core switches. For non-FCP traffic, SX component 32 is configured to select one of the core switches to which to send packets of the same packet flow. Since the incoming bandwidth to SX component 32 and the outgoing bandwidth from SX component 32 is same (e.g., 200 Gbps), congestion should not occur at the SX stage even for a large number of packet flows.

DX component 34 of access node 17 may receive incoming packets from multiple core switches either directly or via one or more intermediate devices, e.g., TOR Ethernet switches, electrical permutation devices, or optical permutation devices. For example, DX component 34 may receive incoming packets from eight core switches, or four or eight intermediate devices. DX component 34 is configured to select a DF component to which to send the received packets. For example, DX component 34 may be connected to DF component 36 and seven other DF components of other access nodes within the logical rack. In some case, DX component 34 may become a congestion point because DX component 34 may receive a large amount of bandwidth (e.g., 200 Gbps) that is all to be sent to the same DF component. In the case of FCP traffic, DX component 34 may avoid long term congestion using the admission control mechanisms of FCP.

DF component 36 of access node 17 may receive incoming packets from multiple DX components of access nodes within the logical rack, e.g., DX component 34 and seven other DX components of other access nodes within the logical rack. DF component 36 is considered a destination node of the fabric. For FCP traffic, DF component 36 is configured to recorder packets of the same flow prior to transmitting the flow to a destination server 12.

In some examples, SX component 32 and DX component 34 of access node 17 may use the same forwarding table to perform packet switching. In this example, the personality of access node 17 and the nexthop identified by the forwarding table for the same destination IP address may depend on a source port type of the received data packet. For example, if a source packet is received from a SF component, access node 17 operates as SX component 32 and determines a nexthop to forward the source packet over the fabric toward a destination node. If a packet is received from a fabric-facing port, access node 17 operates as DX component 34 and determines a final nexthop to forward the incoming packet directly to a destination node. In some examples, the received packet may include an input tag that specifies its source port type.

Figure 7B:
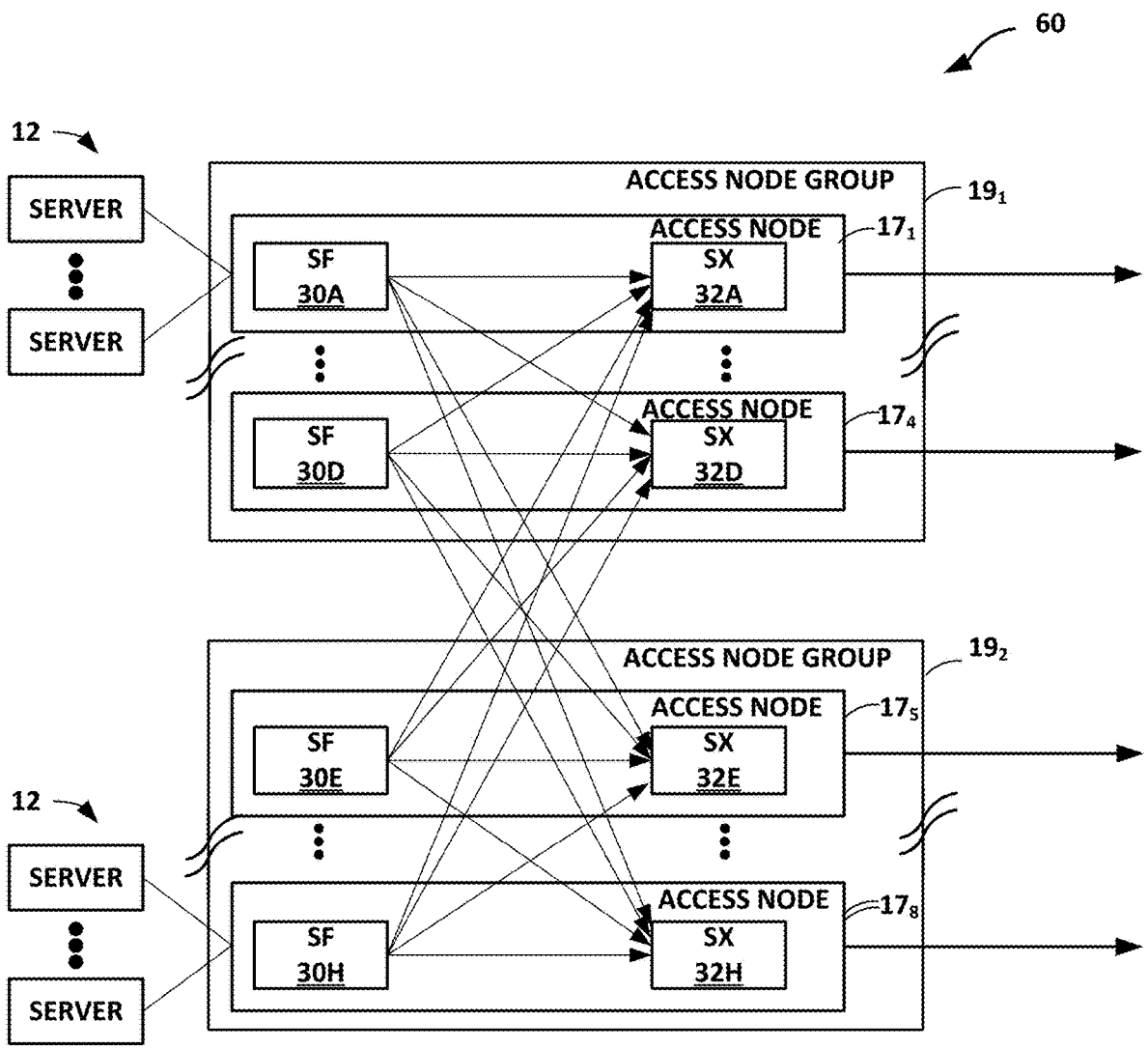
FIG. 7B is a block diagram illustrating an example first-level network fanout achieved between a set of access nodes within a logical rack.

FIG. 7B is a block diagram illustrating an example first-level network fanout achieved between a set of access nodes $17_1$-$17_8$ within a logical rack 60. In the illustrated example of FIG. 7B, logical rack 60 includes two access node groups $19_1$ and $19_2$ containing eight access nodes $17_1$-$17_8$ and server nodes 12 supported by each of the access nodes.

As shown in FIG. 7B, SF components 30A-30H and SX components 32A-32H of access nodes 17 within logical rack 60 have full mesh connectivity in that each SF component 30 is connected to all of the SX components 32 of the eight access nodes 17 within logical rack 60. As described above, the eight access nodes 17 within logical rack 60 may be connected to each other by an 8-way mesh of electrical Ethernet connections. In the case of FCP traffic, SF components 30 of access nodes 17 within logical rack 60 apply spraying algorithms to spray packets for any given packet flow across all available links to SX components 32. In this way, SF components 30 need not necessarily perform a full lookup operation for L2/L3 switching of outbound packets of packet flows originating from servers 12. In other words, packets for a given packet flow may be received by an SF component 30, such as SF component 30A, and sprayed across some or all of the links to SX components 32 for the logical rack 60. In this way, access nodes 17 for a logical rack achieve a first-level fan out of, in this example, 1:8 and may do so, in some examples, without incurring any L2/L3 forwarding lookup relative to keying information in the packet headers. As such, packets for a single packet flow need not follow the same path when sprayed by a given SF component 30.

Thus, according to the disclosed techniques, upon receiving source traffic from one of servers 12, SF component 30A implemented by access node $17_1$, for example, performs an 8-way spray of packets of the same flow across all available links to SX components 32 implemented by access nodes 17 included in logical rack 60. More specifically, SF component 30A sprays across one internal SX component 32A of the same access node $17_1$ and seven external SX components 32B-32H of the other access nodes $17_2$-$17_8$ within logical rack 60. In some implementations, this 8-way spray between SFs 30 and SXs 32 within logical rack 60 may be referred to as a first-stage spray. As described in other portions of this disclosure, a second-stage spray may be performed over a second-level network fanout within the switch fabric between access nodes 17 and core switches 22. For example, the second-stage spray may be performed through an intermediate device, such as a TOR Ethernet switch, an electric permutation device, or an optical permutation device, described in more detail below with respect to FIGS. 9-19.

In some examples, as described in more detail above, the first four access nodes $17_1$-$17_4$ may be included in a first access node group $19_1$ and the second four access nodes $17_4$-$17_8$ may be included in a second access node group $19_2$. The access nodes 17 within the first and second access node groups 19 may be connected to each other via a full-mesh in order to allow the 8-way spray between SFs 30 and SXs 32 within logical rack 60. In some examples, logical rack 60 including the two access nodes groups together with their supported servers 12 may be referred to as a half-rack or a half physical rack. In other examples, more or fewer access nodes may be connected together using full-mesh connectivity. In one example, sixteen access nodes 17 may be connected together in a full-mesh to enable a first-stage 16-way spray within a full physical rack.

Figure 8:
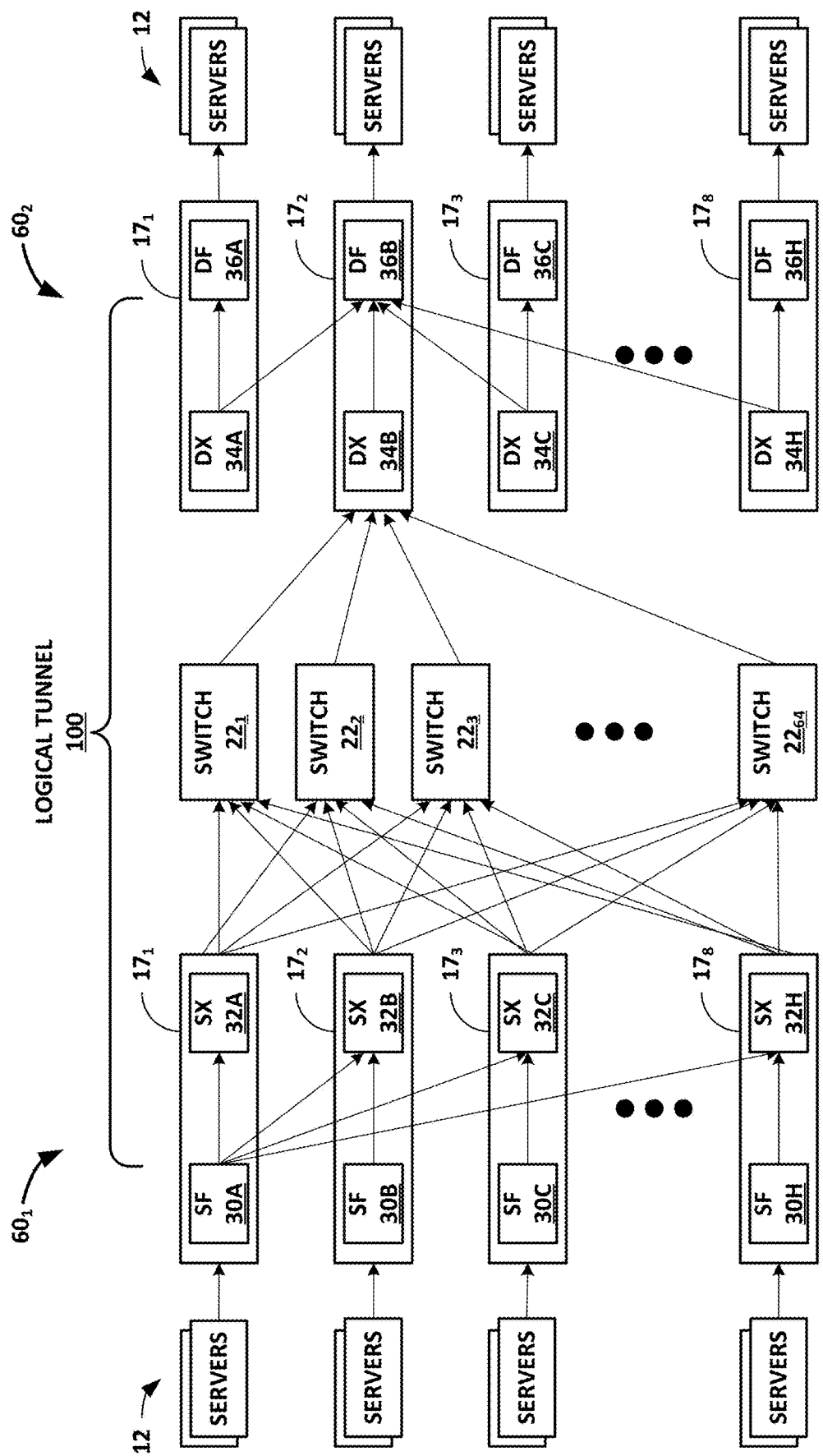
FIG. 8 is a block diagram illustrating an example multi-level network fanout across a data center switch fabric between access nodes.

FIG. 8 is a block diagram illustrating an example multi-level network fanout across a data center switch fabric between access nodes 17. In the illustrated example of FIG. 8, each of the logical racks 60 includes eight access nodes $17_1$-$17_8$ and server nodes 12 supported by each of the access nodes. The first logical rack $60_1$ is connected to the second logical rack $60_2$ through core switches 22 within the switch fabric. In some examples, the first logical rack $60_1$ and the second logical rack $60_2$ may be the same logical rack.

According to the disclosed techniques, the switch fabric comprises a FCP fabric. The FCP fabric may be visualized as including multiple channels, e.g., a request channel, a grant channel, a FCP data channel and a non-FCP data channel. As illustrated in FIG. 8, the FCP data channel carries data packets via a logical tunnel 100 that includes all paths between a source node, e.g., SF component 30A of access node $17_1$, in a first logical rack $60_1$ and a destination node, e.g., DF component 36B of access node $17_2$, in a second logical rack $60_2$. The FCP data channel carries the data packets using the FCP protocol. The FCP packets are sprayed over the fabric from the source node to the destination node through a suitable load balancing scheme. The FCP packets are not expected to be delivered in order, but the destination node is expected to perform packet reordering. For example, packets of a traffic flow received from a source server 12 by SF component 30A of access node $17_1$ may be sprayed over some or all possible links within logical tunnel 100 toward DF component 36B of access node $17_2$. DF component 36B is configured to reorder the received packets to recreate the packet flow prior to transmitting the packet flow to the destination server 12.

The request channel within the FCP fabric may be used to carry FCP request messages from the source node to the destination node. Similar to the FCP data packets, the FCP request messages may be sprayed over all available paths toward the destination node, but the request messages do not need to be reordered. In response, the grant channel within the FCP fabric may be used to carry FCP grant messages from the destination node to source node. The FCP grant messages may also be sprayed over all available paths toward the source node, and the grant messages do not need to be reordered. The non-FCP data channel within the FCP fabric carries data packets that do not use the FCP protocol. The non-FCP data packets may be forwarded or routed using ECMP based load balancing, and, for a given flow identified by a five tuple, the packets are expected to be delivered in order to the destination node.

The example of FIG. 8 illustrates both the first-level network fanout between the access nodes 17 within first logical rack $60_1$, as described above with respect to FIG. 7B, and a second-level network fanout between the access nodes 17 and the core switches 22. As described above with respect to FIGS. 3-4, the eight access nodes 17 within first logical rack $60_1$ are connected to core switches 22 using either electrical or optical Ethernet connections. The eight access nodes 17 within second logical rack $60_2$ are similarly connected to the core switches 22. In some examples, each of access nodes 17 may connect to eight of core switches 22. In the case of FCP traffic, SX components 32 of access nodes 17 within first logical rack $60_1$ apply spraying algorithms to spray packets for any given packet flow across all available paths to the core switches 22. In this way, the SX components 32 may not perform a full lookup operation for L2/L3 switching of received packets.

Upon receiving source FCP traffic from one of the servers 12, an SF component 30A of access node $17_1$ in the first logical rack $60_1$ performs an 8-way spray of packets of the FCP traffic flow across all available paths to SX components 32 implemented by the access nodes 17 in the first logical rack $60_1$. As further illustrated in FIG. 8, each of the SX components 32 then sprays the packets of the FCP traffic flow across all available paths to the core switches 22. In the illustrated example, the multi-level fanout is 8-by-8 and, therefore, supports up to sixty-four core switches $22_1$-$22_{64}$. In other examples, in which the first-level fanout is 1:16 within a full physical rack, the multi-level fanout may be 16-by16 and support up to 256 core switches.

Although illustrated in FIG. 8 as occurring directly between the access nodes 17 and the core switches 22, the second-level fanout may be performed through one or more TOR devices, such as top of rack Ethernet switches, optical permutation devices, or electrical permutation devices. Optical permutation devices are described in more detail below with respect to FIGS. 9-19. The multi-level network fanout enables packets of a traffic flow received at any of the access nodes 17 within the first logical rack $60_1$ to reach core switches 22 for further forwarding to any of the access nodes 17 within the second logical rack $60_2$.

According to the disclosed techniques, in one example implementation, each of SF components 30 and SX components 32 uses an FCP spray engine configured to apply a suitable load balancing scheme to spray the packets of a given FCP packet flow across all available links to a destination node. For example, the FCP spray engine may track a number of bytes transmitted on each link in order to select a least loaded link on which to forward a packet. In addition, the FCP spray engine may track link failures downstream to provide flow fairness by spraying packets in proportion to bandwidth weight on each active link. In this way, the spray of packets may not be uniform across the available links toward the destination node, but bandwidth will be balanced across the active links even over relatively short periods.

In this example, the source node, e.g., SF component 30A of access node $17_1$, within first logical rack $60_1$ sends a request message to the destination node, e.g., DF component 36B of access node $17_2$, within second logical rack $60_2$ requesting a certain weight or bandwidth and the destination node sends a grant message to the source node after reserving the egress bandwidth. The source node also determines whether any link failures have occurred between core switches 22 and logical rack $60_2$ that includes the destination node. The source node may then use all active links in proportion to the source and destination bandwidths. As an example, assume there are N links between the source node and the destination node each with source bandwidth $Sb_i$ and destination bandwidth $Db_i$, where i=1 . . . N. The actual bandwidth from the source nodes to the destination node is equal to min(Sb, Db) determined on a link-by-link basis in order to take failures into account. More specifically, the source bandwidth (Sb) is equal to $\Sigma_{i=1}^{N} Sb_i$, and destination bandwidth (Db) is equal to $\Sigma_{i=1}^{N} Db_i$, and the bandwidth ($b_i$) of each link is equal to min($Sb_i$, $Db_i$). The weight of the bandwidth used on each link is equal to $b_i/\Sigma_{i=1}^{N} b_i$.

In the case of FCP traffic, SF components 30 and SX components 32 use the FCP spray engine to distribute packets of the FCP traffic flow based on the load on each link toward the destination node, proportion to its weight. The spray engine maintains credit memory to keep track of credits (i.e., available bandwidth) per nexthop member link, uses packet length included in an FCP header to deduct credits (i.e., reduce available bandwidth), and associates a given packet to one of the active links having the most credits (i.e., the least loaded link). In this way, for FCP packets, the SF components 30 and SX components 32 spray packets across member links of a nexthop for a destination node in proportion to the member links' bandwidth weights.

Core switches 22 operate as the single hop along logical tunnel 100 between the source node, e.g., SF component 30A of access node $17_1$, in first logical rack $60_1$ and the destination node, e.g., DF component 36B of access node $17_2$, in the second logical rack $60_2$. Core switches 22 perform a full lookup operation for L2/L3 switching of the received packets. In this way, core switches 22 may forward all the packets for the same traffic flow toward the destination node, e.g., DF component 36B of access node $17_2$, in the second logical rack $60_2$ that supports the destination server 12. Although illustrated in FIG. 8 as occurring directly between the core switches 22 and destination access node $17_2$ of second logical rack $60_2$, the core switches 22 may forward all the packets for the same traffic flow to an intermediate TOR device that has connectivity to the destination node. In some examples, the intermediate TOR device may forward all the packet for the traffic flow directly to DX component 34B implemented by access node $17_2$ of second logical rack $60_2$. In other examples, the intermediate TOR device may be an optical or electrical permutation device configured to provide another fanout over which the packets can be sprayed between input and output ports of the permutation device. In this example, all or some portion of the DX components 34 of access nodes 17 of second logical rack $60_2$ may receive sprayed packets of the same traffic flow.

DX components 34 and DF components 36 of access nodes 17 within second logical rack $60_2$ also have full mesh connectivity in that each DX component 34 is connected to all of the DF components 36 within second logical rack $60_2$. When any of DX components 34 receive the packets of the traffic flow from core switches 22, the DX components 34 forward the packets on a direct path to DF component 36B of access node $17_2$. DF component 36B may perform a limited lookup necessary only to select the proper output port for forwarding the packets to the destination server 12. In response to receiving the packets of the traffic flow, DF component 36B of access node $17_2$ within second logical rack $60_2$ reorders the packets of the traffic flow based on sequence numbers of the packets. As such, with respect to full routing tables for the data center, only the core switches 22 may need to perform full lookup operations. Thus, the switch fabric provides a highly-scalable, flat, high-speed interconnect in which servers are effectively one L2/L3 hop from any other server 12 within the data center.

A brief description of FCP and one example of its operation with respect to FIG. 8 is included here. In the example of FIG. 8, access nodes 17 are fabric end points (FEPs) to the FCP fabric, which is made up of switching elements, e.g., core switches 22, arranged in a leaf-spine topology. The FPC fabric allows one access node 17 to communicate with another one through multiple paths. Core switches 22 inside the FCP fabric have shallow packet buffers. The cross-sectional bandwidth of the FCP fabric is equal to or greater than the sum of all end point bandwidths. In this way, if each access node 17 limits the incoming data rate to the FCP fabric, none of the paths inside the FCP fabric should be congested long term with very high probability.

As described above, FCP data packets are sent from a source node, e.g., SF component 30A of access node $17_1$ within first logical rack $60_1$, to a destination node, e.g., DF component 36B of access node $17_2$ within second logical rack $60_2$, via logical tunnel 100. Before any traffic is sent over tunnel 100 using FCP, the connection must be established between the end points. A control plane protocol executed by access nodes 17 may be used to set up a pair of tunnels, one in each direction, between the two FCP end points. The FCP tunnels are optionally secured (e.g., encrypted and authenticated). Tunnel 100 is considered to be unidirectional from the source node to the destination node, and a FCP partner tunnel may be established in the other direction from the destination node to the source node. The control plane protocol negotiates the capabilities (e.g., block size, MTU size, etc.) of both end points, and establishes the FCP connection between the end points by setting up tunnel 100 and its partner tunnel and an initializing queue state context for each tunnel.

Each of the end points is assigned a source tunnel ID and a corresponding destination tunnel ID. At each end point, a queue ID for a given tunnel queue is derived based on the assigned tunnel ID and priority. For example, each FCP end point may allocate a local tunnel handle from a pool of handles and communicate the handle to its FCP connection partner end point. The FCP partner tunnel handle is stored in a lookup table and referenced from the local tunnel handle. For the source end point, e.g., access node $17_1$ within first logical rack $60_1$, a source queue is identified by the local tunnel ID and priority, and a destination tunnel ID is identified from the lookup table based on the local tunnel ID. Similarly, for the destination end point, e.g., access node $17_2$ within second logical rack $60_2$, a destination queue is identified by the local tunnel ID and priority, and a source tunnel ID is identified from the lookup table based on the local tunnel ID.

FCP tunnel queues are defined as buckets of independent traffic streams that use FCP to transport payload across the FCP fabric. An FCP queue for a given tunnel is identified by the tunnel ID and priority, and the tunnel ID is identified by the source/destination end point pair for the given tunnel. Alternatively, the end points may use a mapping table to derive the tunnel ID and priority based on an internal FCP queue ID for the given tunnel. In some examples, an FCP fabric tunnel, e.g., logical tunnel 100, may support 1, 2, 4, or 8 queues per tunnel. The number of queues per tunnel is a FCP fabric property and may be configured at the time of deployment. All tunnels within the FCP fabric may support the same number of queues per tunnel. Each end point may support a maximum of 16,000 queues.

When the source node is communicating with the destination node, the source node encapsulates the packets using an FCP over UDP encapsulation. The FCP header carries fields identifying tunnel IDs, queue IDs, packet sequence numbers (PSNs) for packets, and request, grant, and data block sequence numbers between the two end points. At the destination node, the incoming tunnel ID is unique for all packets from the specific source node. The tunnel encapsulation carries the packet forwarding as well as the reordering information used by the destination node. A single tunnel carries packets for one or multiple queues between the source and destination nodes. Only the packets within the single tunnel are reordered based on sequence number tags that span across the queues of the same tunnel. The source node tags the packets with tunnel PSNs when they are sent over the tunnel toward the destination node. The destination node reorders the packets based on the tunnel ID and the PSNs. At the end of the reorder, the destination node strips the tunnel encapsulation and forwards the packets to the respective destination queues.

An example of how an IP packet entering FCP tunnel 100 at a source end point is transmitted to a destination end point is described here. A source server 12 having an IP address of A0 sends an IP packet for a destination server 12 having an IP address of B0. The source FCP endpoint, e.g., access node $17_1$ within first logical rack $60_1$, transmits an FCP request packet with source IP address A and destination IP address B. The FCP request packet has an FCP header to carry the Request Block Number (RBN) and other fields. The FCP request packet is transmitted over UDP over IP. The destination FCP end point, e.g., access node $17_2$ within first logical rack $60_2$, sends a FCP grant packet back to the source FCP end point. The FCP grant packet has an FCP header to carry the Grant Block Number (GBN) and other fields. The FCP grant packet is transmitted over UDP over IP. The source end point transmits the FCP data packet after receiving the FCP grant packet. The source end point appends a new (IP+UDP+FCP) data header on the input data packet. The destination end point removes the append (IP+UDP+FCP) data header before delivering the packet to the destination host server.

Figure 9:
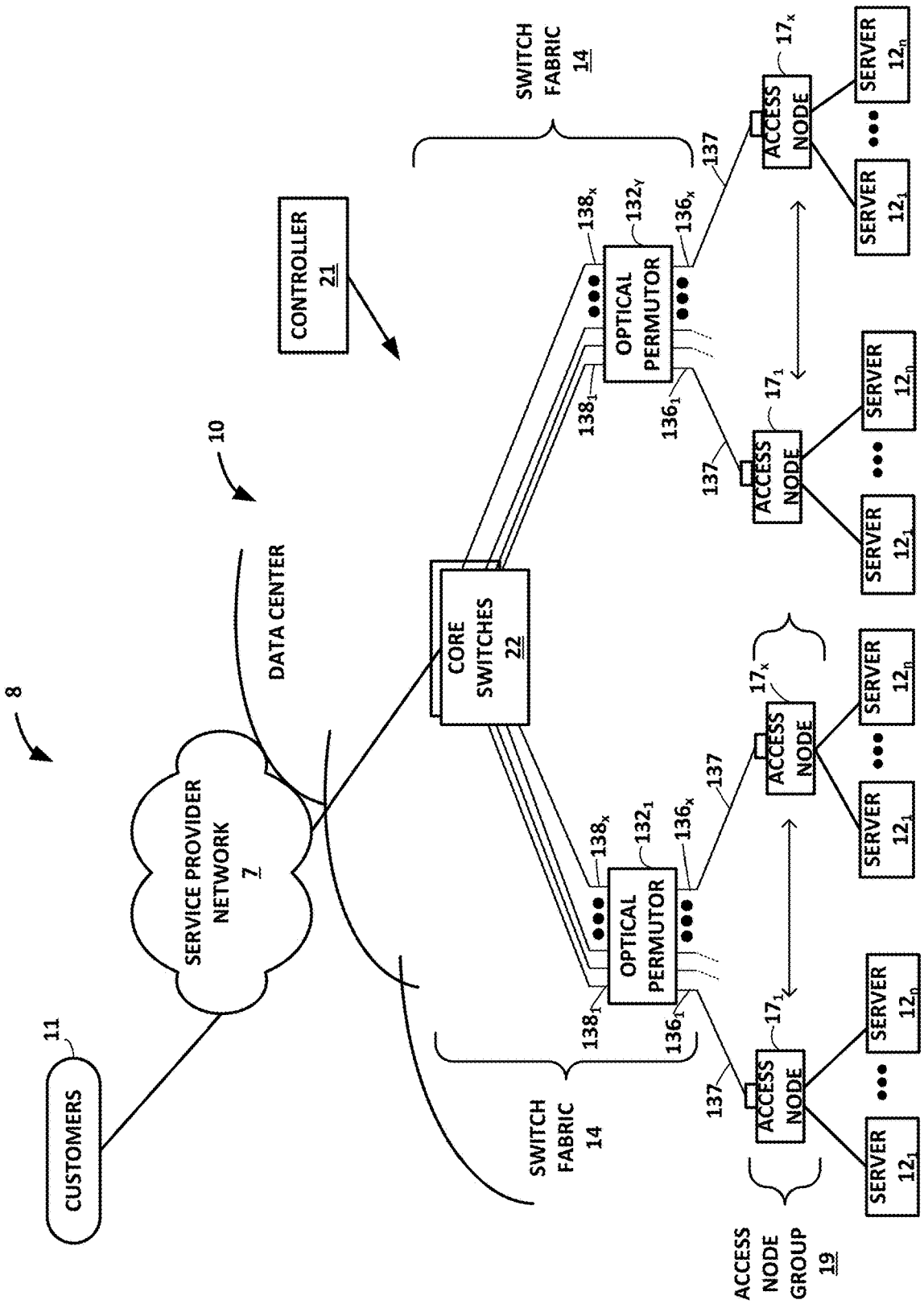
FIG. 9 is a block diagram illustrating, in further detail, one example of the network of FIG. 1.

FIG. 9 is a block diagram illustrating, in further detail, one example of network 10 of FIG. 1. In the example of FIG. 9, switch fabric 14 includes a set of optical permutors $132_1$-$132_Y$ (herein, "optical permutors 132"), also referred to as optical permutation devices, connected to a set of core packet-based switches 22 that collectively provide full mesh point-to-point connectivity between servers 12. As further explained, optical permutors 132 are optical interconnect devices that transport optical signals between access nodes 17 and core switches 22 by utilizing wavelength division multiplexing such that communications for servers 12 of the same server group may be conveyed through a common optical fiber 22. For example, each access node 17 may utilize different wavelengths for conveying communications for servers 12 of the same server group. In the example of in FIG. 9, each optical permutor 132 includes a set of edge-facing optical interfaces $136_1$-$136_x$ for optical communication with a respective group of access nodes $17_1$-$17_x$ and a set of core-facing optical interfaces $138_1$-$138_x$ for communicating with core switches 22. Although each optical permutor 132 is illustrated in FIG. 9 as including the same number, x, of access nodes 17 and edge-facing optical interfaces 136, in other examples each optical permutor 132 may include optical interfaces 136 that are each capable of coupling to more than one optical fiber 22. In this other example, each optical permutor 132 may include a set of edge-facing optical interfaces $136_1$-$136_x$ for optical communication with an integer multiple of x, e.g., 2×, 3×, or 4×, of access nodes 17.

Furthermore, as described herein, each optical permutor 132 is configured such that optical communications received from downstream ports on each of several wavelengths 136 are "permuted" across upstream ports 138 based on wavelength so as to provide full-mesh connectivity between the upstream and downstream ports without any optical interference. That is, each optical permutor 132 is configured to ensure that optical communications received from any one of downstream servers 12 can be directed to any upstream-facing optical ports 138 without optical interference with any simultaneous communications from any other server 12. Moreover, optical permutors 132 may be bi-directional, i.e., similarly configured to permute communications from upstream ports 138 across downstream ports 136 such that no optical interference occurs on any of the downstream ports. In this way, optical permutors 132 provide bi-directional, full-mesh point-to-point connectivity for transporting communications for servers 12 to/from core switches 22 at the granularity of individual wavelengths.

For example, optical permutor $132_1$ is configured to optically direct optical communications from downstream-facing ports $136_1$-$136_x$ out upstream-facing ports $138_1$-$138_x$ such that each upstream port 138 carries a different one of the possible unique permutations of the combinations of downstream-facing ports 136 and the optical frequencies carried by those ports, where no single upstream-facing port 138 carries communications from servers 12 associated with the same wavelength. As such, in this example, each upstream-facing port 138 carries a non-interfering wavelength from each of the downstream facing ports 136, thus allowing a full mesh of communication. In FIG. 9, each of the downstream-facing optical ports 136 of each optical permutor 132 receives an optical signal carrying, in this example, up to N wavelengths for up to N servers of a server group. As one example, port $136_1$ of optical permutor $132_1$ may receive an optical signal from access node $17_1$, carrying communications as N different wavelengths carried in one or more optical fibers. Each wavelength carries communications associated with all of the servers 12 of the server group coupled to access node $17_1$ as well as servers attached to other access nodes in the same access group node as access node $17_1$. Optical permutor $132_1$ directs the optical communications from downstream-facing ports 136 to upstream-facing ports 138 such that each upstream-facing port 138 carries a different unique permutation of the optical frequencies/down-stream port combinations and where no upstream-facing port 138 carries communications from servers 12 associated with the same wavelength. Moreover, optical permutor $132_1$ may similarly be configured in a bi-directional manner to permute communications from upstream-facing ports $138_1$-$138_x$ across downstream-facing ports $136_1$-$136_x$ and so that no downstream-facing port 136 carries communications associated with the same wavelength, thereby providing full bi-directional, full-mesh point-to-point connectivity for transporting communications for servers 12 to/from core switches 22.

In this way, switch fabric 14 may provide full mesh interconnectivity such that any of servers 12 may communicate packet data to any other of the servers 12 using any of a number of parallel data paths. Moreover, according to the techniques described herein, switch fabric 14 may be configured and arranged in a way such that the parallel data paths in switch fabric 14 provides single L2/L3 hop, full mesh interconnections (bipartite graph) between servers 12, even in massive data centers having hundreds of thousands of servers. In some example implementations, each access node 17 may logically be connected to each core switch 22 and, therefore, have multiple parallel data paths for reaching any given other access node and the servers 12 reachable through those access nodes. As such, in this example, for M core switches 22, M possible data paths exist between each access node 17. Each access node 17 may be viewed as effectively directly connected to each core switch 22 (even though it is connected through an optical permutor) and thus any access node sourcing traffic into switch fabric 14 may reach any other access node 17 by a single, one-hop L3 lookup by an intermediate device (core switch).

Further example details of optical permutors are described in U.S. Provisional Appl. No. 62/478,414, filed Mar. 29, 2017, entitled "NON-BLOCKING, FULL-MESH DATA CENTER NETWORK HAVING OPTICAL PERMUTORS," the entire contents of which are incorporated herein by reference.

Figure 10:
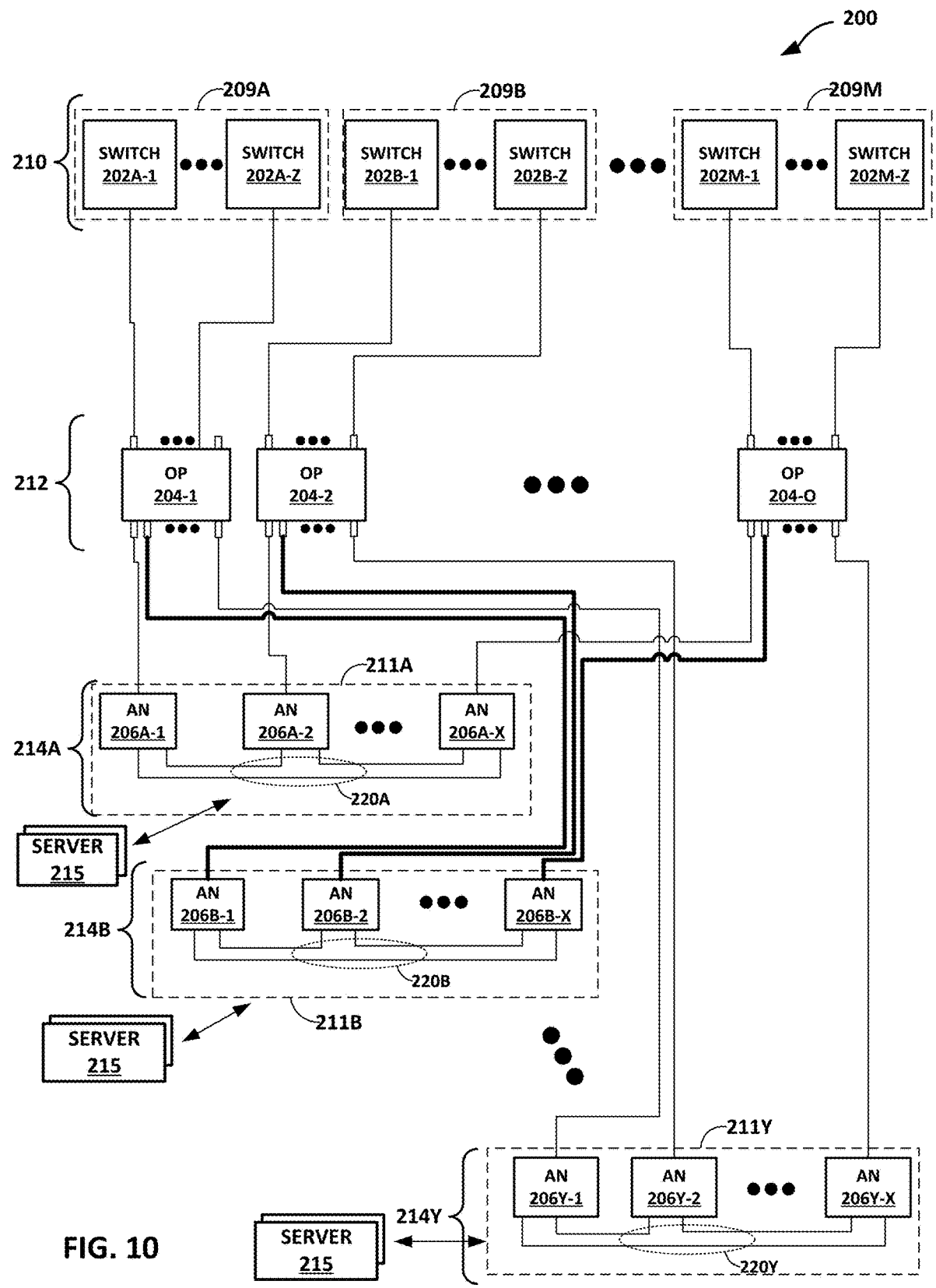
FIG. 10 is a block diagram illustrating a more detailed example implementation of a network in which a set of access nodes and optical permutors are utilized to interconnect endpoints in a full mesh network in which each access node is logically connected to each of M groups of core switches.

FIG. 10 is a block diagram illustrating a more detailed example implementation of a network 200 in which a set of access nodes 206 and optical permutors 204 are utilized to interconnect endpoints in a full mesh network in which each access node 206 is logically connected to each of M groups of core switches 209. As shown in this example, each server 215 communicates data to any other server via a set of parallel data paths, as described herein. Network 200 may be located within a data center that provides an operating environment for applications and services for customers coupled to the data center, e.g., by a content/service provider network (not shown), such as content/service provider network 7 of FIGS. 1 and 9. In some examples, a content/service provider network that couples customers to the data center may be coupled to one or more networks administered by other providers, and may thus form part of a large-scale public network infrastructure, e.g., the Internet.

In this example, network 200 represents a multi-tier network having M groups of Z physical network core switches 202A-1-202M-Z (collectively, "switches 202") that are optically interconnected to O optical permutors 204-1-204-O (collectively, "OPs 204"), which in turn interconnect endpoints (e.g., servers 215) via Y groups of X access nodes 206A-1-206Y-X (collectively, "ANs 206"). Endpoints (e.g., servers 215) may include storage systems, application servers, compute servers, and network appliances such as firewalls and or gateways.

In the example of FIG. 10, network 200 includes three tiers: a switching tier 210 including switches 202, a permutation tier 212 including OPs 204, and an access tier 214A-214Y (herein, "access tier 214") including access nodes 206. Switching tier 210 represents a set of switches 202, such as core switches 22 of FIG. 9, and typically includes one or more high-speed core Ethernet switches interconnected in a switching topology to provide layer 2/layer 3 packet switching for packets received on optical links from optical permutors 204 and forwarded by the switch fabric on optical links to optical permutors 204. Switching tier 210 may alternatively be referred to as a core switch tier/layer or a spine switch tier/layer.

Each optical permutor from OPs 204 receives light at a set of wavelengths from each of a set of multiple optical fibers coupled to the optical permutor and redistributes and outputs the wavelengths among each of another set of multiple optical fibers optically coupled to the optical permutor. Each optical permutor 204 may simultaneously input wavelengths from access nodes 206 for output to switches 202 and input wavelengths from switches 202 for output to access nodes 206.

In the example of FIG. 10, network 200 includes Z*M switches 202, O optical permutors 204, and Y*X access nodes 206. Access nodes 206 may represent examples of any host network accelerators (HNAs) or other similar interface devices, card or virtual device (e.g., router) for interfacing to optical permutors as described in this disclosure. Optical permutors 204 may represent examples of any optical permutor described in this disclosure.

Network 200 may interconnect endpoints using one or more switching architectures, such as multi-tier multi-chassis link aggregation group (MC-LAG), virtual overlays, and IP fabric architectures. Each of switches 202 may represent a layer 2/layer 3 (e.g., Ethernet/IP) switch that participates in the one or more switching architectures configured for network 200 to provide point-to-point connectivity between pairs of access nodes 206. In the case of an IP fabric, each of switches 202 and access nodes 206 may execute a layer 3 routing protocol (e.g., BGP and/or OSPF) to exchange routes for subnets behind each of the access nodes 206.

In the example of FIG. 10, switches 202 are arranged into M groups 209A-209M (collectively, "groups 209") of Z switches. Each of groups 209 has a set of switches 202 that are each optically coupled to a same optical permutor 204 via a respective optical fiber. Put another way, each of optical permutors 204 is optically coupled to switches 202 of one of groups 209. For example, group 209A includes switches 202A-1-202A-Z optically coupled to respective optical ports of optical permutor 204-1. As another example, group 209B includes switches 202B-1-202B-Z optically coupled to respective ports of optical permutor 204-2.

Each of access nodes 206 includes at least one optical interface to couple to a port of one of optical permutors 204. For example, access node 206A-1 is optically coupled to a port of optical permutor 204-1. As another example, access node 206A-2 is optically coupled to a port of optical permutor 204-2. In the example of FIG. 10, access nodes 206 are grouped into Y groups 211A-211Y (collectively, "groups 211") of X access nodes. Each of groups 211 has at least one access node 206 optically coupled to each of the O optical permutors 204. For example, group 211A has access node 206A-1 optically coupled to optical permutor 204-1, access node 206A-2 optically coupled to optical permutor 204-2, and so on through access node 206A-X optically coupled to optical permutor 204-O. As a consequence of this topology, each of groups 211 of access nodes for servers 215 has at least one optical coupling to each of optical permutors 204 and, by extension due to operation of optical permutors 204, has at least one optical coupling to each of switches 202.

In the example of FIG. 10, groups 211 of access nodes 206 include respective full meshes 220A-220Y of connections to connect access nodes 206 of each group pair-wise (point-to-point). Group 211A of access nodes 206A-1-206A-X, for instance, includes full mesh 220A of [X*(X−1)]/2 point-to-point connections so as to provide full connectivity between servers 215 and access nodes 206 for a given group of access nodes to which the servers connect. Put another way, with full mesh 220A, each access node in group 211A includes at least one point-to-point connection to source switching components and destination switching components in every other access node in group 211A, thereby allowing communications to or from switching tier 210 to fan-out/fan-in through the access nodes so as to originate from or be delivered to any of the servers 215 via a set of parallel data paths. Connections of full mesh 220A may represent Ethernet connections, optical connections or the like.

Full mesh 220A of group 211A enables each pair of access nodes 206A-1-206A-X ("access nodes 206A") to communicate directly with one another. Each of access nodes 206A may therefore reach each of optical permutors 204 either directly (via a direct optical coupling, e.g., access node 206A-1 with optical permutor 204-1) or indirectly via another of access nodes 206A. For instance, access node 206A-1 may reach optical permutor 204-O (and, by extension due to operation of optical permutor 204-O, switches 202M-1-202M-Z) via access node 206A-X. Access node 206A-1 may reach other optical permutors 204 via other access nodes 206A. Each of access nodes 206A therefore has point-to-point connectivity with each of switch groups 209. Access nodes 206 of groups 211B-211Y have similar topologies to access nodes 206A of group 211A. As a result of the techniques of this disclosure, therefore, each of access nodes 206 has point-to-point connectivity with each of switch groups 209.

The wavelength permutation performed by each of optical permutors 204 of permutation layer 212 may reduce a number of electrical switching operations required to perform layer 2 forwarding or layer 2/layer 3 forwarding of packets among pairs of access nodes 206. For example, access node 206A-1 may receive outbound packet data from a locally-coupled server 215 and that is destined for an endpoint associated with access node 206Y-1. Access node 206A-1 may select a particular transport wavelength on which to transmit the data on the optical link coupled to optical permutor 204-1, where the selected transport wavelength is permuted by optical permutor 204-1 as described herein for output on a particular optical link coupled to a switch of switching tier 210, where the switch is further coupled by another optical link to optical permutor 204-O. As a result, the switch may convert the optical signal of the selected transport wavelength carrying the data to an electrical signal and layer 2 or layer 2/layer 3 forward the data to the optical interface for optical permutor 204-O, which converts the electrical signal for the data to an optical signal for a transport wavelength that is permuted by optical permutor 204-O to access node 206Y-1. In this way, access node 206A-1 may transmit data to any other access node, such as access node 206Y-1, via network 200 with as few as a single intermediate electrical switching operation by switching tier 210.

Figure 11:
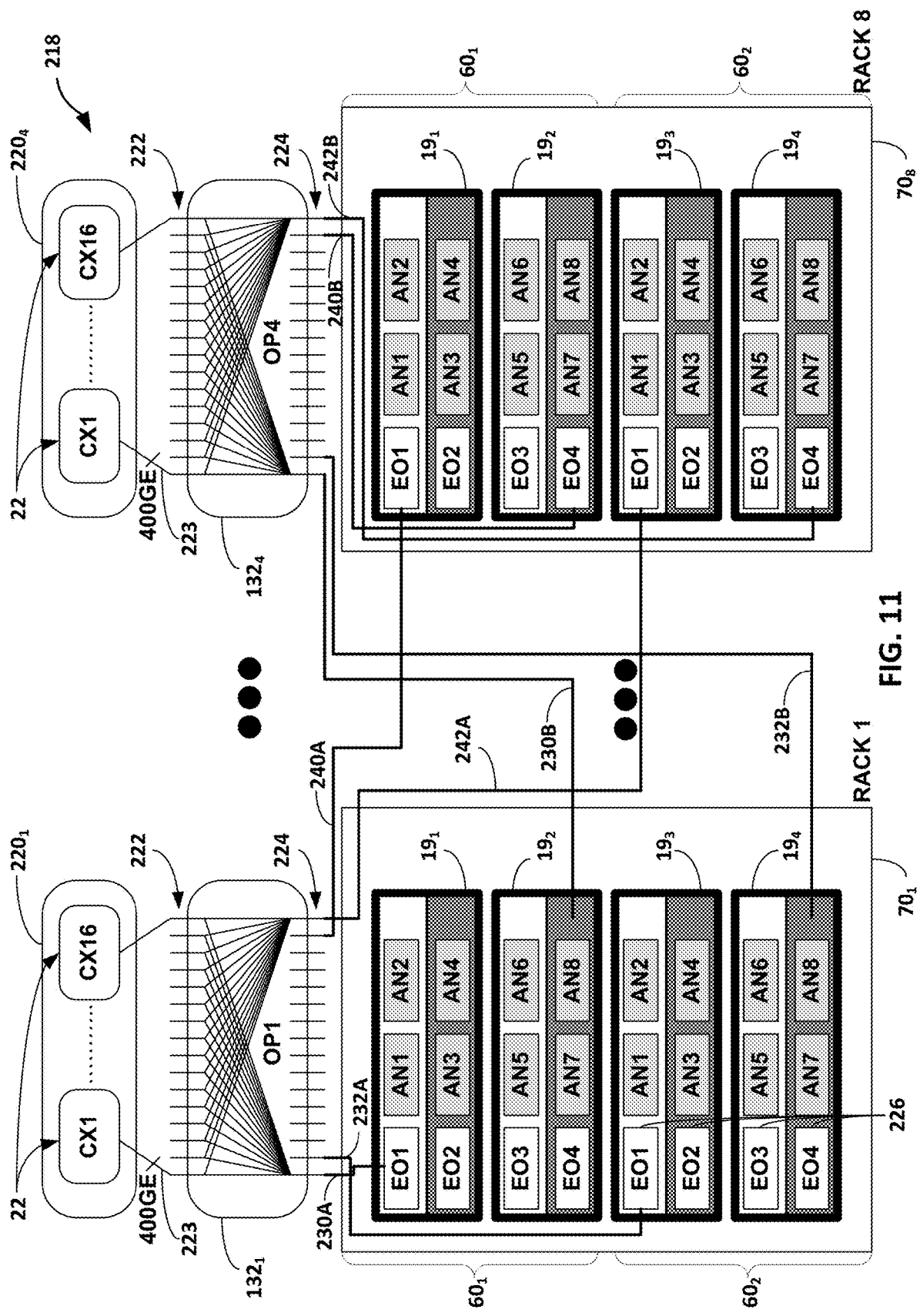
FIG. 11 is a conceptual diagram illustrating an example network cluster architecture in which eight physical racks are interconnected via four optical permutors and four switch groups.

FIG. 11 is a conceptual diagram illustrating an example network cluster architecture 218 in which eight physical racks $70_1$-$70_8$ are interconnected via four optical permutors $132_1$-$132_4$ and four switch groups $220_1$-$220_4$ each containing 16 core switches in this example. As illustrated in FIG. 11, each of physical racks 70 includes a first logical rack $60_1$ with first access node groups $19_1$ and second access node group $19_2$, and a second logical rack $60_2$ with third access node group $19_3$ and fourth access node group $19_4$. The servers 52 supported by access node groups 19 are not shown within logical racks 60 for ease of illustration. In the example network cluster architecture 218, four of physical racks 70 may include optical permutors 132 as TOR devices 72, as illustrated in FIG. 6, and the other four physical racks 70 may not include optical permutors.

In the example of FIG. 11, each of logical racks 60 includes eight access nodes AN1-AN8, with four of the access nodes included in each of the two access node groups 19 of the logical rack. Access nodes AN1-AN8 may be substantially similar to access nodes 17 described above. In addition, each of logical racks 60 includes four electro-optical circuits EO1-EO4 226, with two of the electro-optical circuits arranged in each of the two access node groups 19 of the logical rack. Although illustrated with each access node group 19 having two of electro-optical circuits 226, in other examples, each access node group 19 may include a single electro-optical circuit shared by the four access nodes 17 in the access node group 19, or four electro-optical circuits with one for each of the four access nodes 17 in the access node group 19.

In the example of FIG. 11, each of optical permutors 132 has sixteen downstream-facing ports 224 to connect to the sixteen logical racks 60 of the eight physical racks 70. In the example network cluster architecture of FIG. 11, each of logical racks 60 across the eight physical racks 70 are optically coupled to each of the four optical permutors 132 via a respective optical cable. For example, logical rack $60_1$ of rack $70_1$ is optically coupled to optical permutor $132_1$ via optical cable 230A, and is also coupled to optical permutor $132_4$ via optical cable 230B. Logical rack $60_2$ of rack $70_1$ is optically coupled to optical permutor $132_1$ via optical cable 232A, and is also coupled to optical permutor $132_4$ via optical cable 232B. Logical rack $60_1$ of rack $70_8$ is optically coupled to optical permutor $132_1$ via optical cable 240A, and is also coupled to optical permutor $132_4$ via optical cable 240B. Furthermore, logical rack $60_2$ of rack $70_8$ is optically coupled to optical permutor $132_1$ via optical cable 242A, and is also coupled to optical permutor $132_4$ via optical cable 242B. In this way, logical racks 60 have full mesh connectivity to optical permutors 132.

As illustrated, the optical cables connect to the respective logical racks 60 via electro-optical circuits 226. Each logical rack 60 thus has four optical ports, one for each of electro-optical circuits 226. Electro-optical circuits 226 convert electrical signals into optical signals and convert optical signals into electrical signals. For example, in logical rack $60_1$ of rack $70_1$, EO1 may convert electrical signals from AN1 and AN2 of access node group $19_1$ into optical signals for transmission over optical cable 230A to optical permutor $132_1$. Although not fully illustrated in FIG. 11, each of the four ports of a given logical rack 60 will connect to a different one of optical permutors 132. For example, in each logical rack 60, the port associated with EO1 may connect to optical permutor $132_1$, the port associated with EO2 may connect to optical permutor $132_2$, the port associated with EO3 may connect to optical permutor $132_3$, and the port associated with EO4 may connect to optical permutor $132_4$.

As described in detail above, each access node supports 2×100 GE connections toward the switch fabric such that a given logical rack 60 supports 16×100 GE connections from the eight access nodes AN1-AN8. The electro-optical circuits 226 within the given logical rack 60 convert the electrical signals carried on the 16×100 GE connections into optical signals for transmission over 4×400 GE optical cables to the four optical permutors 132. As an example, in logical rack $60_1$ of physical rack $70_1$, AN1 and AN2 together may have 4×100 GE connections for communicating to the switch fabric. Within access node group $19_1$, the 4×100 GE connections are copper links to EO1. In some examples, these copper links may have finer granularity, e.g., 16×25 GE links. Upon converting the electrical signals received on the copper links to optical signals, EO1 sends the converted optical signals over a single 400 GE optical cable 230A to a downstream-facing port 224 of optical permutor $132_1$.

Each of optical permutors 132 also has sixteen upstream-facing ports 222 to connect to sixteen core switches CX1-CX16 22 within a given one of switch groups $220_1$-$220_4$. As described in more detail below with respect to FIGS. 15-19, optical permutors 132 are configured to spray traffic between downstream-facing ports 224 and upstream-facing ports 222. In this way, optical permutor 132 may take the place of an additional leaf layer of electronic switches within the switch fabric.

Each of switch groups $220_1$-$220_4$ has a set of switches 22 that are each optically coupled to a same one of optical permutors $132_1$-$132_4$ via a respective optical cable 223. For example, each of the upstream-facing ports 222 may support a 400 GE optical cable 223 between optical permutor $132_1$ and one of cores switches 22 within switch group $220_1$. Core switches 22 may convert optical signals received on optical cables 223 into electrical signals prior performing full lookup and switching functions on the received traffic. Prior to forwarding the traffic back to the one of optical permutors 132 via optical cables 223, core switches 22 may convert the traffic back into optical signals.

Figure 12:
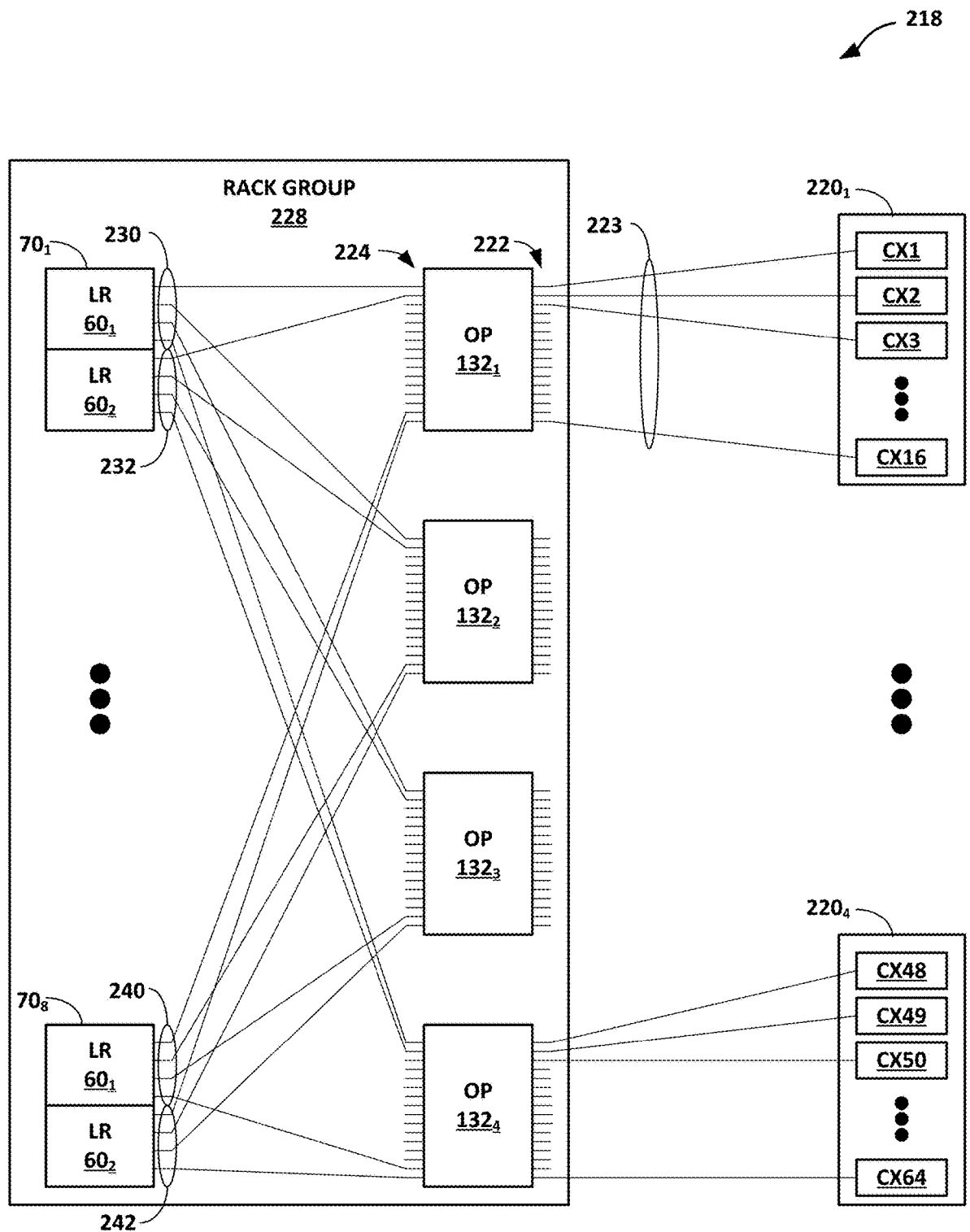
FIG. 12 is a block diagram illustrating the example network cluster architecture from FIG. 11.

FIG. 12 is a block diagram illustrating the example network cluster architecture 218 from FIG. 11. FIG. 12 more fully illustrates the full mesh connectivity between a given logical rack 60 and each of optical permutors 132 within a rack group 228. Rack group 228 includes eight physical racks $70_1$-$70_8$ and four optical permutors $132_1$-$132_4$. Each of physical racks 70 has two logical racks $60_1$-$60_2$ that are connected to the four optical permutors 132 in a full mesh. Each of the four optical permutors 132 is connected to sixteen core switches (CX) within a same one of the four switch groups $220_1$-$220_4$.

In the example of FIG. 12, logical rack $60_1$ of physical rack $70_1$ connects to each of the four optical permutors 132 via four optical cables 230. As illustrated, one of optical cables 230 from logical rack $60_1$ of rack $70_1$ connects to the top downstream-facing port 224 of each of optical permutors $132_1$-$132_4$. Logical rack $60_2$ of rack $70_1$ is also connected to each of the four optical permutors 132 via four optical cables 232. As illustrated, one of optical cables 232 from logical rack $60_2$ of rack $70_1$ connects to the second downstream-facing port 224 of each of optical permutors $132_1$-$132_4$. In this way, each physical rack 70 within rack group 228 has two connections to each of optical permutors 132, one connection from each logical rack 60.

Logical racks 60 of each of the other racks $70_2$-$70_8$ are similarly connected to each of the four optical permutors 132 via optical cables. For example, one of optical cables 240 from logical rack $60_1$ of rack $70_8$ connects to the second-to-last downstream-facing port 224 of each of optical permutors $132_1$-$132_4$, and one of optical cables 242 from logical rack $60_2$ of rack $70_8$ connects to the last downstream-facing port 224 of each of optical permutors $132_1$-$132_4$. Each of the optical cables 230, 232, 240, 242 may be 400 GE optical cables. In some examples, each of the 400 GE optical cables may include four 100 GE optical fibers that each carry multiplexed optical signals having four different wavelengths or lambdas.

As described above, upon receipt of traffic from logical racks 60 on downstream-facing ports 224, optical permutors 132 spray the traffic across all upstream-facing ports 222. Optical permutors 132 then forward the traffic on upstream-facing ports 222 to each of sixteen core switches within a same switch group 220. For example, optical permutor $132_1$ transmits the traffic from each upstream-facing port 222 to one of core switches CX1-CX16 in switch group $220_1$ along optical cables 223. Each of optical cables 223 may be a 400 GE optical cable.

Figure 13:
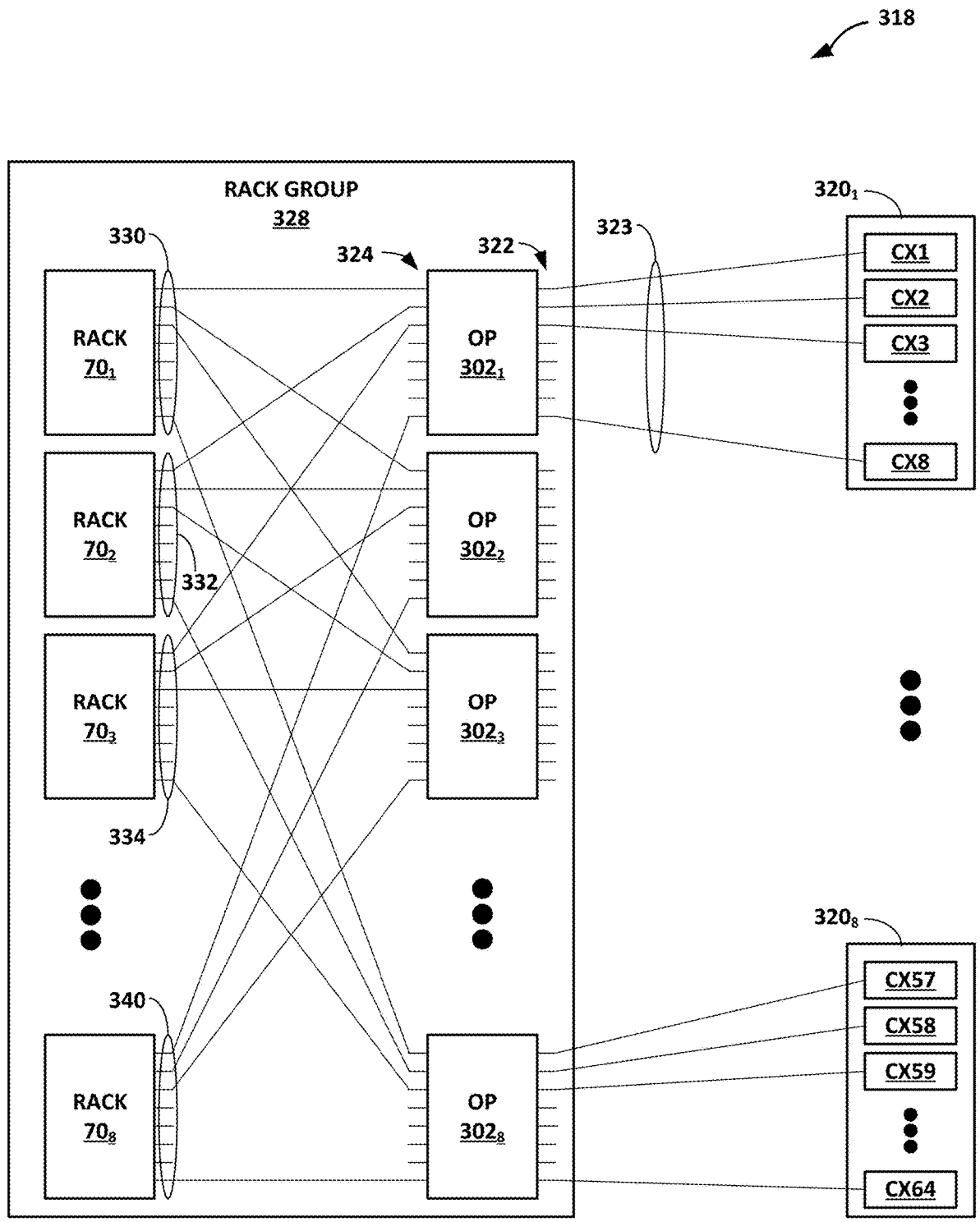
FIG. 13 is a block diagram illustrating another example network cluster architecture in which eight physical racks are interconnected via eight optical permutation devices and eight switch groups.

FIG. 13 is a block diagram illustrating another example network cluster architecture 318 in which eight physical racks $70_1$-$70_8$ are interconnected via eight optical permutation devices $302_1$-$302_8$ and eight switch groups $320_1$-$320_8$. Rack group 328 includes the eight physical racks 70 and the eight optical permutors 302 that are connected in a full 8-way mesh. Each of the four optical permutors 302 is connected to eight core switches (CX) within a same one of the eight switch groups 320.

Optical permutors 302 operate substantially similar to optical permutors 132 described above, but have eight upstream-facing ports 322 and eight downstream-facing ports 324. In the example network cluster architecture 318 of FIG. 13, upstream-facing ports 322 of each of optical permutors 302 connect to eight core switches within a same one of switch groups 320. For example, upstream-facing ports 322 of optical permutor $302_1$ are connected to core switches CX1-CX8 in switch group $320_1$ via optical cables 323. In addition, downstream-facing ports 324 of each of optical permutors 302 connect to each of the eight physical racks 70 in a full mesh.

In the example of FIG. 13, physical rack $70_1$ connects to each of the eight optical permutors 302 via eight optical cables 330. As illustrated, one of optical cables 330 from rack $70_1$ connects to the top downstream-facing port 324 of each of optical permutors $302_1$-$30_8$. The other racks $70_2$-$70_8$ are similarly connected to each of the eight optical permutors 302 via optical cables. For example, one of optical cables 332 from rack $70_2$ connects to the second downstream-facing port 324 of each of optical permutors $302_1$-$302_8$, one of optical cables 334 from rack $70_3$ connects to the third downstream-facing port 324 of each of optical permutors $302_1$-$302_8$, and one of optical cables 340 from rack $70_8$ connects to the last downstream-facing port 324 of each of optical permutors $302_1$-$302_8$.

Each of the optical cables 330, 332, 334, 340 may be 400 GE optical cables. In some examples, each of the 400 GE optical cables may include four 100 GE optical fibers that each carry multiplexed optical signals having four different wavelengths or lambdas. As described in detail above, each physical rack 70 includes four access node groups that each include four access nodes. Each access node supports 2×100 GE connections toward the switch fabric such that a given physical rack 70 supports 32×100 GE connections from the sixteen access nodes. Electro-optical circuits within the given physical rack 70 convert the electrical signals carried on the 32×100 GE connections into optical signals for transmission over 8×400 GE optical cables to the eight optical permutors 302.

As described above, upon receipt of traffic from racks 70 on downstream-facing ports 324, optical permutors 302 spray the traffic across all upstream-facing ports 322. Optical permutors 302 then forward the traffic on upstream-facing ports 322 to each of eight core switches within a same switch group 320. For example, optical permutor $302_1$ transmits the traffic from each upstream-facing port 322 to one of core switches CX1-CX8 in switch group $320_1$ along optical cables 323. Each of optical cables 323 may be a 400 GE optical cable.

The example network cluster architectures 218, 318 illustrated in FIGS. 12 and 13, respectively, may each support between a single half-rack (i.e., a logical rack 60) and 2,000 physical racks 70. For example, the sixty-four core switches 22 included in switch groups 220, 320 may include a large number of ports and be configured to operate as spine switches for a plurality of rack groups 228, 328. In some cases, the same set of sixty-four core switches 22 may operate as spine switches for up to 250 different 8-rack groups, i.e., 2,000 physical racks. As described above with respect to FIG. 4, each half-rack or logical rack 60 may support 32 dual-socket or dual-processor server nodes, and up to 1.6 Tbps of full duplex network bandwidth to the switch fabric. Table 1, below, includes example numbers of access nodes, server nodes, server sockets or processors, and network bandwidth for different numbers of physical racks supported by the example network cluster architectures 218, 318 illustrated in FIGS. 12 and 13, respectively.

TABLE 1

| Racks | Access Nodes | Server Nodes | Sockets/ Processors | Network Bandwidth |
|---|---|---|---|---|
| ½ | 8 | 32 | 64 | 1.6 Tbps |
| 1 | 16 | 64 | 128 | 3.2 Tbps |
| 8 | 128 | 512 | 1,024 | 25.6 Tbps |
| 100 | 1,600 | 6,400 | 12,800 | 320 Tbps |
| 1,000 | 16,000 | 64,000 | 128,000 | 3.2 Pbps |
| 2,000 | 32,000 | 128,000 | 256,000 | 6.4 Pbps |

Figure 14:
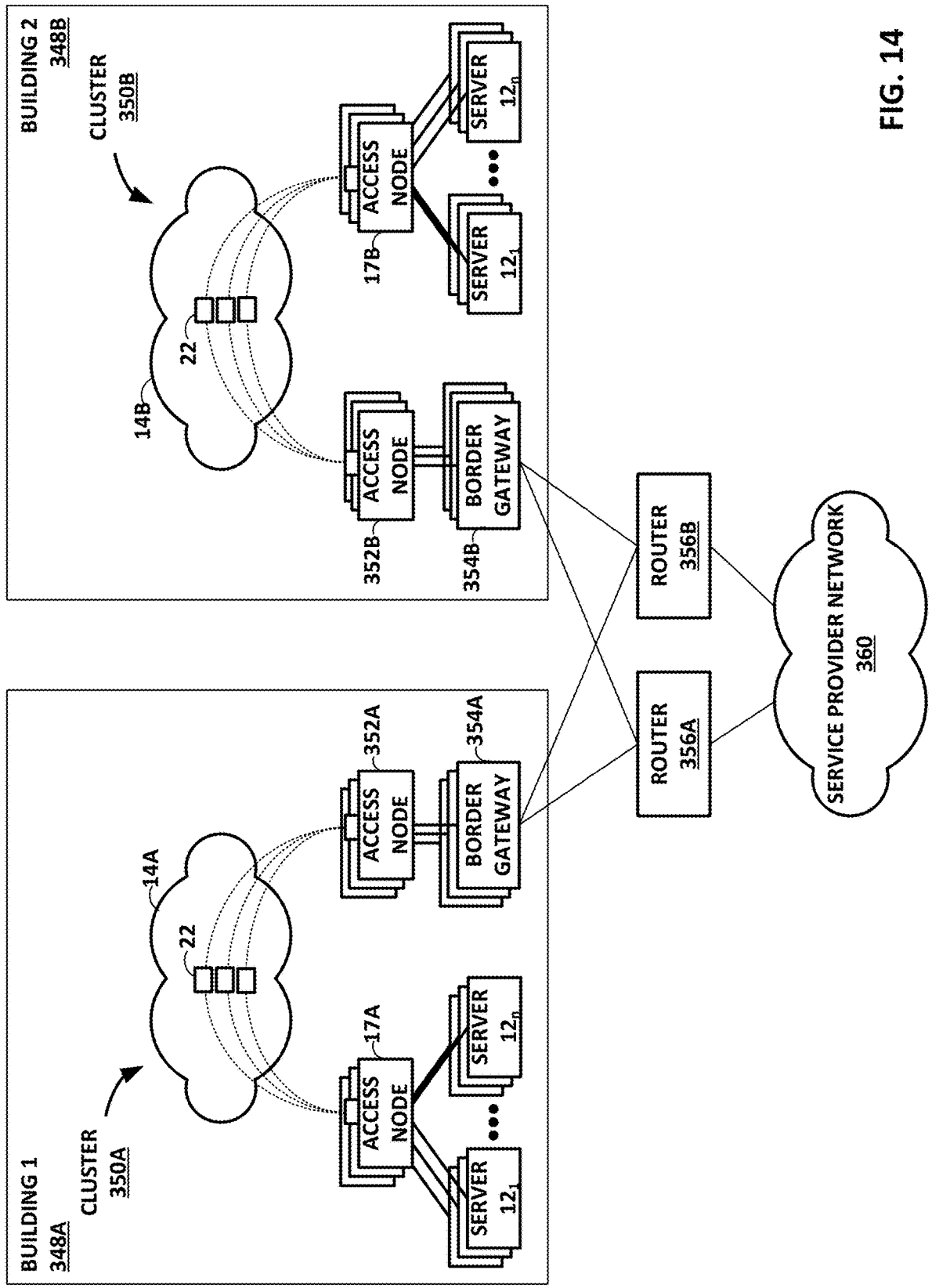
FIG. 14 is a block diagram illustrating an example interconnection between two network clusters.

FIG. 14 is a block diagram illustrating an example interconnection between two network clusters 350A and 350B (collectively, "clusters 350"). The interconnected network clusters 350 may form a data center or a portion of a data center, e.g., data center 10 from FIGS. 1 and 9. Each of clusters 350 may be substantially similar to network cluster architecture 218 illustrated in FIG. 11, 12 or network cluster architecture 318 illustrated in FIG. 13. In one example, cluster 350A may be arranged substantially similar to network cluster architecture 218 and cluster 350B may be arranged substantially similar to network cluster architecture 318.

Each of clusters 350 includes a plurality of core switches 22 and a plurality of access nodes 17 that are each coupled to a plurality of servers $12_1$-$12_n$. Although not shown in FIG. 14, the access nodes 17 and corresponding servers 12 may be arranged into one or more physical racks and/or one or more rack groups. In some cases, the physical racks and/or rack groups may also include one or more TOR switches, electrical permutors, or optical permutors, as illustrated in FIGS. 11-13, that operate as a leaf layer and link multiplier between access nodes 17 and core switches 22 within the network cluster.

As illustrated in FIG. 14, core switches 22 within each of clusters 350 also connect to a set of network device pairs with each pair including an access node 352 and a border gateway device 354. Access node 352 and border gateway device 354 may be viewed as back-to-back access nodes that may operate substantially similar to access nodes 17. In addition, border gateway devices 354 may perform several additional functions, such as the functions of a stateful firewall, an application-level load balancer, and a router. Access node 352 may be connected to border gateway device 354 using a PCIe connection. In this way, when access node 352 sends packets to border gateway device 354, access node 352 operates as if sending packets to a server, e.g., servers 12. In some examples, the set of network device pairs may include a plurality of pairs of access nodes 352 and border gateway devices 354 included in a physical rack. For example, four pairs of access nodes 352 and border gateway devices 354 may be arranged in a 2RU sled within a physical rack.

Border gateway devices 354 enable clusters 350 to connect to each other and to the outside world via a level of routers 356 and service provider network 360, e.g., the Internet or another public WAN network. For example, border gateway devices 354 may be substantially similar to gateway device 20 from FIG. 1. As illustrated in FIG. 14, border gateway devices 354 may have multiple paths to routers 356. In some examples, similar to the behavior of access nodes 17 described in detail above, border gateway devices 354 may perform packet spraying for individual packet flows across the links to routers 356. In other examples, border gateway device 354 may forward packet flows across the links to routers 356 using ECMP.

In the illustrated example of FIG. 14, a first cluster 350A is included in a first building 348A and a second cluster 350B is included in a second building 348B. In other examples, both clusters 350 may be included in the same building. In either example, in order to operate as a single data center, network clusters 350 may be located relatively close together. For example, cluster 350A may be physically located no more than two kilometers away from cluster 350B. The number of clusters 350 that may be housed in a single building or group of buildings may primarily be limited by power constraints. For example, as described above with respect to FIG. 6, each physical rack uses approximately 15 kW such that 2,000 physical racks within one or more of the clusters would use approximately 30 MW of power, and 3,000 physical racks spread across two or more clusters use approximately 45 MW of power.

In one example of a packet being forwarded between cluster 350A and 350B, at time T0, an access node 17A within cluster 350A sends the packet to access node 352A over one of multiple links across fabric 14A. At time T1, access node 352A receives the packet from fabric 14A. At time T2, access node 352A sends the packet to border gateway device 354A over the PCIe connection. Border gateway device 354A performs a forwarding lookup on the destination IP address of the packet, and determine that the packet is destined for cluster 350B behind border gateway device 354A. At time T3, border gateway 354A within cluster 350A sends the packet to border gateway device 354B within cluster 350B over one of multiple links across service provider network 360. For example, border gateway device 354A may send the packet over one of multiple paths to routers 356A, 356B using either the packet spraying techniques described in this disclosure or ECMP. At time T4, border gateway device 354B within cluster 350B receives the packet from routers 356A, 356B. Border gateway device 354B performs a forwarding lookup on the destination IP address of the packet, and sends the packet to access node 352B over the PCIe connection. At time T5, access node 352B sends the packet to access node 17B within cluster 350B over one of multiple links across fabric 14B. At time T6, access node 17B receives the packet from fabric 14B. Access node 17B performs a forwarding lookup on the destination IP address of the packet, and sends the packet to one of servers 12 at time T7.

Figure 15:
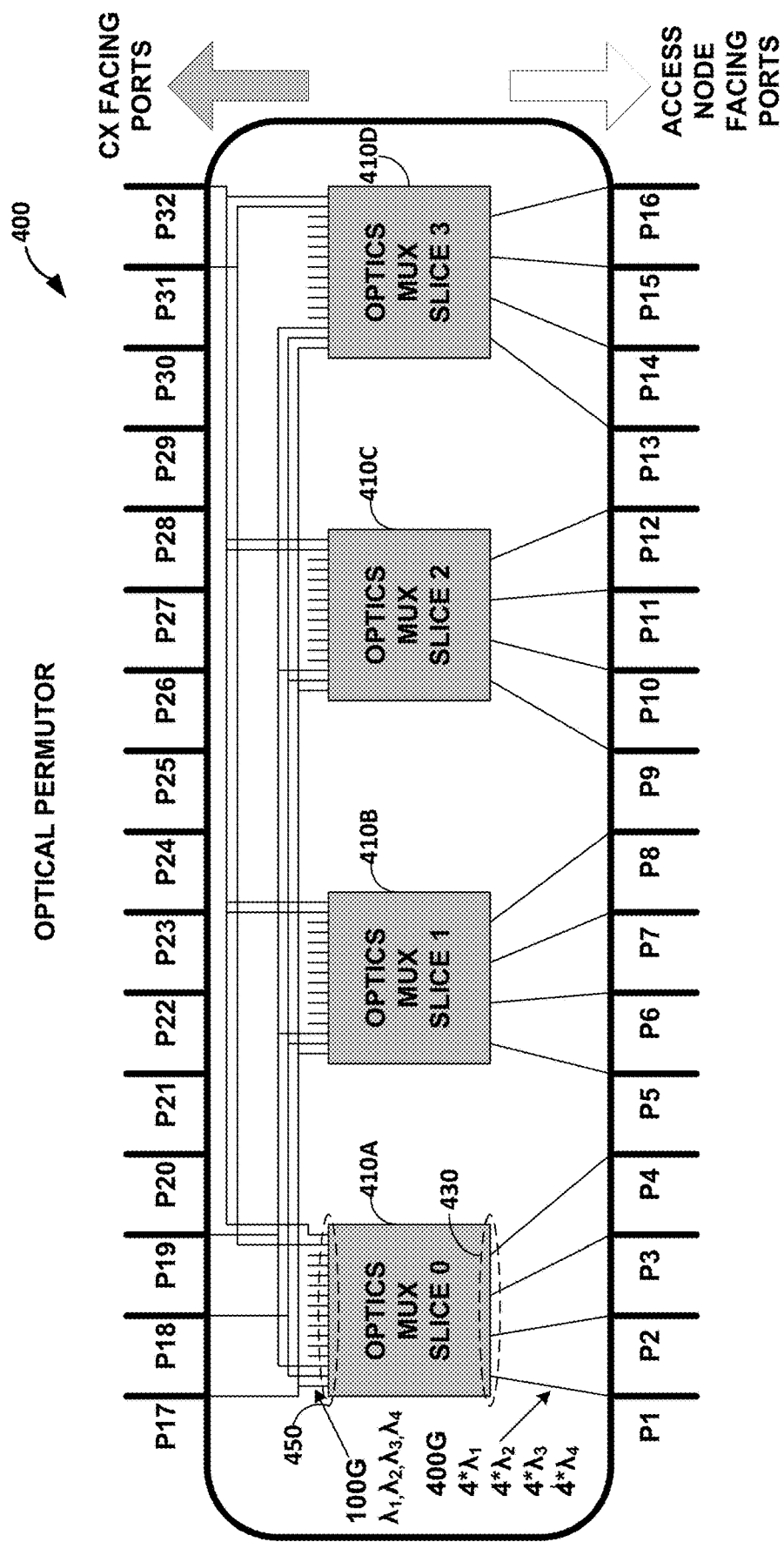
FIG. 15 is a block diagram illustrating an example optical permutor, which may be any of the optical permutors described herein, such as illustrated in FIGS. 9, 11, and 12.

FIG. 15 is a block diagram illustrating an example optical permutor 400, which may be any of optical permutors 132 of FIGS. 9, 11, and 12. In this example, optical permutor 400 includes a plurality of bidirectional input ports (P1-P32) that each send and receive respective optical signals. In this example, optical permutor 400 includes thirty-two optical ports with P1-P16 being access node-facing ports for optically coupling to access nodes 17 and ports P17-P32 being core switch-facing ports for optically coupling with core switches 22. In one particular example, each port comprises a bidirectional 400 Gigabit optical interface capable of coupling to four 100 Gigabit single-mode optical fiber (SMF) pairs, each fiber carrying four 25G wavelengths $\lambda_1$, $\lambda_2$, $\lambda_3$, $\lambda_4$. As such, in this example, each port P1-P32 provides 400 Gigabit optical bandwidth. The described example architecture readily scales and may support, for example, 200 and 400 Gigabit fibers carrying four (or more) 50G and 100G wavelengths, respectively.

In the example of FIG. 15, optical permutor 400 includes four optical multiplexors/demultiplexors ("Optics Mux Slice 0-3" in FIG. 15) 410A-410D (herein, "Optics Mux Slice 410") having four 400G access node-facing optical ports 430 and sixteen core switch-facing 100G optical ports 450. As shown in more detail in FIG. 16, each optics mux slice 410 receives the optical signals carried by SMFs for the set of four optical ports 430, splits the four wavelengths in the optical signal for each SMF and sprays the wavelengths carried by each SMF in a 4×4 spray across the set of sixteen optical ports 450.

Figure 16:
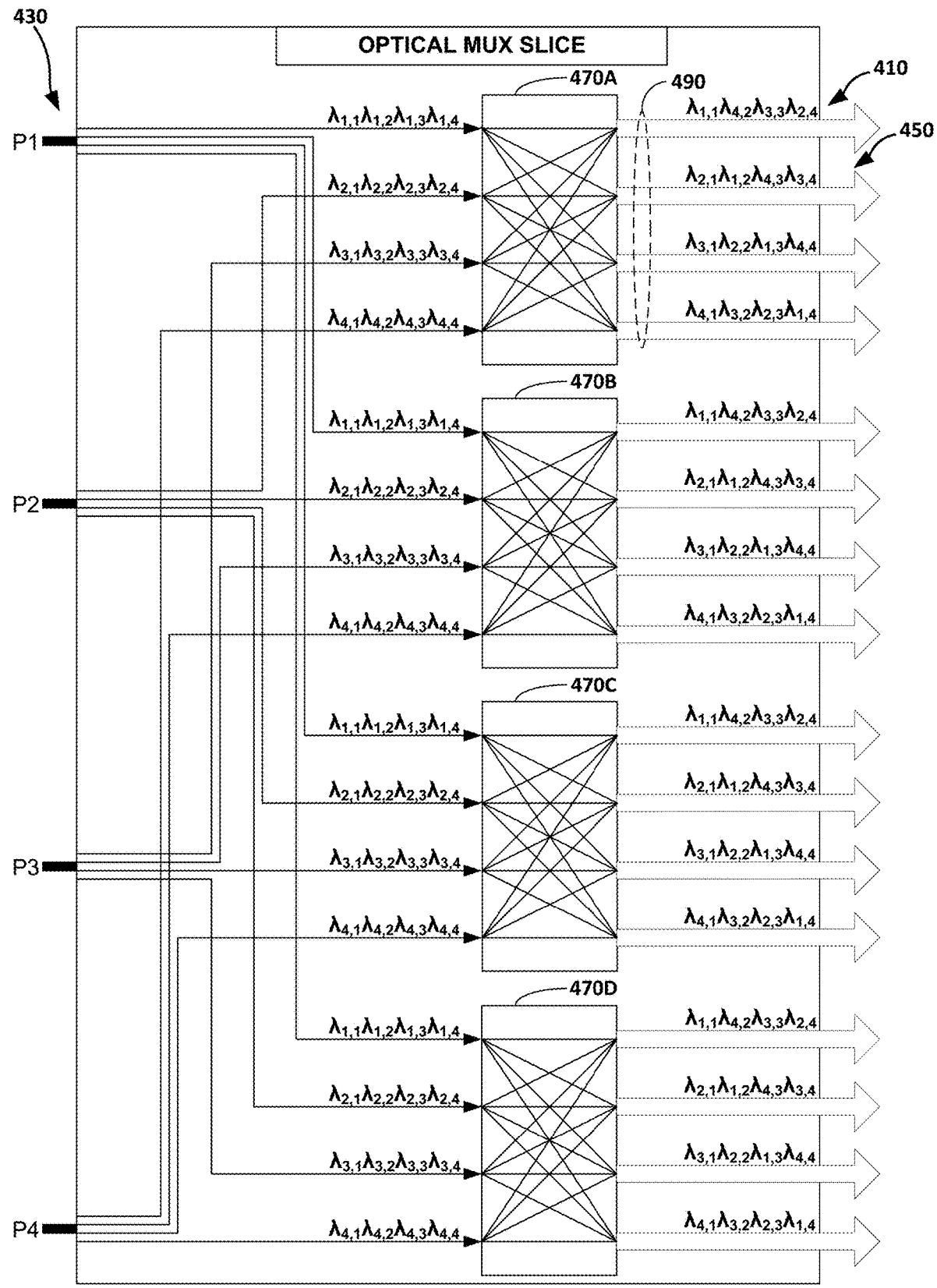
FIG. 16 is a block diagram illustrating in further detail an example of an optics mux slice of FIG. 15.

FIG. 16 is a block diagram illustrating in further detail an example of an optics mux slice 410 of FIG. 15. In the example of FIG. 16, each optics mux slice 410 includes four optical mux/demux chips 470A-470D (herein, "optical mux/demux chips 470"). Each of the optical mux/demux chips 470 receives an optical signal from one of the SMFs for each of the different inputs ports (P) serviced by the optical mux slice 410, such as ports P1-P4 for optics mux slice 410A of FIG. 15. Each of the optical mux/demux chips 470 splits the four wavelengths in the optical signal for each SMF and sprays the wavelengths carried by each SMF in 4×4 spray across a set of four optical ports 490.

For example, in FIG. 16, each optical communication is designated as $\lambda_{p,w}$, where the subscript p represents the port and the subscript w represents a different wavelength. Thus, using this nomenclature, port P1 of optics mux slice 410 receives a light beam carrying communications at n different wavelengths designated $\lambda_{1,1}$, $\lambda_{1,2}$, $\lambda_{1,3}$, and $\lambda_{1,4}$ where, in this example, n equals 4. Similarly, optical port P2 receives a light beam carrying communications at n different wavelengths designated $\lambda_{2,1}$, $\lambda_{2,2}$, $\lambda_{2,3}$, and $\lambda_{2,4}$. As shown, each optical mux/demux chips 470A-470D receive an optical signal carrying $\lambda_{1,1}$, $\lambda_{1,2}$, $\lambda_{1,3}$, and $\lambda_{1,4}$ from port P1, an optical signal carrying $\lambda_{2,1}$, $\lambda_{2,2}$, $\lambda_{2,3}$, and $\lambda_{2,4}$ from port P2, an optical signal carrying $\lambda_{3,1}$, $\lambda_{3,2}$, $\lambda_{3,3}$, and $\lambda_{3,4}$ from port P3 and an optical signal carrying $\lambda_{4,1}$, $\lambda_{4,2}$, $\lambda_{4,3}$, and $\lambda_{4,4}$ from port P4. Each of the optical mux/demux chips 470 splits the four wavelengths in the optical signal for each SMF and sprays the wavelengths carried by each SMF such that optical ports 490 each carry a different one of the possible unique permutations of the combinations of optical input ports P1-P4 and the optical wavelengths carried by those ports and where no single optical output port 490 carries multiple optical communications having the same wavelength. For example, as shown in FIG. 16, a set of four (4) optical output ports 490 for any given optical mux/demux chip 470 may output an optical signal of wavelengths $\lambda_{1,1}$, $\lambda_{4,2}$, $\lambda_{3,3}$, and $\lambda_{2,4}$ on a first port, an optical signal carrying wavelengths $\lambda_{2,1}$, $\lambda_{1,2}$, $\lambda_{4,3}$, and $\lambda_{3,4}$ on a second port, an optical signal carrying $\lambda_{3,1}$, $\lambda_{2,2}$, $\lambda_{1,3}$, and $\lambda_{4,4}$ on a third optical port and an optical signal carrying $\lambda_{4,1}$, $\lambda_{3,2}$, $\lambda_{2,3}$, and $\lambda_{1,4}$ on a fourth port.

The following provides a complete example for one implementation of optical permutor 400 of FIGS. 15, 16. In this example, each of ports P1-P32 comprise four separate single mode optical fibers pairs (designated F1-F4 for each port). That is, each port P1-P32 of optical permutor 400 comprises an input optical interface configured to receive four separate fibers, such as a 400G optical interface configured to couple to and receive optical signals from four separate 100G optical fibers. In addition, each port P1-P32 of optical permutor 40 comprises an output optical interface configured to connect to and transmit optical signals on four separate fibers, such as a 400G optical interface configured to receive four separate 100G optical fibers.

Further, each of the four optical fiber pairs for each of input ports P1-P16 is coupled to a different access node 17, thereby providing bidirectional optical connectivity from 64 different access nodes.

Table 2 lists one example configuration for optical permutor 400 for optical communications in the core-facing direction. That is, Table 2 illustrates an example configuration of optical permutor 400 for producing, on the optical fibers of core-facing output ports P17-P32, a set of 64 unique permutations for combinations of optical input ports P1-P16 and optical wavelengths L1-L4 carried by those input ports, where no single optical output port carries multiple optical communications having the same wavelength. For example, the first column of Table 2 lists the wavelengths L1-L4 carried by the four fibers F1-F4 of each input optical interfaces for ports P0-P16 while the right column lists the unique and non-interfering permutation of input port fiber/wavelength combination output on each optical output interface of ports P17-P32.

TABLE 2

| Rack-facing Input ports for Optical Permutor | Core-switch facing Output Ports for Optical Permutor (permutation of wavelengths & input port) |
|---|---|
| Input Port 1: | Output Port 17: |
| Fiber 1: P1F1L1-P1F1L4 | Fiber 1: P1F1L1, P2F1L2, P3F1L3, P4F1L4 |
| Fiber 2: P1F2L1-P1F2L4 | Fiber 2: P5F1L1, P6F1L2, P7F1L3, P8F1L4 |
| Fiber 3: P1F3L1-P1F3L4 | Fiber 3: P9F1L1, P10F1L2, P11F1L3, P12F1L4 |
| Fiber 4: P1F4L1-P1F4L4 | Fiber 4: P13F1L1, P14F1L2, P15F1L3, P16F1L4 |
| Input Port 2: | Output Port 18: |
| Fiber 1: P2F1L1-P2F1L4 | Fiber 1: P1F2L1, P2F2L2, P3F2L3, P4F2L4 |
| Fiber 2: P2F2L1-P2F2L4 | Fiber 2: P5F2L1, P6F2L2, P7F2L3, P8F2L4 |
| Fiber 3: P2F3L1-P2F3L4 | Fiber 3: P9F2L1, P10F2L2, P11F2L3, P12F2L4 |
| Fiber 4: P2F4L1-P2F4L4 | Fiber 4: P13F2L1, P14F2L2, P15F2L3, P16F2L4 |
| Input Port 3: | Output Port 19: |
| Fiber 1: P3F1L1-P3F1L4 | Fiber 1: P1F3L1, P2F3L2, P3F3L3, P4F3L4 |
| Fiber 2: P3F2L1-P3F2L4 | Fiber 2: P5F3L1, P6F3L2, P7F3L3, P8F3L4 |
| Fiber 3: P3F3L1-P3F3L4 | Fiber 3: P9F3L1, P10F3L2, P11F3L3, P12F3L4 |
| Fiber 4: P3F4L1-P3F4L4 | Fiber 4: P13F3L1, P14F3L2, P15F3L3, P16F3L4 |
| Input Port 4: | Output Port 20: |
| Fiber 1: P4F1L1-P4F1L4 | Fiber 1: P1F4L1, P2F4L2, P3F4L3, P4F4L4 |
| Fiber 2: P4F2L1-P4F2L4 | Fiber 2: P5F4L1, P6F4L2, P7F4L3, P8F4L4 |
| Fiber 3: P4F3L1-P4F3L4 | Fiber 3: P9F4L1, P10F4L2, P11F4L3, P12F4L4 |
| Fiber 4: P4F4L1-P4F4L4 | Fiber 4: P13F4L1, P14F4L2, P15F4L3, P16F4L4 |
| Input Port 5: | Output Port 21: |
| Fiber 1: P5F1L1-P5F1L4 | Fiber 1: P2F1L1, P3F1L2, P4F1L3, P5F1L4 |
| Fiber 2: P5F2L1-P5F2L4 | Fiber 2: P6F1L1, P7F1L2, P8F1L3, P9F1L4 |
| Fiber 3: P5F3L1-P5F3L4 | Fiber 3: P10F1L1, P11F1L2, P12F1L3, P13F1L4 |
| Fiber 4: P5F4L1-P5F4L4 | Fiber 4: P14F1L1, P15F1L2, P16F1L3, P1F1L4 |
| Input Port 6: | Output Port 22: |
| Fiber 1: P6F1L1-P6F1L4 | Fiber 1: P2F2L1, P3F2L2, P4F2L3, P5F2L4 |
| Fiber 2: P6F2L1-P6F2L4 | Fiber 2: P6F2L1, P7F2L2, P8F2L3, P9F2L4 |
| Fiber 3: P6F3L1-P6F3L4 | Fiber 3: P10F2L1, P11F2L2, P12F2L3, P13F2L4 |
| Fiber 4: P6F4L1-P6F4L4 | Fiber 4: P14F2L1, P15F2L2, P16F2L3, P1F2L4 |
| Input Port 7: | Output Port 23: |
| Fiber 1: P7F1L1-P7F1L4 | Fiber 1: P2F3L1, P3F3L2, P4F3L3, P5F3L4 |
| Fiber 2: P7F2L1-P7F2L4 | Fiber 2: P6F3L1, P7F3L2, P8F3L3, P9F3L4 |
| Fiber 3: P7F3L1-P7F3L4 | Fiber 3: P10F3L1, P11F3L2, P12F3L3, P13F3L4 |
| Fiber 4: P7F4L1-P7F4L4 | Fiber 4: P14F3L1, P15F3L2, P16F3L3, P1F3L4 |
| Input Port 8: | Output Port 24: |
| Fiber 1: P8F1L1-P8F1L4 | Fiber 1: P2F4L1, P3F4L2, P4F4L3, P5F4L4 |
| Fiber 2: P8F2L1-P8F2L4 | Fiber 2: P6F4L1, P7F4L2, P8F4L3, P9F4L4 |
| Fiber 3: P8F3L1-P8F3L4 | Fiber 3: P10F4L1, P11F4L2, P12F4L3, P13F4L4 |
| Fiber 4: P8F4L1-P8F4L4 | Fiber 4: P14F4L1, P15F4L2, P16F4L3, P1F4L4 |
| Input Port 9: | Output Port 25: |
| Fiber 1: P9F1L1-P9F1L4 | Fiber 1: P3F1L1, P4F1L2, P5F1L3, P6F1L4 |
| Fiber 2: P9F2L1-P9F2L4 | Fiber 2: P7F1L1, P8F1L2, P9F1L3, P10F1L4 |
| Fiber 3: P9F3L1-P9F3L4 | Fiber 3: P11F1L1, P12F1L2, P13F1L3, P14F1L4 |
| Fiber 4: P9F4L1-P9F4L4 | Fiber 4: P15F1L1, P16F1L2, P1F1L3, P2F1L4 |
| Input Port 10: | Output Port 26: |
| Fiber 1: P10F1L1-P10F1L4 | Fiber 1: P3F2L1, P4F2L2, P5F2L3, P6F2L4 |
| Fiber 2: P10F2L1-P10F2L4 | Fiber 2: P7F2L1, P8F2L2, P9F2L3, P10F2L4 |
| Fiber 3: P10F3L1-P10F3L4 | Fiber 3: P11F2L1, P12F2L2, P13F2L3, P14F2L4 |
| Fiber 4: P10F4L1-P10F4L4 | Fiber 4: P15F2L1, P16F2L2, P1F2L3, P2F2L4 |
| Input Port 11: | Output Port 27: |
| Fiber 1: P11F1L1-P11F1L4 | Fiber 1: P3F3L1, P4F3L2, P5F3L3, P6F3L4 |
| Fiber 2: P11F2L1-P11F2L4 | Fiber 2: P7F3L1, P8F3L2, P9F3L3, P10F3L4 |
| Fiber 3: P11F3L1-P11F3L4 | Fiber 3: P11F3L1, P12F3L2, P13F3L3, P14F3L4 |
| Fiber 4: P11F4L1-P11F4L4 | Fiber 4: P15F3L1, P16F3L2, P1F3L3, P2F3L4 |
| Input Port 12: | Output Port 28: |
| Fiber 1: P12F1L1-P12F1L4 | Fiber 1: P3F4L1, P4F4L2, P5F4L3, P6F4L4 |
| Fiber 2: P12F2L1-P12F2L4 | Fiber 2: P7F4L1, P8F4L2, P9F4L3, P10F4L4 |
| Fiber 3: P12F3L1-P12F3L4 | Fiber 3: P11F4L1, P12F4L2, P13F4L3, P14F4L4 |
| Fiber 4: P12F4L1-P12F4L4 | Fiber 4: P15F4L1, P16F4L2, P1F4L3, P2F4L4 |

TABLE 2-continued

| Rack-facing Input ports for Optical Permutor | Core-switch facing Output Ports for Optical Permutor (permutation of wavelengths & input port) |
|---|---|
| Input Port 13: | Output Port 29: |
| Fiber 1: P13F1L1-P13F1L4 | Fiber 1: P4F1L1, P5F1L2, P6F1L3, P7F1L4 |
| Fiber 2: P13F2L1-P13F2L4 | Fiber 2: P8F1L1, P9F1L2, P10F1L3, P11F1L4 |
| Fiber 3: P13F3L1-P13F3L4 | Fiber 3: P12F1L1, P13F1L2, P14F1L3, P15F1L4 |
| Fiber 4: P13F4L1-P13F4L4 | Fiber 4: P16F1L1, P1F1L2, P2F1L3, P3F1L4 |
| Input Port 14: | Output Port 30: |
| Fiber 1: P14F1L1-P14F1L4 | Fiber 1: P4F2L1, P5F2L2, P6F2L3, P7F2L4 |
| Fiber 2: P14F2L1-P14F2L4 | Fiber 2: P8F2L1, P9F2L2, P10F2L3, P11F2L4 |
| Fiber 3: P14F3L1-P14F3L4 | Fiber 3: P12F2L1, P13F2L2, P14F2L3, P15F2L4 |
| Fiber 4: P14F4L1-P14F4L4 | Fiber 4: P16F2L1, P1F2L2, P2F2L3, P3F2L4 |
| Input Port 15: | Output Port 31: |
| Fiber 1: P15F1L1-P15F1L4 | Fiber 1: P4F3L1, P5F3L2, P6F3L3, P7F3L4 |
| Fiber 2: P15F2L1-P15F2L4 | Fiber 2: P8F3L1, P9F3L2, P10F3L3, P11F3L4 |
| Fiber 3: P15F3L1-P15F3L4 | Fiber 3: P12F3L1, P13F3L2, P14F3L3, P15F3L4 |
| Fiber 4: P15F4L1-P15F4L4 | Fiber 4: P16F3L1, P1F3L2, P2F3L3, P3F3L4 |
| Input Port 16: | Output Port 32: |
| Fiber 1: P16F1L1-P16F1L4 | Fiber 1: P4F4L1, P5F4L2, P6F4L3, P7F4L4 |
| Fiber 2: P16F2L1-P16F2L4 | Fiber 2: P8F4L1, P9F4L2, P10F4L3, P11F4L4 |
| Fiber 3: P16F3L1-P16F3L4 | Fiber 3: P12F4L1, P13F4L2, P14F4L3, P15F4L4 |
| Fiber 4: P16F4L1-P16F4L4 | Fiber 4: P16F4L1, P1F4L2, P2F4L3, P3F4L4 |

Continuing the example, Table 3 lists an example configuration for optical permutor 400 with respect to optical communications in the reverse, downstream direction, i.e., from core switches 22 to access nodes 17. That is, Table 3 illustrates an example configuration of optical permutor 400 for producing, on the optical fibers of rack-facing output ports P1-P16, a set of 64 unique permutations for combinations of core-facing input ports P16-P32 and optical wavelengths L1-L4 carried by those input ports, where no single optical output port carries multiple optical communications having the same wavelength.

TABLE 3

| Core switch-facing Input Ports for Optical Permutor | Access node-facing Output Ports for Optical Permutor (permutation of wavelengths & input port) |
|---|---|
| Input Port 17: | Output Port 1: |
| Fiber 1: P17F1L1-P17F1L4 | Fiber 1: P17F1L1, P18F1L2, P19F1L3, P20F1L4 |
| Fiber 2: P17F2L1-P17F2L4 | Fiber 2: P21F1L1, P22F1L2, P23F1L3, P24F1L4 |
| Fiber 3: P17F3L1-P17F3L4 | Fiber 3: P25F1L1, P26F1L2, P27F1L3, P28F1L4 |
| Fiber 4: P17F4L1-P17F4L4 | Fiber 4: P29F1L1, P30F1L2, P31F1L3, P32F1L4 |
| Input Port 18: | Output Port 2: |
| Fiber 1: P18F1L1-P18F1L4 | Fiber 1: P17F2L1, P18F2L2, P19F2L3, P20F2L4 |
| Fiber 2: P18F2L1-P18F2L4 | Fiber 2: P21F2L1, P22F2L2, P23F2L3, P24F2L4 |
| Fiber 3: P18F3L1-P18F3L4 | Fiber 3: P25F2L1, P26F2L2, P27F2L3, P28F2L4 |
| Fiber 4: P18F4L1-P18F4L4 | Fiber 4: P29F2L1, P30F2L2, P31F2L3, P32F2L4 |
| Input Port 19: | Output Port 3: |
| Fiber 1: P19F1L1-P19F1L4 | Fiber 1: P17F3L1, P18F3L2, P19F3L3, P20F3L4 |
| Fiber 2: P19F2L1-P19F2L4 | Fiber 2: P21F3L1, P22F3L2, P23F3L3, P24F3L4 |
| Fiber 3: P19F3L1-P19F3L4 | Fiber 3: P25F3L1, P26F3L2, P27F3L3, P28F3L4 |
| Fiber 4: P19F4L1-P19F4L4 | Fiber 4: P29F3L1, P30F3L2, P31F3L3, P32F3L4 |
| Input Port 20: | Output Port 4: |
| Fiber 1: P20F1L1-P20F1L4 | Fiber 1: P17F4L1, P18F4L2, P19F4L3, P20F4L4 |
| Fiber 2: P20F2L1-P20F2L4 | Fiber 2: P21F4L1, P22F4L2, P23F4L3, P24F4L4 |
| Fiber 3: P20F3L1-P20F3L4 | Fiber 3: P25F4L1, P26F4L2, P27F4L3, P28F4L4 |
| Fiber 4: P20F4L1-P20F4L4 | Fiber 4: P29F4L1, P30F4L2, P31F4L3, P32F4L4 |
| Input Port 21: | Output Port 5: |
| Fiber 1: P21F1L1-P21F1L4 | Fiber 1: P18F1L1, P19F1L2, P20F1L3, P21F1L4 |
| Fiber 2: P21F2L1-P21F2L4 | Fiber 2: P22F1L1, P23F1L2, P24F1L3, P25F1L4 |
| Fiber 3: P21F3L1-P21F3L4 | Fiber 3: P26F1L1, P27F1L2, P28F1L3, P29F1L4 |
| Fiber 4: P21F4L1-P21F4L4 | Fiber 4: P30F1L1, P31F1L2, P32F1L3, P17F1L4 |
| Input Port 22: | Output Port 6: |
| Fiber 1: P22F1L1-P22F1L4 | Fiber 1: P18F2L1, P19F2L2, P20F2L3, P21F2L4 |
| Fiber 2: P22F2L1-P22F2L4 | Fiber 2: P22F2L1, P23F2L2, P24F2L3, P25F2L4 |
| Fiber 3: P22F3L1-P22F3L4 | Fiber 3: P26F2L1, P27F2L2, P28F2L3, P29F2L4 |
| Fiber 4: P22F4L1-P22F4L4 | Fiber 4: P30F2L1, P31F2L2, P32F2L3, P17F2L4 |
| Input Port 23: | Output Port 7: |
| Fiber 1: P23F1L1-P23F1L4 | Fiber 1: P18F3L1, P19F3L2, P20F3L3, P21F3L4 |
| Fiber 2: P23F2L1-P23F2L4 | Fiber 2: P22F3L1, P23F3L2, P24F3L3, P25F3L4 |

TABLE 3-continued

| Core switch-facing Input Ports for Optical Permutor | Access node-facing Output Ports for Optical Permutor (permutation of wavelengths & input port) |
|---|---|
| Fiber 3: P23F3L1-P23F3L4 | Fiber 3: P26F3L1, P27F3L2, P28F3L3, P29F3L4 |
| Fiber 4: P23F4L1-P23F4L4 | Fiber 4: P30F3L1, P31F3L2, P32F3L3, P17F3L4 |
| Input Port 24: | Output Port 8: |
| Fiber 1: P24F1L1-P24F1L4 | Fiber 1: P18F2L1, P19F2L2, P20F2L3, P21F2L4 |
| Fiber 2: P24F2L1-P24F2L4 | Fiber 2: P22F2L1, P23F2L2, P24F2L3, P25F2L4 |
| Fiber 3: P24F3L1-P24F3L4 | Fiber 3: P26F2L1, P27F2L2, P28F2L3, P29F2L4 |
| Fiber 4: P24F4L1-P24F4L4 | Fiber 4: P30F2L1, P31F2L2, P32F2L3, P17F2L4 |
| Input Port 25: | Output Port 9: |
| Fiber 1: P25F1L1-P25F1L4 | Fiber 1: P19F1L1, P20F1L2, P21F1L3, P22F1L4 |
| Fiber 2: P25F2L1-P25F2L4 | Fiber 2: P23F1L1, P24F1L2, P25F1L3, P26F1L4 |
| Fiber 3: P25F3L1-P25F3L4 | Fiber 3: P27F1L1, P28F1L2, P29F1L3, P30F1L4 |
| Fiber 4: P25F4L1-P25F4L4 | Fiber 4: P31F1L1, P32F1L2, P17F1L3, P18F1L4 |
| Input Port 26: | Output Port 10: |
| Fiber 1: P26F1L1-P26F1L4 | Fiber 1: P19F2L1, P20F2L2, P21F2L3, P22F2L4 |
| Fiber 2: P26F2L1-P26F2L4 | Fiber 2: P23F2L1, P24F2L2, P25F2L3, P26F2L4 |
| Fiber 3: P26F3L1-P26F3L4 | Fiber 3: P27F2L1, P28F2L2, P29F2L3, P30F2L4 |
| Fiber 4: P26F4L1-P26F4L4 | Fiber 4: P31F2L1, P32F2L2, P17F2L3, P18F2L4 |
| Input Port 27: | Output Port 11: |
| Fiber 1: P27F1L1-P27F1L4 | Fiber 1: P19F3L1, P20F3L2, P21F3L3, P22F3L4 |
| Fiber 2: P27F2L1-P27F2L4 | Fiber 2: P23F3L1, P24F3L2, P25F3L3, P26F3L4 |
| Fiber 3: P27F3L1-P27F3L4 | Fiber 3: P27F3L1, P28F3L2, P29F3L3, P30F3L4 |
| Fiber 4: P27F4L1-P27F4L4 | Fiber 4: P31F3L1, P32F3L2, P17F3L3, P18F3L4 |
| Input Port 28: | Output Port 12: |
| Fiber 1: P28F1L1-P28F1L4 | Fiber 1: P19F4L1, P20F4L2, P21F4L3, P22F4L4 |
| Fiber 2: P28F2L1-P28F2L4 | Fiber 2: P23F4L1, P24F4L2, P25F4L3, P26F4L4 |
| Fiber 3: P28F3L1-P28F3L4 | Fiber 3: P27F4L1, P28F4L2, P29F4L3, P30F4L4 |
| Fiber 4: P28F4L1-P28F4L4 | Fiber 4: P31F4L1, P32F4L2, P17F4L3, P18F4L4 |
| Input Port 29: | Output Port 13: |
| Fiber 1: P29F1L1-P29F1L4 | Fiber 1: P20F1L1, P21F1L2, P22F1L3, P23F1L4 |
| Fiber 2: P29F2L1-P29F2L4 | Fiber 2: P24F1L1, P25F1L2, P26F1L3, P27F1L4 |
| Fiber 3: P29F3L1-P29F3L4 | Fiber 3: P28F1L1, P29F1L2, P30F1L3, P31F1L4 |
| Fiber 4: P29F4L1-P29F4L4 | Fiber 4: P32F1L1, P17F1L2, P18F1L3, P19F1L4 |
| Input Port 30: | Output Port 14: |
| Fiber 1: P30F1L1-P30F1L4 | Fiber 1: P20F2L1, P21F2L2, P22F2L3, P23F2L4 |
| Fiber 2: P30F2L1-P30F2L4 | Fiber 2: P24F2L1, P25F2L2, P26F2L3, P27F2L4 |
| Fiber 3: P30F3L1-P30F3L4 | Fiber 3: P28F2L1, P29F2L2, P30F2L3, P31F2L4 |
| Fiber 4: P30F4L1-P30F4L4 | Fiber 4: P32F2L1, P17F2L2, P18F2L3, P19F2L4 |
| Input Port 31: | Output Port 15: |
| Fiber 1: P31F1L1-P31F1L4 | Fiber 1: P20F3L1, P21F3L2, P22F3L3, P23F3L4 |
| Fiber 2: P31F2L1-P31F2L4 | Fiber 2: P24F3L1, P25F3L2, P26F3L3, P27F3L4 |
| Fiber 3: P31F3L1-P31F3L4 | Fiber 3: P28F3L1, P29F3L2, P30F3L3, P31F3L4 |
| Fiber 4: P31F4L1-P31F4L4 | Fiber 4: P32F3L1, P17F3L2, P18F3L3, P19F3L4 |
| Input Port 32: | Output Port 16: |
| Fiber 1: P32F1L1-P32F1L4 | Fiber 1: P20F4L1, P21F4L2, P22F4L3, P23F4L4 |
| Fiber 2: P32F2L1-P32F2L4 | Fiber 2: P24F4L1, P25F4L2, P26F4L3, P27F4L4 |
| Fiber 3: P32F3L1-P32F3L4 | Fiber 3: P28F4L1, P29F4L2, P30F4L3, P31F4L4 |
| Fiber 4: P32F4L1-P32F4L4 | Fiber 4: P32F4L1, P17F4L2, P18F4L3, P19F4L4 |

Table 4 lists a second example configuration for optical permutor 400 for optical communications in the core-facing direction. As with Table 2 above, Table 4 illustrates an example configuration of optical permutor 400 for producing, on the optical fibers of core-facing output ports P17-P32, a set of 64 unique permutations for combinations of optical input ports P1-P16 and optical wavelengths L1-L4 carried by those input ports, where no single optical output port carries multiple optical communications having the same wavelength. Similar to Table 2 above, the first column of Table 4 lists the wavelengths L1-L4 carried by the four fibers F1-F4 of each input optical interfaces for ports P0-P16 while the right column lists another example of unique and non-interfering permutation of input port fiber/wavelength combination output on each optical output interface of ports P17-P32.

TABLE 4

| Rack-facing Input ports for Optical Permutor | Core-switch facing Output Ports for Optical Permutor (permutation of wavelengths & input port) |
|---|---|
| Input Port 1: | Output Port 17: |
| Fiber 1: P1F1L1-P1F1L4 | Fiber 1: P1F1L1, P2F1L2, P3F1L3, P4F1L4 |
| Fiber 2: P1F2L1-P1F2L4 | Fiber 2: P5F1L1, P6F1L2, P7F1L3, P8F1L4 |
| Fiber 3: P1F3L1-P1F3L4 | Fiber 3: P9F1L1, P10F1L2, P11F1L3, P12F1L4 |
| Fiber 4: P1F4L1-P1F4L4 | Fiber 4: P13F1L1, P14F1L2, P15F1L3, P16F1L4 |
| Input Port 2: | Output Port 18: |
| Fiber 1: P2F1L1-P2F1L4 | Fiber 1: P2F1L1, P3F1L2, P4F1L3, P1F1L4 |
| Fiber 2: P2F2L1-P2F2L4 | Fiber 2: P6F1L1, P7F1L2, P8F1L3, P5F1L4 |
| Fiber 3: P2F3L1-P2F3L4 | Fiber 3: P10F1L1, P11F1L2, P12F1L3, P9F1L4 |

TABLE 4-continued

| Rack-facing Input ports for Optical Permutor | Core-switch facing Output Ports for Optical Permutor (permutation of wavelengths & input port) |
| --- | --- |
| Fiber 4: P2F4L1-P2F4L4 | Fiber 4: P14F1L1, P15F1L2, P16F1L3, P13F1L4 |
| Input Port 3: | Output Port 19: |
| Fiber 1: P3F1L1-P3F1L4 | Fiber 1: P3F1L1, P4F1L2, P1F1L3, P2F1L4 |
| Fiber 2: P3F2L1-P3F2L4 | Fiber 2: P7F1L1, P8F1L2, P5F1L3, P6F1L4 |
| Fiber 3: P3F3L1-P3F3L4 | Fiber 3: P11F1L1, P12F1L2, P9F1L3, P10F1L4 |
| Fiber 4: P3F4L1-P3F4L4 | Fiber 4: P15F1L1, P16F1L2, P13F1L3, P14F1L4 |
| Input Port 4: | Output Port 20: |
| Fiber 1: P4F1L1-P4F1L4 | Fiber 1: P4F1L1, P1F1L2, P2F1L3, P3F1L4 |
| Fiber 2: P4F2L1-P4F2L4 | Fiber 2: P8F1L1, P5F1L2, P6F1L3, P7F1L4 |
| Fiber 3: P4F3L1-P4F3L4 | Fiber 3: P12F1L1, P9F1L2, P10F1L3, P11F1L4 |
| Fiber 4: P4F4L1-P4F4L4 | Fiber 4: P16F1L1, P13F1L2, P14F1L3, P15F1L4 |
| Input Port 5: | Output Port 21: |
| Fiber 1: P5F1L1-P5F1L4 | Fiber 1: P1F2L1, P2F2L2, P3F2L3, P4F2L4 |
| Fiber 2: P5F2L1-P5F2L4 | Fiber 2: P5F2L1, P6F2L2, P7F2L3, P8F2L4 |
| Fiber 3: P5F3L1-P5F3L4 | Fiber 3: P9F2L1, P10F2L2, P11F2L3, P12F2L4 |
| Fiber 4: P5F4L1-P5F4L4 | Fiber 4: P13F2L1, P14F2L2, P15F2L3, P6F2L4 |
| Input Port 6: | Output Port 22: |
| Fiber 1: P6F1L1-P6F1L4 | Fiber 1: P2F2L1, P3F2L2, P4F2L3, P1F2L4 |
| Fiber 2: P6F2L1-P6F2L4 | Fiber 2: P6F2L1, P7F2L2, P8F2L3, P5F2L4 |
| Fiber 3: P6F3L1-P6F3L4 | Fiber 3: P10F2L1, P11F2L2, P12F2L3, P9F2L4 |
| Fiber 4: P6F4L1-P6F4L4 | Fiber 4: P14F2L1, P15F2L2, P16F2L3, P13F2L4 |
| Input Port 7: | Output Port 23: |
| Fiber 1: P7F1L1-P7F1L4 | Fiber 1: P3F2L1, P4F2L2, P1F2L3, P2F2L4 |
| Fiber 2: P7F2L1-P7F2L4 | Fiber 2: P7F2L1, P8F2L2, P5F2L3, P6F2L4 |
| Fiber 3: P7F3L1-P7F3L4 | Fiber 3: P11F2L1, P12F2L2, P9F2L3, P10F2L4 |
| Fiber 4: P7F4L1-P7F4L4 | Fiber 4: P15F2L1, P16F2L2, P13F2L3, P14F2L4 |
| Input Port 8: | Output Port 24: |
| Fiber 1: P8F1L1-P8F1L4 | Fiber 1: P4F2L1, P1F2L2, P2F2L3, P3F2L4 |
| Fiber 2: P8F2L1-P8F2L4 | Fiber 2: P8F2L1, P5F2L2, P6F2L3, P7F2L4 |
| Fiber 3: P8F3L1-P8F3L4 | Fiber 3: P12F2L1, P9F2L2, P10F2L3, P11F2L4 |
| Fiber 4: P8F4L1-P8F4L4 | Fiber 4: P16F2L1, P13F2L2, P14F2L3, P15F2L4 |
| Input Port 9: | Output Port 25: |
| Fiber 1: P9F1L1-P9F1L4 | Fiber 1: P1F3L1, P2F3L2, P3F3L3, P4F3L4 |
| Fiber 2: P9F2L1-P9F2L4 | Fiber 2: P5F3L1, P6F3L2, P7F3L3, P8F3L4 |
| Fiber 3: P9F3L1-P9F3L4 | Fiber 3: P9F3L1, P10F3L2, P11F3L3, P12F3L4 |
| Fiber 4: P9F4L1-P9F4L4 | Fiber 4: P13F3L1, P14F3L2, P15F3L3, P16F3L4 |
| Input Port 10: | Output Port 26: |
| Fiber 1: P10F1L1-P10F1L4 | Fiber 1: P2F3L1, P3F3L2, P4F3L3, P1F3L4 |
| Fiber 2: P10F2L1-P10F2L4 | Fiber 2: P6F3L1, P7F3L2, P8F3L3, P5F3L4 |
| Fiber 3: P10F3L1-P10F3L4 | Fiber 3: P10F3L1, P11F3L2, P12F3L3, P9F3L4 |
| Fiber 4: P10F4L1-P10F4L4 | Fiber 4: P14F3L1, P15F3L2, P16F3L3, P13F3L4 |
| Input Port 11: | Output Port 27: |
| Fiber 1: P11F1L1-P11F1L4 | Fiber 1: P3F3L1, P4F3L2, P1F3L3, P2F3L4 |
| Fiber 2: P11F2L1-P11F2L4 | Fiber 2: P7F3L1, P8F3L2, P5F3L3, P6F3L4 |
| Fiber 3: P11F3L1-P11F3L4 | Fiber 3: P11F3L1, P12F3L2, P9F3L3, P10F3L4 |
| Fiber 4: P11F4L1-P11F4L4 | Fiber 4: P15F3L1, P16F3L2, P13F3L3, P14F3L4 |
| Input Port 12: | Output Port 28: |
| Fiber 1: P12F1L1-P12F1L4 | Fiber 1: P4F3L1, P1F3L2, P2F3L3, P3F3L4 |
| Fiber 2: P12F2L1-P12F2L4 | Fiber 2: P8F3L1, P5F3L2, P6F3L3, P7F3L4 |
| Fiber 3: P12F3L1-P12F3L4 | Fiber 3: P12F3L1, P9F3L2, P10F3L3, P11F3L4 |
| Fiber 4: P12F4L1-P12F4L4 | Fiber 4: P16F3L1, P13F3L2, P14F3L3, P15F3L4 |
| Input Port 13: | Output Port 29: |
| Fiber 1: P13F1L1-P13F1L4 | Fiber 1: P1F4L1, P2F4L2, P3F4L3, P4F4L4 |
| Fiber 2: P13F2L1-P13F2L4 | Fiber 2: P5F4L1, P6F4L2, P7F4L3, P8F4L4 |
| Fiber 3: P13F3L1-P13F3L4 | Fiber 3: P9F4L1, P10F4L2, P11F4L3, P12F4L4 |
| Fiber 4: P13F4L1-P13F4L4 | Fiber 4: P13F4L1, P14F4L2, P15F4L3, P16F4L4 |
| Input Port 14: | Output Port 30: |
| Fiber 1: P14F1L1-P14F1L4 | Fiber 1: P2F4L1, P3F4L2, P4F4L3, P1F4L4 |
| Fiber 2: P14F2L1-P14F2L4 | Fiber 2: P6F4L1, P7F4L2, P8F4L3, P5F4L4 |
| Fiber 3: P14F3L1-P14F3L4 | Fiber 3: P10F4L1, P11F4L2, P12F4L3, P9F4L4 |
| Fiber 4: P14F4L1-P14F4L4 | Fiber 4: P14F4L1, P15F4L2, P16F4L3, P13F4L4 |
| Input Port 15: | Output Port 31: |
| Fiber 1: P15F1L1-P15F1L4 | Fiber 1: P3F4L1, P4F4L2, P1F4L3, P2F4L4 |
| Fiber 2: P15F2L1-P15F2L4 | Fiber 2: P7F4L1, P8F4L2, P5F4L3, P6F4L4 |
| Fiber 3: P15F3L1-P15F3L4 | Fiber 3: P11F4L1, P12F4L2, P9F4L3, P10F4L4 |
| Fiber 4: P15F4L1-P15F4L4 | Fiber 4: P15F4L1, P16F4L2, P13F4L3, P14F4L4 |
| Input Port 16: | Output Port 32: |
| Fiber 1: P16F1L1-P16F1L4 | Fiber 1: P4F4L1, P1F4L2, P2F4L3, P3F4L4 |
| Fiber 2: P16F2L1-P16F2L4 | Fiber 2: P8F4L1, P5F4L2, P6F4L3, P7F4L4 |
| Fiber 3: P16F3L1-P16F3L4 | Fiber 3: P12F4L1, P9F4L2, P10F4L3, P11F4L4 |
| Fiber 4: P16F4L1-P16F4L4 | Fiber 4: P16F4L1, P13F4L2, P14F4L3, P15F4L4 |

Continuing the example, Table 5 lists another example configuration for optical permutor 400 with respect to optical communications in the reverse, downstream direction, i.e., from core switches 22 to access nodes 17. Like Table 3 above, Table 5 illustrates another example configuration of optical permutor 400 for producing, on the optical fibers of rack-facing output ports P1-P16, a set of 64 unique permutations for combinations of core-facing input ports P16-P32 and optical wavelengths L1-L4 carried by those input ports, where no single optical output port carries multiple optical communications having the same wavelength.

TABLE 5

| Core switch-facing Input Ports for Optical Permutor | Access node-facing Output Ports for Optical Permutor (permutation of wavelengths & input port) |
|---|---|
| Input Port 17: | Output Port 1: |
| Fiber 1: P17F1L1-P17F1L4 | Fiber 1: P17F1L1, P18F1L2, P19F1L3, P20F1L4 |
| Fiber 2: P17F2L1-P17F2L4 | Fiber 2: P21F1L1, P22F1L2, P23F1L3, P24F1L4 |
| Fiber 3: P17F3L1-P17F3L4 | Fiber 3: P25F1L1, P26F1L2, P27F1L3, P28F1L4 |
| Fiber 4: P17F4L1-P17F4L4 | Fiber 4: P29F1L1, P30F1L2, P31F1L3, P32F1L4 |
| Input Port 18: | Output Port 2: |
| Fiber 1: P18F1L1-P18F1L4 | Fiber 1: P18F1L1, P19F1L2, P20F1L3, P17F1L4 |
| Fiber 2: P18F2L1-P18F2L4 | Fiber 2: P22F1L1, P23F1L2, P24F1L3, P21F1L4 |
| Fiber 3: P18F3L1-P18F3L4 | Fiber 3: P26F1L1, P27F1L2, P28F1L3, P25F1L4 |
| Fiber 4: P18F4L1-P18F4L4 | Fiber 4: P30F1L1, P31F1L2, P32F1L3, P29F1L4 |
| Input Port 19: | Output Port 3: |
| Fiber 1: P19F1L1-P19F1L4 | Fiber 1: P19F1L1, P20F1L2, P17F1L3, P18F1L4 |
| Fiber 2: P19F2L1-P19F2L4 | Fiber 2: P23F1L1, P24F1L2, P21F1L3, P22F1L4 |
| Fiber 3: P19F3L1-P19F3L4 | Fiber 3: P27F1L1, P28F1L2, P25F1L3, P26F1L4 |
| Fiber 4: P19F4L1-P19F4L4 | Fiber 4: P31F1L1, P32F1L2, P29F1L3, P30F1L4 |
| Input Port 20: | Output Port 4: |
| Fiber 1: P20F1L1-P20F1L4 | Fiber 1: P20F1L1, P17F1L2, P18F1L3, P19F1L4 |
| Fiber 2: P20F2L1-P20F2L4 | Fiber 2: P24F1L1, P21F1L2, P22F1L3, P23F1L4 |
| Fiber 3: P20F3L1-P20F3L4 | Fiber 3: P28F1L1, P25F1L2, P26F1L3, P27F1L4 |
| Fiber 4: P20F4L1-P20F4L4 | Fiber 4: P32F1L1, P29F1L2, P30F1L3, P31F1L4 |
| Input Port 21: | Output Port 5: |
| Fiber 1: P21F1L1-P21F1L4 | Fiber 1: P17F2L1, P18F2L2, P19F2L3, P20F2L4 |
| Fiber 2: P21F2L1-P21F2L4 | Fiber 2: P21F2L1, P22F2L2, P23F2L3, P24F2L4 |
| Fiber 3: P21F3L1-P21F3L4 | Fiber 3: P25F2L1, P26F2L2, P27F2L3, P28F2L4 |
| Fiber 4: P21F4L1-P21F4L4 | Fiber 4: P29F2L1, P30F2L2, P31F2L3, P32F2L4 |
| Input Port 22: | Output Port 6: |
| Fiber 1: P22F1L1-P22F1L4 | Fiber 1: P18F2L1, P19F2L2, P20F2L3, P17F2L4 |
| Fiber 2: P22F2L1-P22F2L4 | Fiber 2: P22F2L1, P23F2L2, P24F2L3, P21F2L4 |
| Fiber 3: P22F3L1-P22F3L4 | Fiber 3: P26F2L1, P27F2L2, P28F2L3, P25F2L4 |
| Fiber 4: P22F4L1-P22F4L4 | Fiber 4: P30F2L1, P31F2L2, P32F2L3, P29F2L4 |
| Input Port 23: | Output Port 7: |
| Fiber 1: P23F1L1-P23F1L4 | Fiber 1: P19F2L1, P20F2L2, P17F2L3, P18F2L4 |
| Fiber 2: P23F2L1-P23F2L4 | Fiber 2: P23F2L1, P24F2L2, P21F2L3, P22F2L4 |
| Fiber 3: P23F3L1-P23F3L4 | Fiber 3: P27F2L1, P28F2L2, P25F2L3, P26F2L4 |
| Fiber 4: P23F4L1-P23F4L4 | Fiber 4: P31F2L1, P32F2L2, P29F2L3, P30F2L4 |
| Input Port 24: | Output Port 8: |
| Fiber 1: P24F1L1-P24F1L4 | Fiber 1: P20F2L1, P17F2L2, P18F2L3, P19F2L4 |
| Fiber 2: P24F2L1-P24F2L4 | Fiber 2: P24F2L1, P21F2L2, P22F2L3, P23F2L4 |
| Fiber 3: P24F3L1-P24F3L4 | Fiber 3: P28F2L1, P25F2L2, P26F2L3, P27F2L4 |
| Fiber 4: P24F4L1-P24F4L4 | Fiber 4: P32F2L1, P29F2L2, P30F2L3, P31F2L4 |
| Input Port 25: | Output Port 9: |
| Fiber 1: P25F1L1-P25F1L4 | Fiber 1: P17F3L1, P18F3L2, P19F3L3, P20F3L4 |
| Fiber 2: P25F2L1-P25F2L4 | Fiber 2: P21F3L1, P22F3L2, P23F3L3, P24F3L4 |
| Fiber 3: P25F3L1-P25F3L4 | Fiber 3: P25F3L1, P26F3L2, P27F3L3, P28F3L4 |
| Fiber 4: P25F4L1-P25F4L4 | Fiber 4: P29F3L1, P30F3L2, P31F3L3, P32F3L4 |
| Input Port 26: | Output Port 10: |
| Fiber 1: P26F1L1-P26F1L4 | Fiber 1: P18F3L1, P19F3L2, P20F3L3, P17F3L4 |
| Fiber 2: P26F2L1-P26F2L4 | Fiber 2: P22F3L1, P23F3L2, P24F3L3, P21F3L4 |
| Fiber 3: P26F3L1-P26F3L4 | Fiber 3: P26F3L1, P27F3L2, P28F3L3, P25F3L4 |
| Fiber 4: P26F4L1-P26F4L4 | Fiber 4: P30F3L1, P31F3L2, P32F3L3, P29F3L4 |
| Input Port 27: | Output Port 11: |
| Fiber 1: P27F1L1-P27F1L4 | Fiber 1: P19F3L1, P20F3L2, P17F3L3, P18F3L4 |
| Fiber 2: P27F2L1-P27F2L4 | Fiber 2: P23F3L1, P24F3L2, P21F3L3, P22F3L4 |
| Fiber 3: P27F3L1-P27F3L4 | Fiber 3: P27F3L1, P28F3L2, P25F3L3, P26F3L4 |
| Fiber 4: P27F4L1-P27F4L4 | Fiber 4: P31F3L1, P32F3L2, P29F3L3, P30F3L4 |
| Input Port 28: | Output Port 12: |
| Fiber 1: P28F1L1-P28F1L4 | Fiber 1: P20F3L1, P17F3L2, P18F3L3, P18F3L4 |
| Fiber 2: P28F2L1-P28F2L4 | Fiber 2: P24F3L1, P21F3L2, P22F3L3, P23F3L4 |
| Fiber 3: P28F3L1-P28F3L4 | Fiber 3: P28F3L1, P25F3L2, P26F3L3, P27F3L4 |
| Fiber 4: P28F4L1-P28F4L4 | Fiber 4: P32F3L1, P29F3L2, P30F3L3, P31F3L4 |

TABLE 5-continued

| Core switch-facing Input Ports for Optical Permutor | Access node-facing Output Ports for Optical Permutor (permutation of wavelengths & input port) |
|---|---|
| Input Port 29: | Output Port 13: |
| Fiber 1: P29F1L1-P29F1L4 | Fiber 1: P17F4L1, P18F4L2, P19F4L3, P20F4L4 |
| Fiber 2: P29F2L1-P29F2L4 | Fiber 2: P21F4L1, P22F4L2, P23F4L3, P24F4L4 |
| Fiber 3: P29F3L1-P29F3L4 | Fiber 3: P25F4L1, P26F4L2, P27F4L3, P28F4L4 |
| Fiber 4: P29F4L1-P29F4L4 | Fiber 4: P29F4L1, P30F4L2, P31F4L3, P32F4L4 |
| Input Port 30: | Output Port 14: |
| Fiber 1: P30F1L1-P30F1L4 | Fiber 1: P18F4L1, P19F4L2, P20F4L3, P17F4L4 |
| Fiber 2: P30F2L1-P30F2L4 | Fiber 2: P22F4L1, P23F4L2, P24F4L3, P21F4L4 |
| Fiber 3: P30F3L1-P30F3L4 | Fiber 3: P26F4L1, P27F4L2, P28F4L3, P25F4L4 |
| Fiber 4: P30F4L1-P30F4L4 | Fiber 4: P30F4L1, P31F4L2, P32F4L3, P29F4L4 |
| Input Port 31: | Output Port 15: |
| Fiber 1: P31F1L1-P31F1L4 | Fiber 1: P19F4L1, P20F4L2, P17F4L3, P18F4L4 |
| Fiber 2: P31F2L1-P31F2L4 | Fiber 2: P23F4L1, P24F4L2, P21F4L3, P22F4L4 |
| Fiber 3: P31F3L1-P31F3L4 | Fiber 3: P27F4L1, P28F4L2, P25F4L3, P26F4L4 |
| Fiber 4: P31F4L1-P31F4L4 | Fiber 4: P31F4L1, P32F4L2, P29F4L3, P30F4L4 |
| Input Port 32: | Output Port 16: |
| Fiber 1: P32F1L1-P32F1L4 | Fiber 1: P20F4L1, P17F4L2, P18F4L3, P19F4L4 |
| Fiber 2: P32F2L1-P32F2L4 | Fiber 2: P24F4L1, P21F4L2, P22F4L3, P23F4L4 |
| Fiber 3: P32F3L1-P32F3L4 | Fiber 3: P28F4L1, P25F4L2, P26F4L3, P27F4L4 |
| Fiber 4: P32F4L1-P32F4L4 | Fiber 4: P32F4L1, P29F4L2, P30F4L3, P31F4L4 |

Figure 17:
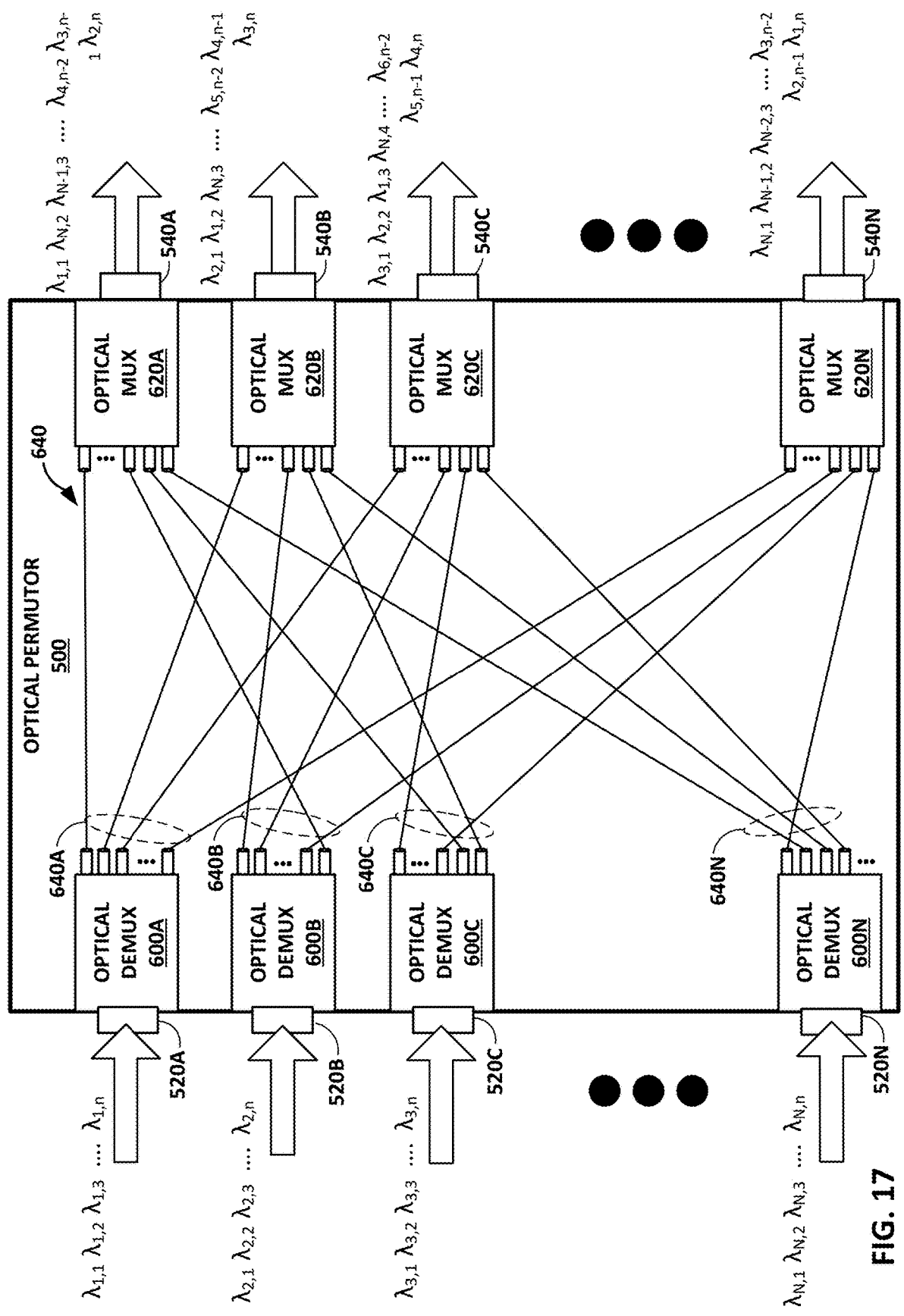
FIG. 17 is a block diagram illustrating an example optical permutor, which may be any of the optical permutors described herein, such as illustrated in FIGS. 9, 11, and 12.

FIG. 17 is a block diagram illustrating an example optical permutor 500, which may be any of optical permutors 132 of FIGS. 9, 11, and 12. In this example, optical permutor 500 includes a plurality of input ports 520A-520N (herein, "input ports 520") to receive respective optical signals, each of the optical signals carrying communications at a set of n wavelengths. Each communication is designated as $\lambda_{p,w}$, where the subscript p represents the port and the subscript w represents with wavelength. Thus, using this nomenclature, optical input 520A receives a light beam carrying communications at n different wavelengths designated $\lambda_{1,1}$, $\lambda_{1,2}$, ... $\lambda_{1,n}$. Similarly, optical input 520B receives a light beam carrying communications at n different wavelengths designated $\lambda_{2,1}$, $\lambda_{2,2}$, ... $\lambda_{2,n}$.

Optical permutor 500 includes a respective one of optical demultiplexers 600A-600N (herein, "optical demuxes 600") for each optical input interface 520, where the optical demultiplexer is configured to demultiplex the optical communications for a given optical input onto internal optical pathways 640 based on the bandwidth of the optical communications. For example, optical demux 600A separates the optical communications received on optical input interface 520A onto a set of internal optical pathways 640A based on wavelengths $\lambda_{1,1}$, $\lambda_{1,2}$, ... $\lambda_{1,n}$. Optical demux 600B separates the optical communications received on optical input interface 520B onto a set of internal optical pathways 640B based on wavelengths $\lambda_{2,1}$, $\lambda_{2,2}$, ... $\lambda_{2,n}$. Each optical demux 600 operates in a similar fashion to separate the optical communications received from the receptive input optical interface 520 so as to direct the optical communications through internal optical pathways 640 toward optical output ports 540A-540N (herein, "optical output ports 540").

Optical permutor 500 includes a respective one of optical multiplexers 620A-620N (herein, "optical muxes 620") for each optical output port 540, where the optical multiplexer receives as input optical signals from optical pathways 640 that lead to each optical demux 600. In other words, optical pathways 640 internal to optical permutor 500 provide a full-mesh of $N^2$ optical interconnects between optical demuxes 600 and optical muxes 620. Each optical multiplexer 620 receives N optical pathways as input and combines the optical signals carried by the N optical pathways into a single optical signal for output onto a respective optical fiber.

Moreover, optical demuxes 600 are each configured such that optical communications received from input interface ports 520 are "permuted" across optical output ports 540 based on wavelength so as to provide full-mesh connectivity between the ports and in a way that ensures optical interference is avoided. That is, each optical demux 600 is configured to ensure that each optical output port 54 receives a different one of the possible unique permutations of the combinations of optical input ports 520 and the optical frequencies carried by those ports and where no single optical output port 540 carries communications having the same wavelength.

For example, optical demux 600A may be configured to direct the optical signal having wavelength $\lambda_{1,1}$ to optical mux 620A, wavelength $\lambda_{1,2}$ to optical mux 620B, wavelength $\lambda_{1,3}$ to optical mux 620C, ... and wavelength $\lambda_{1,n}$ to optical mux 620N. Optical demux 600B is configured to deliver a different (second) permutation of optical signals by outputting wavelength $\lambda_{2,n}$ to optical mux 620A, wavelength $\lambda_{2,1}$ to optical mux 620B, wavelength $\lambda_{2,2}$ to optical mux 620C, ... and wavelength $\lambda_{2,n-1}$ to optical mux 620N. Optical demux 600C is configured to deliver a different (third) permutation of optical signals by outputting wavelength $\lambda_{3,n-1}$ to optical mux 620A, wavelength $\lambda_{3,n-2}$ to optical mux 620B, wavelength $\lambda_{3,n-3}$ to optical mux 620C, ... and wavelength $\lambda_{3,n-2}$ to optical mux 620N. This example configuration pattern continues through optical demux 600N, which is configured to deliver a different ($N^{th}$) permutation of optical signals by outputting wavelength $\lambda_{N,2}$ to optical mux 620A, wavelength $\lambda_{N,3}$ to optical mux 620B, wavelength $\lambda_{N,4}$ to optical mux 620C, ... and wavelength $\lambda_{N,1}$ to optical mux 620N.

In the example implementation, optical pathways 640 are arranged such that the different permutations of input interface/wavelengths are delivered to optical muxes 620. In other words, each optical demux 600 may be configured to operate in a similar manner, such as $\lambda_1$ being provided to a first port of the demux, $\lambda_2$ being provided to a second port of the demux ..., and $\lambda_n$ being provided to an $N^{th}$ port of the demux. Optical pathways 640 are arranged to optically deliver a specific permutation of wavelengths to each optical mux 620 such that any communications from any one of optical demuxes 600 can reach any optical mux 620 and, moreover, each permutation of wavelengths is selected to avoid any interference between the signals, i.e., be non-overlapping.

For example, as shown in FIG. 17, optical paths 640A provide optical interconnects from a first port of optical demux 600A carrying $\lambda_{1,1}$ to optical mux 620A, from a second port of optical demux 600A carrying $\lambda_{1,2}$ to optical mux 620B, from a third port of optical demux 600A carrying $\lambda_{1,3}$ to optical mux 620C, . . . and from an $N^{th}$ port of optical demux 600A carrying $\lambda_{1,n}$ to optical mux 620N. Rather than provide an interconnect in the same way as optical paths 640A, optical paths 640B are arranged to provide optical interconnects from a first port of optical demux 600B carrying $\lambda_{2,1}$ to optical mux 620B, from a second port of optical demux 600B carrying $\lambda_{2,2}$ to optical mux 620C, . . . from an N–$1^{st}$ port of optical demux 600B carrying to optical mux 620N, and from an $N^{th}$ port of optical demux 600B carrying $\lambda_{2,n}$ to optical mux 620A. Optical paths 640C are arranged in yet another manner so as to provide optical interconnects from a first port of optical demux 600C carrying $\lambda_{3,1}$ to optical mux 620C, . . . from an N–$2^{nd}$ port of optical demux 600C carrying $\lambda_{3,n-2}$ to optical mux 620N, from an N–$1^{st}$ port of optical demux 600C carrying $\lambda_{3,n-1}$ to optical mux 620A, and from an $N^{th}$ port of optical demux 600C carrying $\lambda_{3,n}$ to optical mux 620B. This interconnect pattern continues, in this example, such that optical paths 640N are arranged to provide optical interconnects from a first port of optical demux 60N carrying $\lambda_{N,1}$ to optical mux 620N, from a second port of optical demux 600N carrying $\lambda_{N,2}$ to optical mux 620A, from a third port of optical demux 600N carrying $\lambda_{N,3}$ to optical mux 620B, and from a fourth port of optical demux 600N carrying $\lambda_{N,4}$ to optical mux 620C and so forth.

In this way, a different permutation of input optical interface/wavelength combination is provided to each optical mux 620 and, moreover, each one of the permutations provided to the respective optical mux is guaranteed to include optical communications having non-overlapping wavelengths.

Optical permutor 500 illustrates one example implementation of the techniques described herein. In other example implementations, each optical interface 520 need not receive all N wavelengths from a single optical fiber. For example, different subsets of the N wavelengths can be provided by multiple fibers, which would then be combined (e.g., by a multiplexer) and subsequently permuted as described herein. As one example, optical permutor 500 may have 2N optical inputs 520 so as to receive 2N optical fibers, where a first subset of N optical fibers carries wavelengths $\lambda_1 \ldots \lambda_{n/2}$ and a second subset of N optical fibers carries wavelengths $\lambda_{n/2+1} \ldots \lambda_n$. Light from pairs of the optical inputs from the first and second set may be combined to form optical inputs carrying N wavelengths, which may then be permuted as shown in the example of FIG. 17.

In the example implementation, optical permutor 500, including optical input ports 520, optical demuxes 600, optical pathways 640, optical muxes 620 and optical output ports 540 may be implemented as one or more application specific integrated circuit (ASIC), such as a photonic integrated circuit or an integrated optical circuit. In other words, the optical functions described herein may be integrated on a single chip, thereby providing an integrated optical permutor that may be incorporated into electronic cards, devices and systems.

Figure 18:
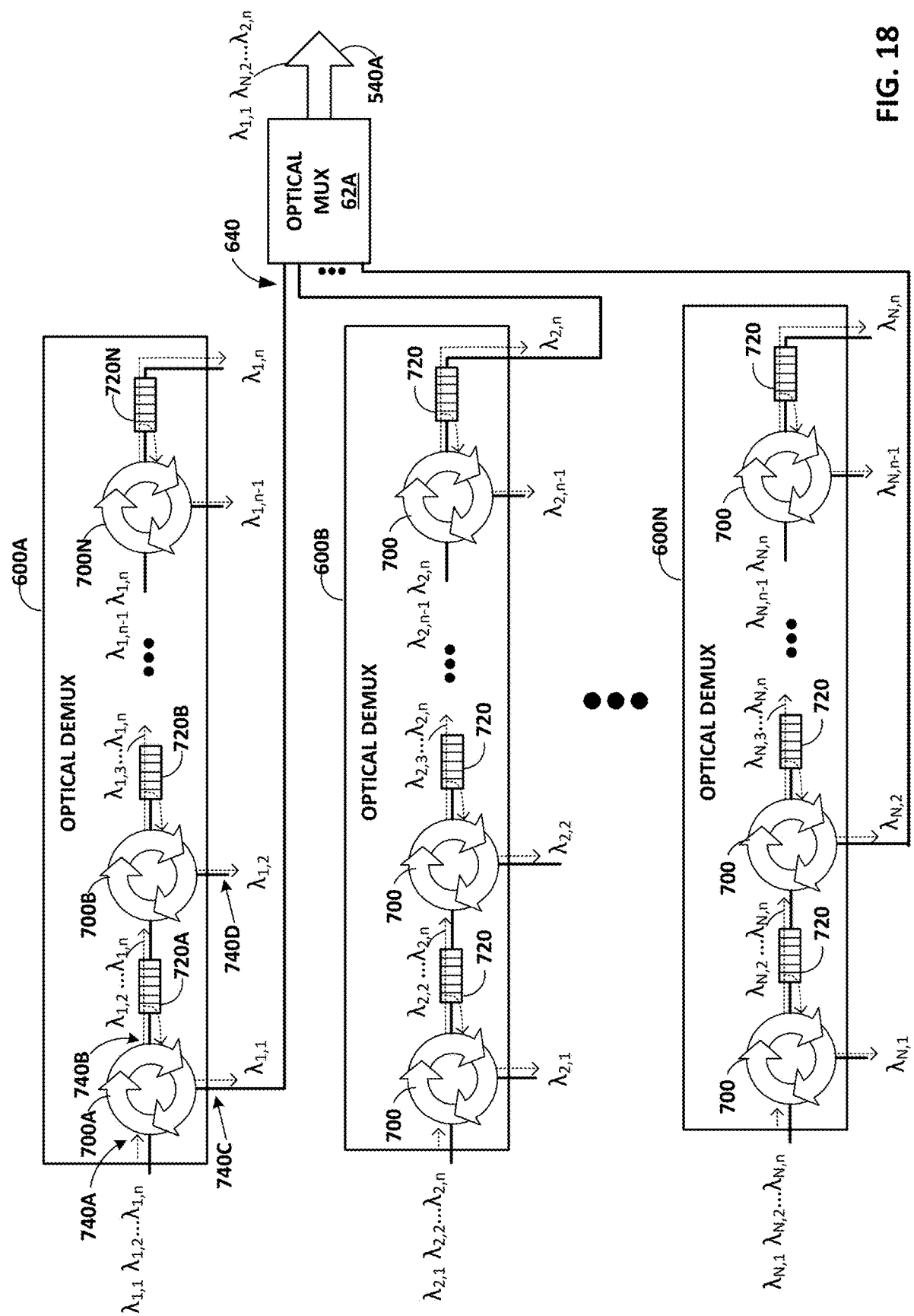
FIG. 18 is a block diagram another example implementation of the optical permutor of FIG. 17.

FIG. 18 is a block diagram another example implementation of optical permutor 500 of FIG. 17. In the example implementation, optical demuxes 600 are configured differently so as to direct different respective permutations of input interface/wavelengths to optical pathways 640 for transport to optical muxes 620.

In the example implementation of FIG. 18, each optical demux 600 includes a series of optical circulators 700 having optical grating elements 720 disposed after each of the optical circulators. Optical grating elements may be, for example Fiber Bragg Grating (FBG) elements or Arrayed Waveguide Grating (AWG). Each pair of optical circulators 700 and optical grating elements 720 is configured to selectively direct a particular wavelength out the corresponding output port of the optical demux 600. Specifically, each optical circulator 700 operates to direct all incoming light received on any of its optical interfaces out a next optical interface in a clockwise direction around the circulator. For example, optical circulator 700A receives light on optical interface 740A and directs all wavelengths around the optical circulator and out optical interface 740B. Each optical grating element 720 is configured to reflect a particular wavelength which re-enters the upstream circulator from which the light was received. For example, optical grating element 720A receives wavelengths $\lambda_{1,1}, \lambda_{1,2}, \ldots \lambda_{1,n}$ from upstream circulator 700A and is configured to reflect $\lambda_{1,1}$ and pass all other wavelengths $\lambda_{1,2}, \ldots \lambda_{1,n}$. Light having $\lambda_{1,1}$ reenters circulator 700A where the light is passed to the next optical interface 740C to optical pathways 640. Light having wavelengths $\lambda_{1,2}, \ldots \lambda_{1,n}$ continues downstream where optical circulator 700B and optical grating element 720B are configured to selectively direct light having wavelength $\lambda_{1,2}$ out optical interface 740D to optical pathways 640. In this way, each optical grating element 720 is configured to selectively redirect the correct wavelength out of the appropriate optical ports of optical demuxes 600 such that each of the demuxes outputs a different permutation of optical wavelengths that are transported to optical muxes 620.

In other examples, optical permutors 132, 400, 500 may make use of star couplers and waveguide grating routers described in Kaminow, "Optical Integrated Circuits: A Personal Perspective," Journal of Lightwave Technology, vol. 26, no. 9, May 1, 2008, the entire contents of which are incorporated herein by reference.

Figure 19:
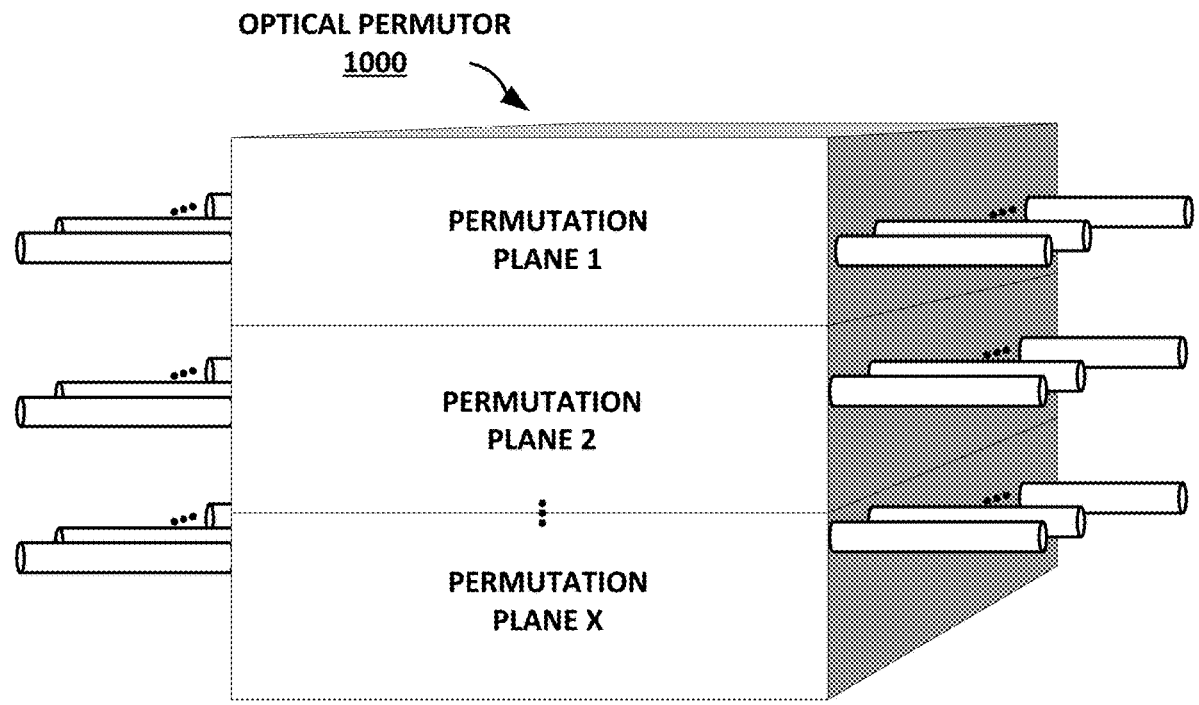
FIG. 19 is a block diagram illustrating an optical permutor having a plurality of logical permutation planes.

FIG. 19 is a block diagram illustrating an optical permutor 1000 having a plurality of logical permutation planes 1-X. Each permutation plane may be configured substantially as described above so as to permute wavelength/input port combinations to output ports in a manner that guarantees no interference. Each permutation plane 1-X may, for example, be implemented as optical permutor 400 from FIG. 15, 16 or optical permutor 500 from FIGS. 17, 18, and the multiple permutation planes may be packaged on a single chip. In this example implementation, optical permutor 1000 may readily be scaled in a single device to support high numbers of optical inputs and outputs.

Figure 20:
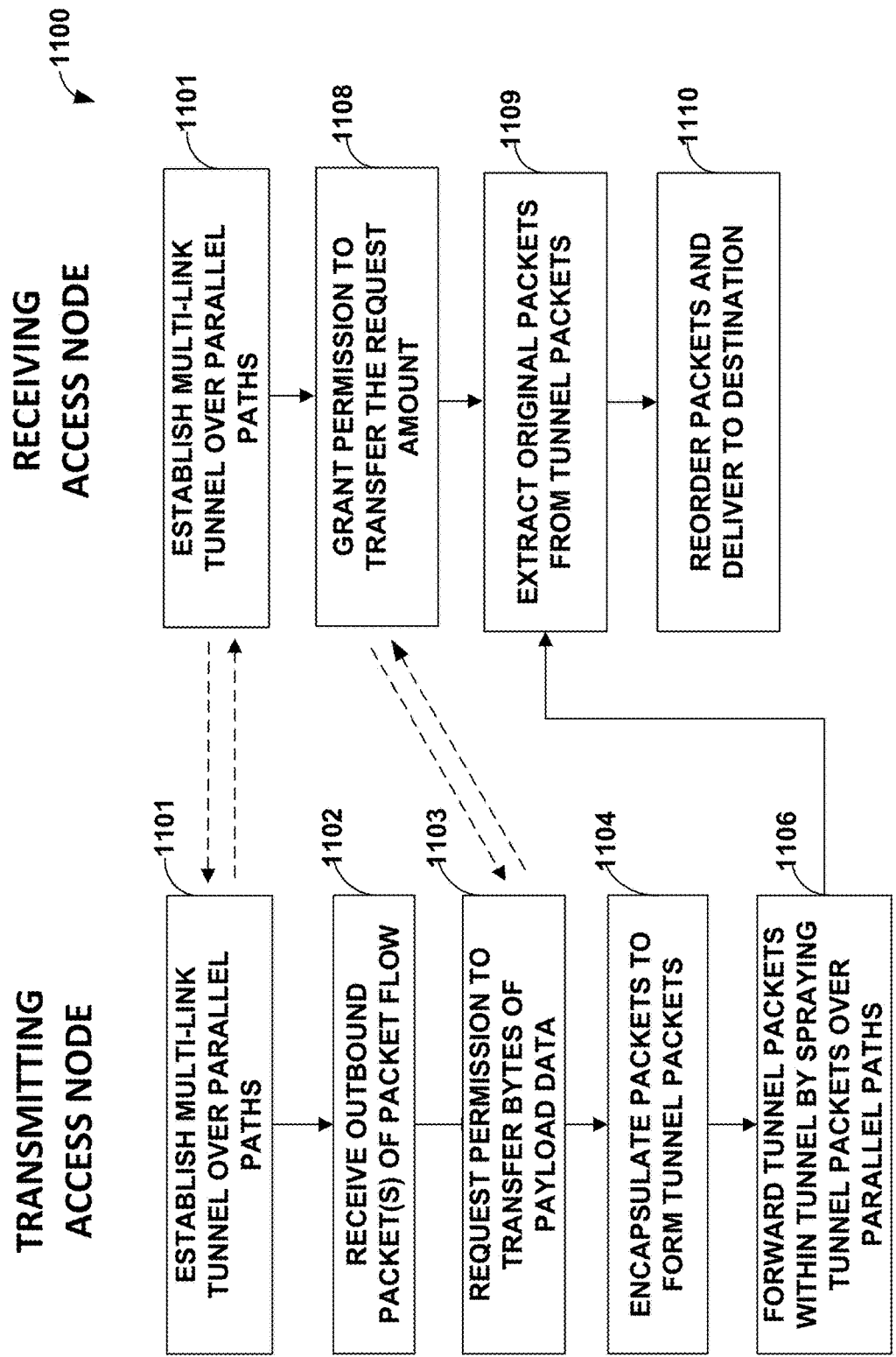
FIG. 20 is a flowchart illustrating example operation of a network system in accordance with the techniques described herein.

FIG. 20 is a flowchart illustrating example operation of a network system in accordance with the techniques described herein. For ease of illustration the flowchart of FIG. 20 is described with respect to network system 8 of FIG. 1, including servers 12, access nodes 17, and switch fabric 14 of data center 10. Nevertheless, the techniques illustrated by FIG. 20 are readily applicable to the other example network implementations described herein.

As shown in this example, a set of access nodes 17 exchange control plane messages to establish a logical tunnel over a plurality of parallel network paths that provide packet-based connectivity between the access nodes (1001). For example, with respect to FIG. 1, switch fabric 14 may comprise one or more tiers of switches and/or routers that provide multiple paths for forwarding communications between access nodes 17. Respective pairs of access nodes 17, possibly in response to direction from SDN controller 21, exchange the control plane messages to negotiate a logical, end-to-end tunnel configured over multiple, parallel paths between the access nodes.

Once the logical tunnel is established, one of the access nodes (referred to as the 'transmitting access node' in FIG. 20) may receive outbound packets associated with the same overall packet flow, e.g., from an application or storage server 12 (1102). In response, for at least some example implementations, the transmitting access node issues a request to transmit a specified amount of packet data (1103).

Upon receiving a grant from the access node associated with a destination of the packet data to be transmitted (1108), the transmitting access nodes encapsulates the outbound packets within tunnel packets, thereby forming each tunnel packet to have a tunnel header for traversing the logical tunnel and a payload containing one or more of the outbound packets (1104).

Upon forming the tunnel packets, the transmitting access node forwards the tunnel packets by spraying the tunnel packets over the multiple, parallel paths through switch fabric 14 by which the receiving access node is reachable (1106). In some example implementations, the transmitting access node may, prior to forwarding the tunnel packets to switch fabric 14, spray the tunnel packets across multiple access nodes that, for example, form one or more access node groups (e.g., within one or more rack groups proximate to the transmitting access node, as one example), thereby providing a first level fanout for distributing the tunnel packets across the parallel paths. In addition, or in the alternative, as the tunnel packets traverse the multiple, parallel paths (i.e., multiple non-fate-sharing paths), the tunnel packets may be processed by intermediate optical permutors (see FIG. 9) that permute communications across ports, thereby providing a second level fanout reaching additional parallel paths so as to provide increased scalability of the network system while still providing a high-level of connectivity between access nodes. In other example implementations the network system need not include optical permutors.

Upon receipt, the receiving access node extracts the original packets that are encapsulated within the tunnel packets (1109), reorders the original packets in the order sent by the application or storage server, and delivers the packets to the intended destination server (1110).

What is claimed is:

1. A network device comprising:
   a source access node coupled to a switch fabric and a destination access node through the switch fabric, wherein the source access node includes a storage device configured to provide network accessible storage for use by an application executing on a destination network device coupled to the destination access node, and wherein the source access node is configured to:
   enable establishment of a logical tunnel over a plurality of data paths across the switch fabric between the source access node and the destination access node, and
   spray packets in a data flow of packets over the logical tunnel to the destination access node, wherein to spray the packets in the data flow of packets, the source access node tracks a number of bytes transmitted on each of the plurality of data paths, and directs each of the packets within the data flow to one of the plurality of data paths based on the number of bytes transmitted on each of the plurality of data paths.

2. The network device of claim 1, wherein the packets in the data flow of packets are sprayed non-uniformly across the plurality of data paths.

3. The network device of claim 1, wherein the source access node is further configured to assign a packet sequence number to each packet in the data flow of packets.

4. The network device of claim 1, wherein the plurality of data paths includes a plurality of active links, and wherein to spray the data flow of packets, the source access node is further configured to:
   spray each of the packets within the data flow in proportion to a bandwidth weight of each of the active links.

5. The network device of claim 1, wherein the source access node is further coupled to a plurality of access nodes through the switch fabric such that any pairwise combination between the source access node and any of the plurality of access nodes is connected by at most a single layer three (L3) hop.

6. The network device of claim 1, wherein the packets in the data flow of packets are sprayed while taking into account link failures.

7. A method comprising:
   establishing a logical tunnel over a plurality of data paths across a switch fabric between a source access node and a destination access node, wherein the source access node includes a storage device configured to provide network accessible storage for use by an application executing on a destination network device coupled to the destination access node, and wherein the source access node is coupled to a source network device; and
   spraying, by the source access node, packets in a data flow of packets over the logical tunnel to the destination access node, wherein spraying the data flow of packets includes tracking a number of bytes transmitted on each of the plurality of data paths and directing each of the packets within the data flow to one of the plurality of data paths based on the number of bytes transmitted on each of the plurality of data paths.

8. The method of claim 7, wherein the packets in the data flow of packets are sprayed non-uniformly across the plurality of data paths.

9. The method of claim 7, further comprising assigning a packet sequence number to each packet in the data flow of packets.

10. The method of claim 7, wherein the plurality of data paths includes a plurality of active links, and wherein spraying the data flow of packets over the logical tunnel includes:
    spraying each of the packets within the data flow in proportion to a bandwidth weight of each of the active links.

11. The method of claim 7, wherein the source access node is further coupled to a plurality of access nodes through the switch fabric such that any pairwise combination between the source access node and any of the plurality of access nodes is connected by at most a single layer three (L3) hop.

12. The method of claim 7, wherein the packets in the data flow of packets are sprayed while taking into account link failures.

13. A network device comprising:
a source access node coupled to a switch fabric and a plurality of destination network devices, wherein the source access node includes a storage device configured to provide network accessible storage for use by an application executing on one of the plurality of destination network devices, and wherein the source access node is configured to:
  establish a logical tunnel over a plurality of data paths across the switch fabric between the source access node and a destination access node coupled to one of the plurality of destination network devices, and
  spray packets in a data flow of packets over the logical tunnel to the destination access node, wherein to spray the packets in the data flow of packets, the source access node tracks a number of bytes transmitted on each of the plurality of data paths, and directs each of the packets within the data flow to one of the plurality of data paths based on the number of bytes transmitted on each of the plurality of data paths.

14. The network device of claim 13, wherein the packets in the data flow of packets are sprayed non-uniformly across the plurality of data paths.

15. The network device of claim 13, wherein the source access node is further configured to assign a packet sequence number to each packet in the data flow of packets.

16. The network device of claim 13, wherein the plurality of data paths includes a plurality of active links, and wherein to spray the data flow of packets, the source access node is further configured to:
  spray each of the packets within the data flow in proportion to a bandwidth weight of each of the active links.

17. The network device of claim 13, wherein the source access node is coupled to a plurality of access nodes through the switch fabric, each access node coupled to one of the plurality of destination network devices, and wherein any pairwise combination between the source access node and any of the plurality of access nodes is connected by at most a single layer three (L3) hop.

* * * * *